US012564764B2

(12) United States Patent
Young et al.

(10) Patent No.: US 12,564,764 B2
(45) Date of Patent: Mar. 3, 2026

(54) SYSTEM AND METHOD OF BASKETBALL TESTING

(71) Applicant: BALLOGY, INC., Austin, TX (US)

(72) Inventors: Todd Young, Austin, TX (US); Syed Saad Hussain, Lahore (PK); Zach Urbanus, Austin, TX (US)

(73) Assignee: Ballogy, Inc., Austin, TX (US)

( * ) Notice: Subject to any disclaimer, the term of this patent is extended or adjusted under 35 U.S.C. 154(b) by 572 days.

(21) Appl. No.: 16/159,436

(22) Filed: Oct. 12, 2018

(65) Prior Publication Data

US 2019/0111317 A1      Apr. 18, 2019

Related U.S. Application Data

(60) Provisional application No. 62/571,724, filed on Oct. 12, 2017, provisional application No. 62/729,232, filed on Sep. 10, 2018.

(51) Int. Cl.
*A63B 24/00*          (2006.01)
*A63F 13/812*          (2014.01)
(Continued)

(52) U.S. Cl.
CPC ......... *A63B 24/0075* (2013.01); *G06Q 50/01* (2013.01); *A63B 2024/0081* (2013.01); *A63F 13/798* (2014.09); *A63F 13/812* (2014.09)

(58) Field of Classification Search
CPC ............... G06Q 50/01; A63B 24/0075; A63B 2024/0081
(Continued)

(56) References Cited

U.S. PATENT DOCUMENTS 7,092,846 B2      8/2006  Vock
9,381,420 B2 *   7/2016  Burroughs ............. G16H 20/30
(Continued)

FOREIGN PATENT DOCUMENTS

EP            3694616 A1      8/2020
WO     WO2019075401 A1      4/2019

OTHER PUBLICATIONS

"Improving Athlete Mental Training Engagement Using Smartphone Phone Technology"—Rist et al, IJSSH, vol. 7, No. 3, Mar. 2017 https://www.ijssh.org/vol7/809-PS0008.pdf (Year: 2017).*
(Continued)

*Primary Examiner* — Randy A Scott
(74) *Attorney, Agent, or Firm* — Berkeley Law & Technology Group, LLP

(57)                    ABSTRACT

A first mobile device displays a visual representation of at least a portion of a basketball court and receives user input indicating a sequence of actions to be performed on the basketball court by a player. The first mobile device encodes the sequence of actions into a data structure and sends the data structure to a server to cause the server to initiate a notification to at least at a second mobile device. The second mobile device receives the data structure and displays the visual representation of the basketball court concurrently with at least one user interface element corresponding to at least one action in the sequence of actions. Placement of the at least one user interface element relative to a basketball hoop is determined, at the second mobile device after receipt of the data structure, based at least in part of a profile of the player.

8 Claims, 52 Drawing Sheets

(51) Int. Cl.
_G06Q 50/00_ (2024.01)
_A63F 13/798_ (2014.01)
(58) Field of Classification Search
USPC ........ 709/200, 217, 219, 223, 224; 600/300,
600/301, 365
See application file for complete search history.

(56) References Cited

U.S. PATENT DOCUMENTS

| | | | |
|---|---|---|---|
| 9,914,035 | B2 | 3/2018 | Campbell |
| 11,839,805 | B2 | 12/2023 | Young et al. |
| 2008/0015061 | A1* | 1/2008 | Klein ................. A63B 69/0071 |
| | | | 473/447 |
| 2008/0312010 | A1 | 12/2008 | Marty et al. |
| 2009/0048044 | A1 | 2/2009 | Oleson |
| 2009/0099924 | A1 | 4/2009 | Lensch et al. |
| 2013/0095959 | A1 | 4/2013 | Marty |
| 2013/0286004 | A1 | 10/2013 | McColloch |
| 2014/0222177 | A1 | 8/2014 | Thurman et al. |
| 2014/0270375 | A1 | 9/2014 | Canavan |
| 2014/0301598 | A1 | 10/2014 | Marty |
| 2015/0170530 | A1 | 6/2015 | Damman et al. |
| 2015/0324751 | A1* | 11/2015 | Orenstein .............. G16H 20/30 |
| | | | 702/3 |
| 2015/0332450 | A1 | 11/2015 | Marty et al. |
| 2016/0027325 | A1 | 1/2016 | Malhotra |
| 2016/0096067 | A1 | 4/2016 | Ianni et al. |
| 2016/0193518 | A1 | 7/2016 | Baxter |
| 2016/0247328 | A1* | 8/2016 | Han ................... H04N 21/8549 |
| 2016/0314818 | A1* | 10/2016 | Kirk ................... G06F 3/04845 |
| 2017/0095716 | A1 | 4/2017 | Lewis et al. |
| 2018/0075392 | A1* | 3/2018 | Surane ................. G06F 16/951 |
| 2019/0385477 | A1 | 12/2019 | Young et al. |
| 2020/0023262 | A1 | 1/2020 | Young et al. |
| 2024/0335725 | A1 | 10/2024 | Young et al. |

OTHER PUBLICATIONS

"Validity of a Smartphone-Based Application for Determining Sprinting Performance"—Stanton et al, Journal of Sports Medicine, Jul. 21, 2016 https://onlinelibrary.wiley.com/doi/epdf/10.1155/2016/7476820 (Year: 2016).*
International Search Report and Written Opinion in International Application No. PCT/US2018/055712 mailed Jan. 8, 2019, 11 pages.
U.S. Appl. No. 62/729,232: US Provisional Application filed Sep. 10, 2018, 68 pages, Doc 066.
U.S. Appl. No. 62/729,232: filed Sep. 19, 2028, 3 pages, Doc 067.
PCT Application No. PCT/US2018/055712: PCT Application filed Oct. 12, 2018, pages, Doc 020.
PCT Application No. PCT/US2018/055712: Notice of Transmittal of International Search Report and Written Opinion dated Jan. 8, 2019; 12 pages, Doc 021.
PCT Application No. PCT/US2018/055712: International Preliminary Report of Patentability dated Jun. 7, 2019, 46 pages, Doc 022.
EP Application No. 18866764: Request for EP Entry filed May 7, 2020, 6 pages, Doc 023.
EP Application No. 18866764: Amendment filed Nov. 25, 2020, 12 pages, Doc 024.
EP Application No. 18866764: EP Search Report and Opinion dated Jun. 8, 2021, 10 pages, Doc 025.
EP Application No. 18866764: Rule 70 Communication dated Jun. 25, 2021, 1 page, Doc 026.
EP Application No. 18866764: Notice of Loss of Rights dated Jan. 25, 2022, 2 pages, Doc 027.
U.S. Appl. No. 16/557,567: filed Aug. 30, 2019, 56 pages, Doc 028.
U.S. Appl. No. 16/557,567: Filing Receipt and Informational Notice issued Sep. 12, 2019, 5 pages, Doc 029.
U.S. Appl. No. 16/557,567: Notice of Publication issued Dec. 19, 2019, 1 page, Doc 030.

U.S. Appl. No. 16/557,567: Nonfinal Office Action issued Oct. 22, 2021, 14 pages, Doc 031.
U.S. Appl. No. 16/557,567: Amendment filed Apr. 22, 2022, 7 pages, Doc 032.
U.S. Appl. No. 16/557,567: Final Office Action dated May 12, 2022, 12 pages, Doc 033.
U.S. Appl. No. 16/557,567: Notice of Appeal filed Nov. 14, 2022, 3 pages, Doc 034.
U.S. Appl. No. 16/557,567: Appeal Brief filed Jan. 12, 2023, 20 pages, Doc 035.
U.S. Appl. No. 16/557,567: Examiner's Answer Brief dated Mar. 30, 2023, 12 pages, Doc 036.
U.S. Appl. No. 16/557,567: Appeal Board Decision dated May 23, 2024, 14 pages, Doc 037.
U.S. Appl. No. 16/557,567: RCE and Amendment filed Jul. 23, 2024, 19 pages, Doc 038.
U.S. Appl. No. 16/557,567: Nonfinal Office Action dated Aug. 8, 2024, 22 pages, Doc 039.
U.S. Appl. No. 16/557,567: Amendment filed Dec. 9, 2024, 18 pages, Doc 040.
U.S. Appl. No. 16/588,158: Patent Application filed Sep. 30, 2019, 68 pages, Doc 041.
U.S. Appl. No. 16/588,158: Filing Receipt and Informational Notice dated Oct. 17, 2019, 5 pages, Doc 042.
U.S. Appl. No. 16/588,158: Notice of Publication dated Jan. 23, 2020, 1 page, Doc 043.
U.S. Appl. No. 16/588,158: Nonfinal Office Action dated May 27, 2020, 14 pages, Doc 044.
U.S. Appl. No. 16/588,158: Amendment filed Oct. 27, 2020, 15 pages, Doc 045.
U.S. Appl. No. 16/588,158: Final Office Action date Nov. 10, 2020, 17 pages, Doc 046.
U.S. Appl. No. 16/588,158: Notice of Appeal filed Apr. 12, 2021, 2 pages, Doc 047.
U.S. Appl. No. 16/588,158: Appeal Brief filed Jun. 14, 2021, 19 pages, Doc 048.
U.S. Appl. No. 16/588,158: Nonfinal Office Action dated Nov. 12, 2021, 12 pages, Doc 049.
U.S. Appl. No. 16/588,158: Amendment filed May 12, 2022, 10 pages, Doc 050.
U.S. Appl. No. 16/588,158: Final Office Action dated Sep. 9, 2022, 13 pages, Doc 051.
U.S. Appl. No. 16/588,158: RCE and Amendment filed Mar. 7, 2023, 14 pages, Doc 052.
U.S. Appl. No. 16/588,158: Nonfinal Office Action dated Mar. 30, 2023, 14 pages, Doc 053.
U.S. Appl. No. 16/588,158: Amendment filed Aug. 30, 2023, 12 pages, Doc 054.
U.S. Appl. No. 16/588,158: Notice of Allowance date Oct. 2, 2023, 12 pages, Doc 055.
U.S. Appl. No. 16/588,158: Issue Fee Payment and 312 filed Oct. 27, 2023, 3 pages, Doc 056.
U.S. Appl. No. 16/588,158: Response to 312 Amendment dated Nov. 9, 2023, 2 pages, Doc 057.
U.S. Appl. No. 16/588,158: Issue Notification dated Nov. 22, 2023, 2 pages, Doc 058.
U.S. Appl. No. 18/500,299: Patent Application filed Nov. 2, 2023, 70 pages, Doc 059.
U.S. Appl. No. 18/500,299: Filing Receipt and notice to File Missing Parts dated Nov. 16, 2023, 6 pages, Doc 060.
U.S. Appl. No. 18/500,299: Response to Notice of Missing Parts filed Jun. 17, 2024, 7 pages, Doc 061.
U.S. Appl. No. 18/500,299: Preliminary Amendment filed Jun. 17, 2024, 12 pages, Doc 062.
U.S. Appl. No. 18/500,299: Updated Filing Receipt dated Jul. 1, 2024, 4 pages, Doc 063.
U.S. Appl. No. 18/500,299: Nonfinal Office Action dated Sep. 29, 2024, 14 pages, Doc 064.
U.S. Appl. No. 18/500,299: Notice of Publication dated Oct. 10, 2024, page, Doc 065.
U.S. Appl. No. 62/571,724: US Provisional Application filed Oct. 12, 2017, 128 pages, Doc 068.

(56) References Cited

OTHER PUBLICATIONS

U.S. Appl. No. 62/571,724: Filing Receipt and Notice to File Missing Parts dated Oct. 24, 2017, 5 pages, Doc 069.

U.S. Appl. No. 62/571,724: Response to Notice of Missing Parts filed Dec. 21, 2017, 5 pages, Doc 070.

U.S. Appl. No. 62/571,724: Updated Filing Receipt dated Dec. 26, 2017, 3 pages, Doc 071.

U.S. Appl. No. 63/562,679: US Provisional Application filed Mar. 7, 2024, 658 pages, Doc 072.

U.S. Appl. No. 63/562,679: Filing Receipt dated Mar. 15, 2024, 3 pages, Doc 073.

U.S. Appl. No. 63/719,816: US filed Nov. 13, 2024, 351 pages, Doc 074.

U.S. Appl. No. 63/719,816: Nov. 19, 2024, 3 pages, Doc 075.

* cited by examiner

302
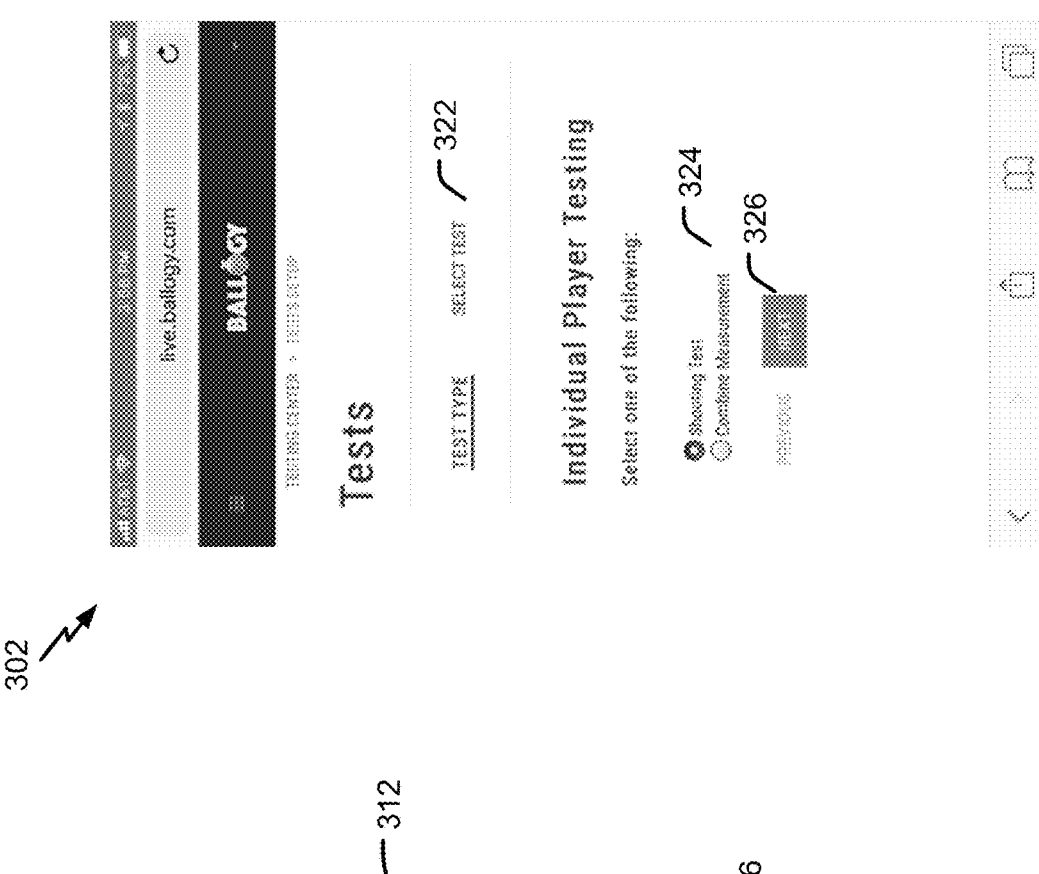
300
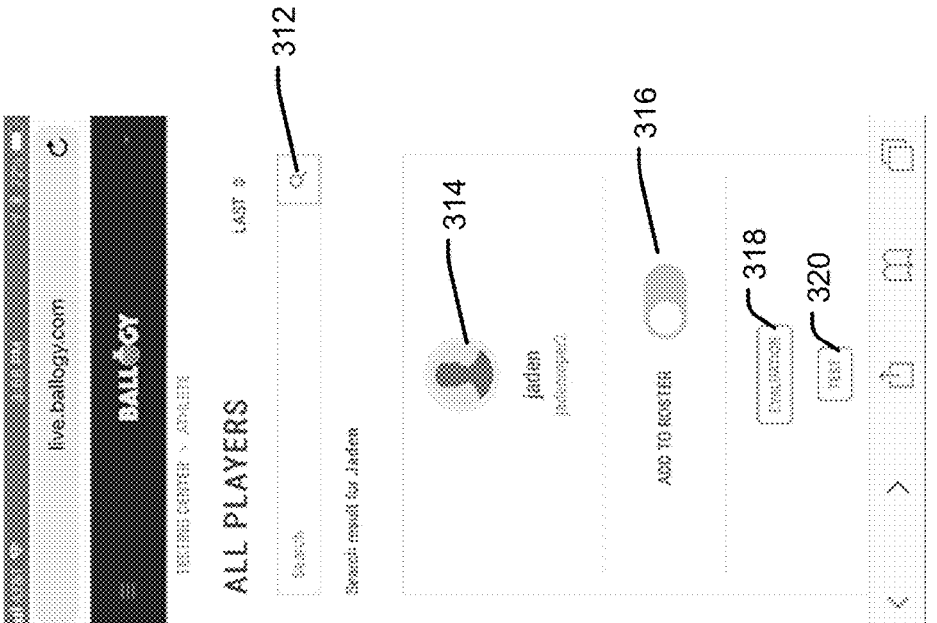
FIG. 3

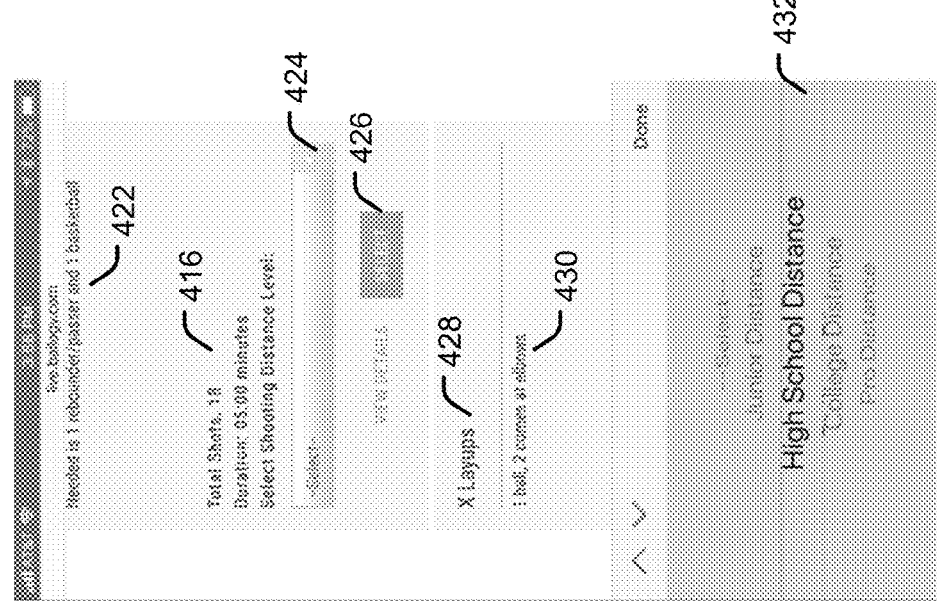
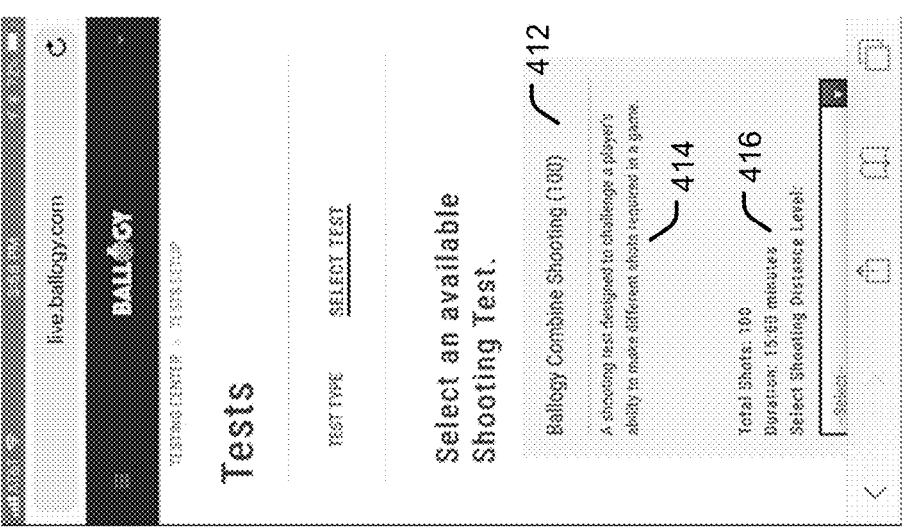
FIG. 4

600

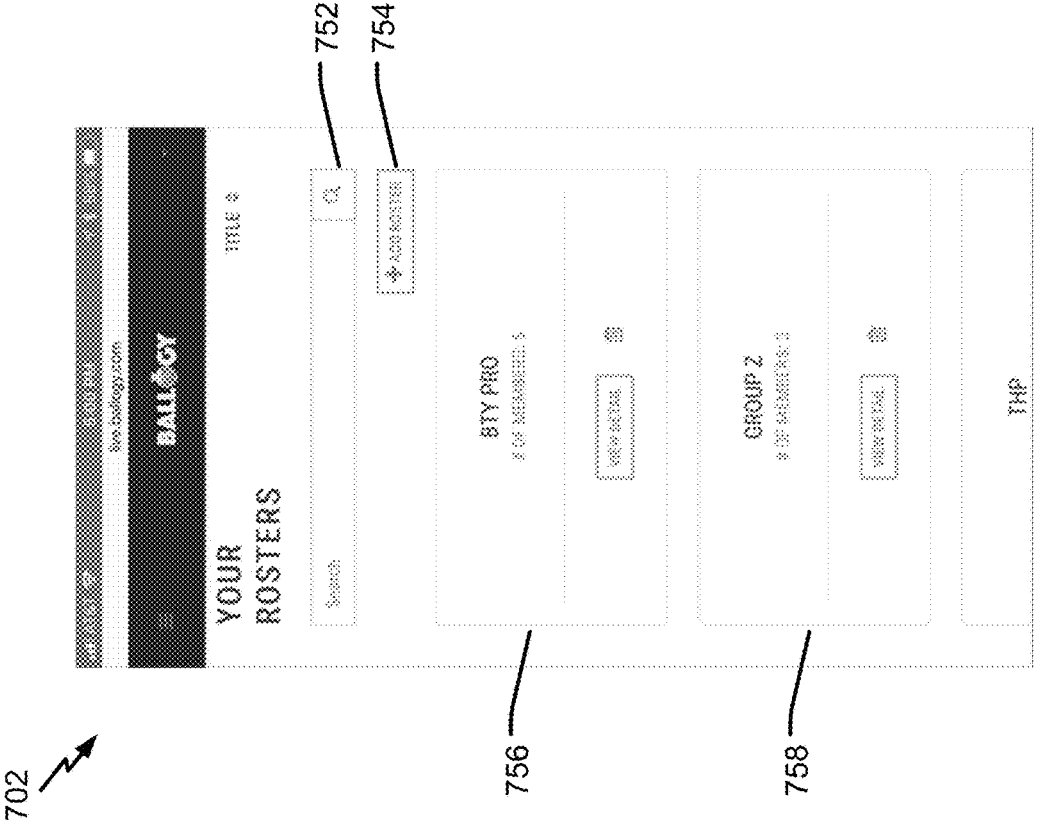
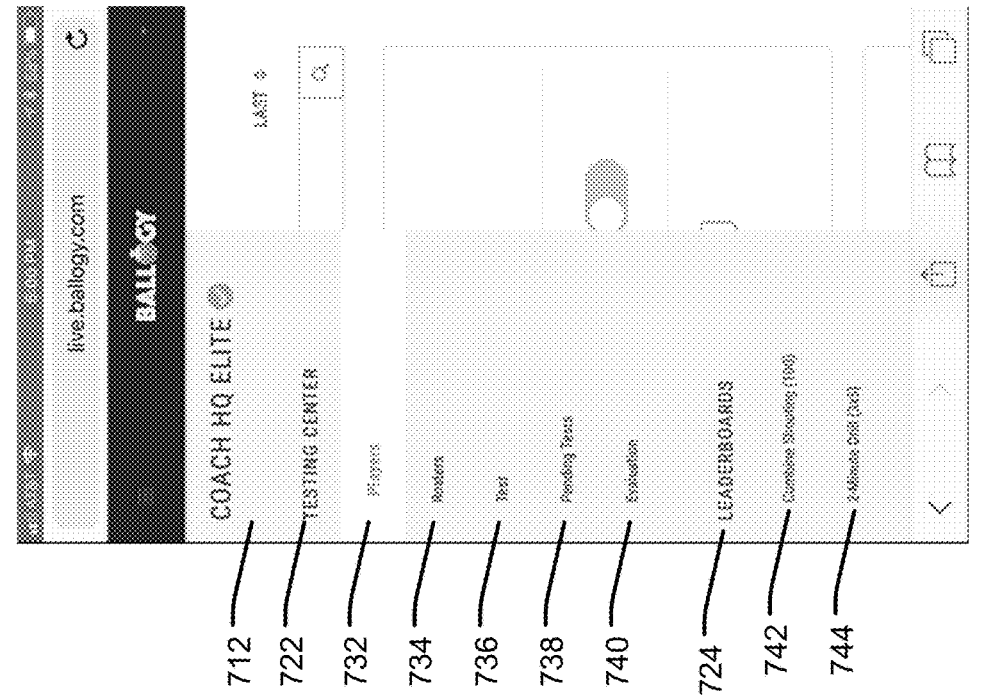
FIG. 7

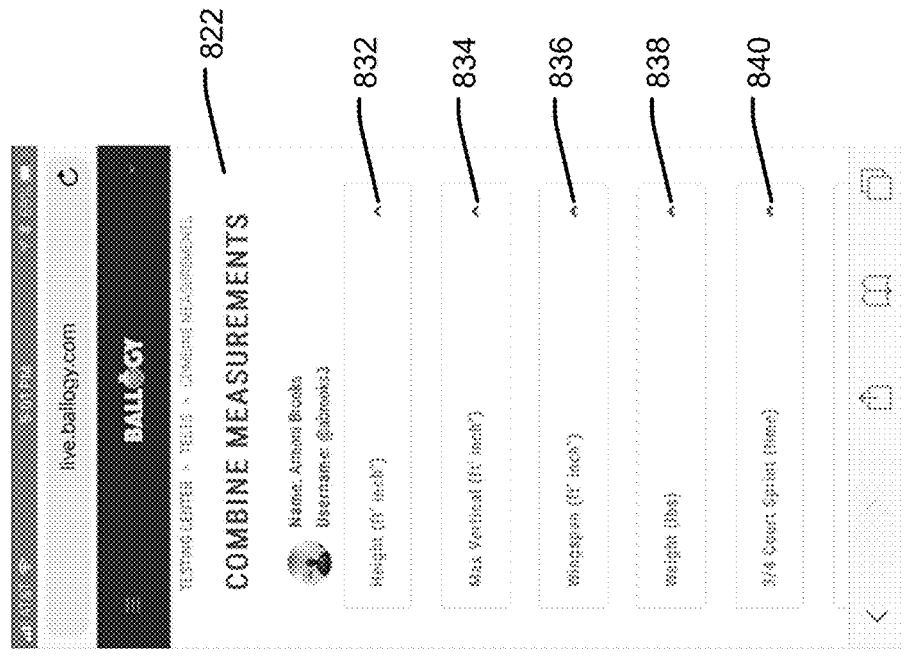
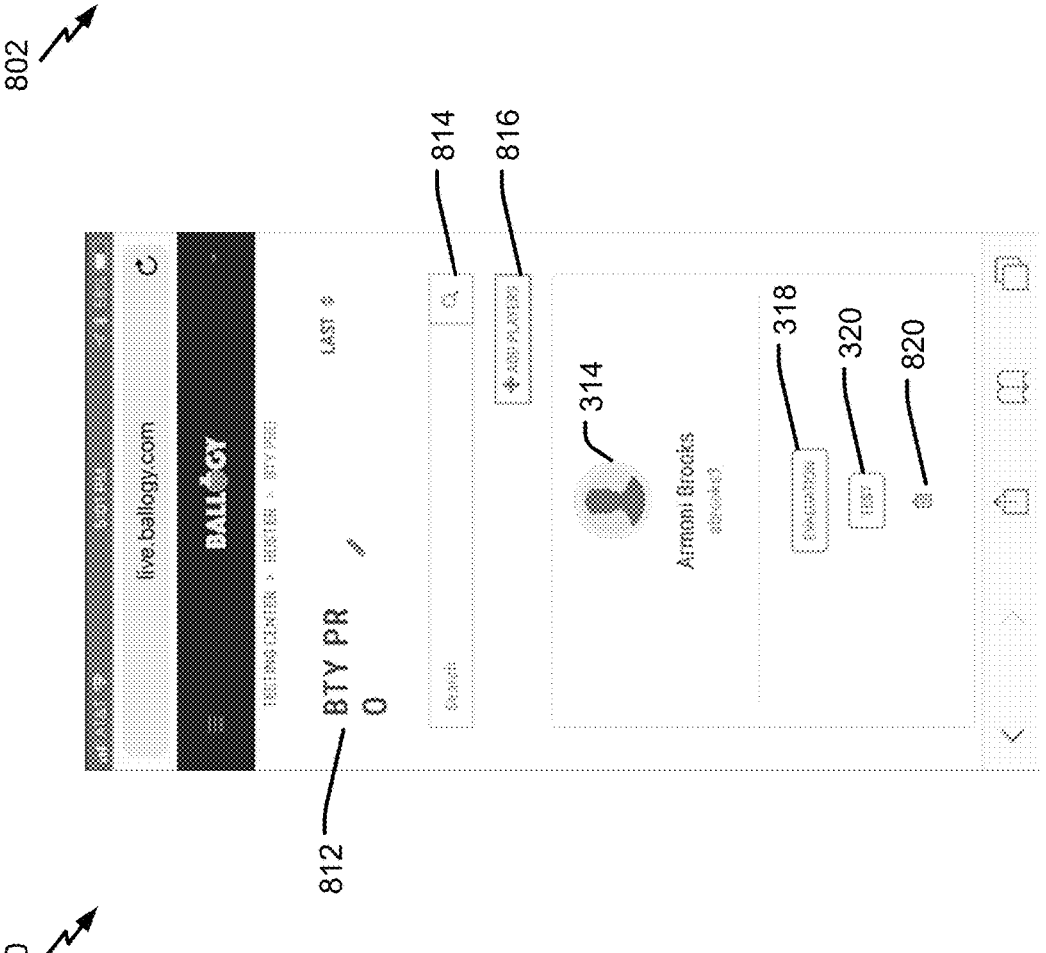
FIG. 8

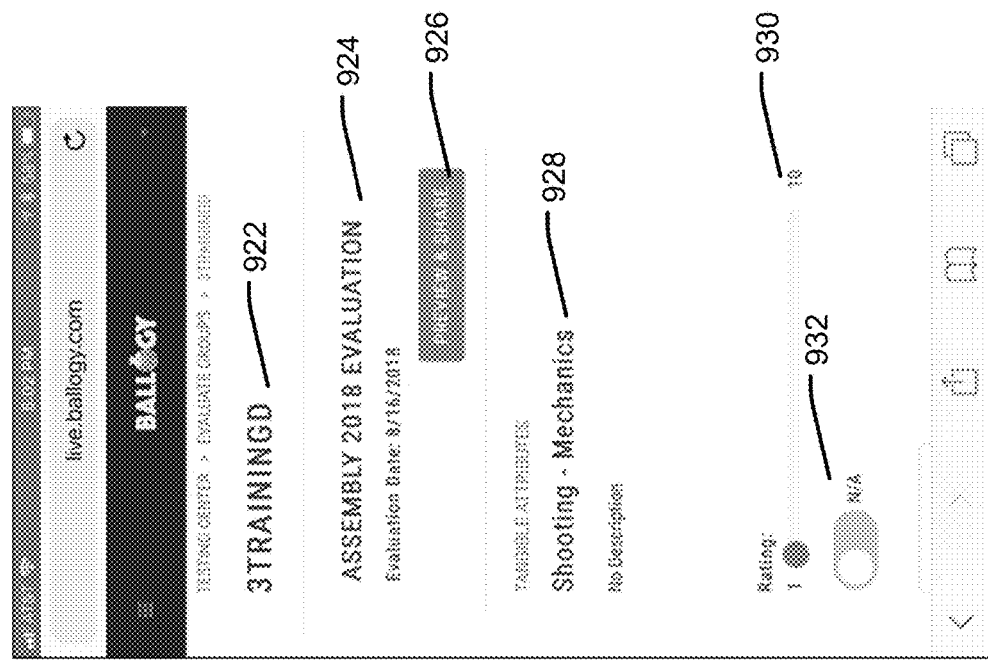
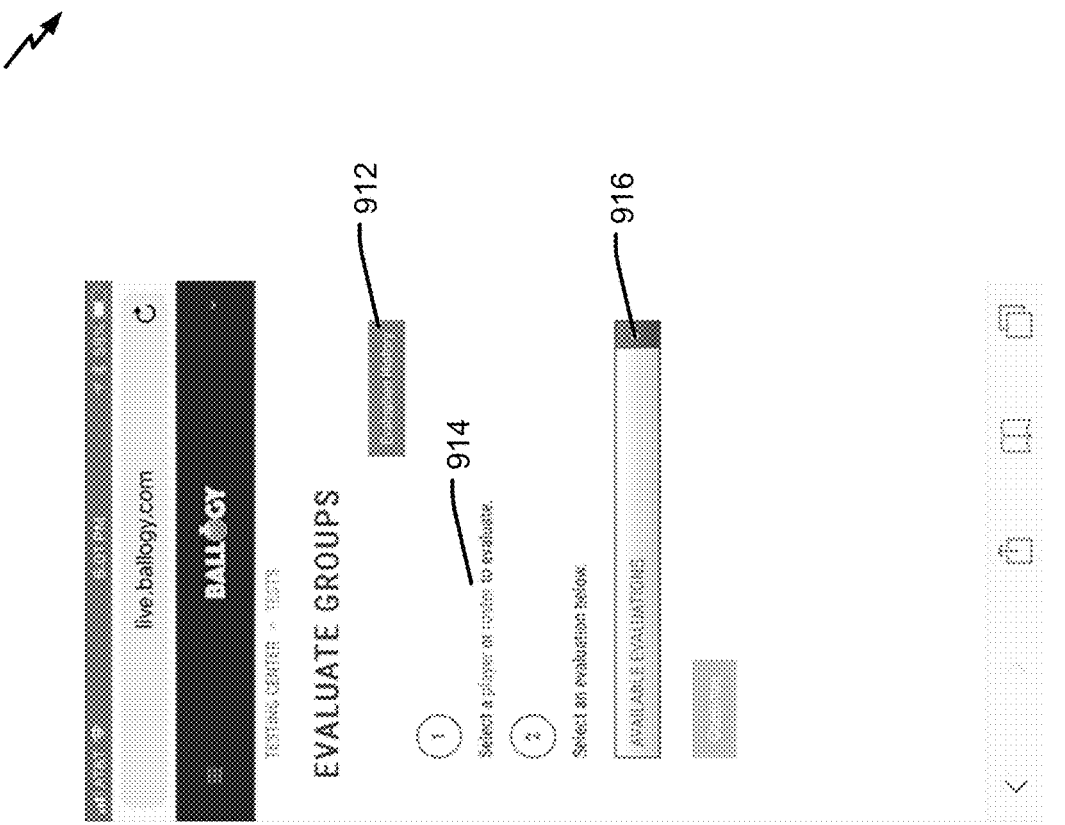
FIG. 9

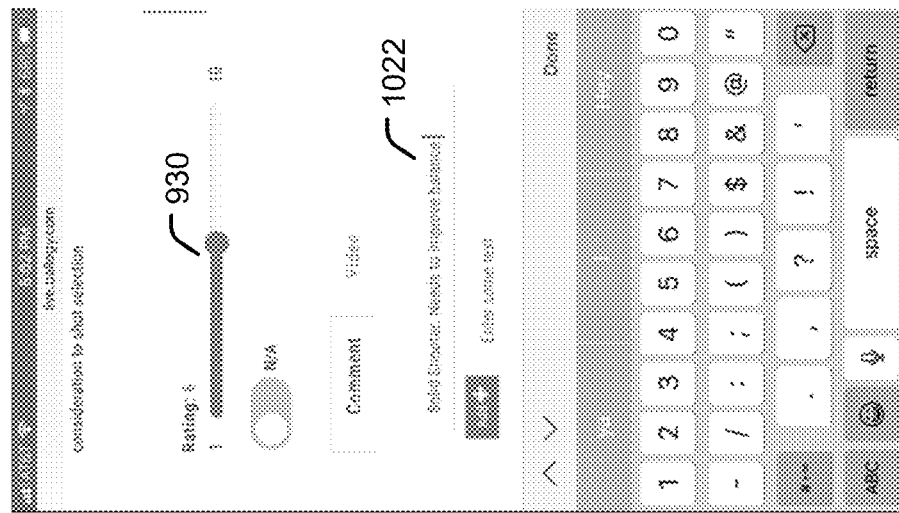
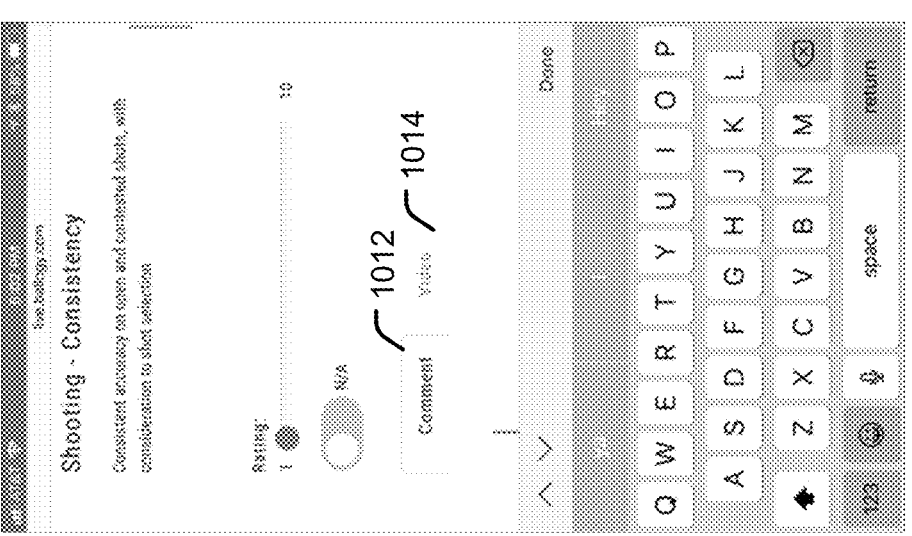
FIG. 10

1200
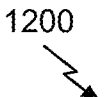
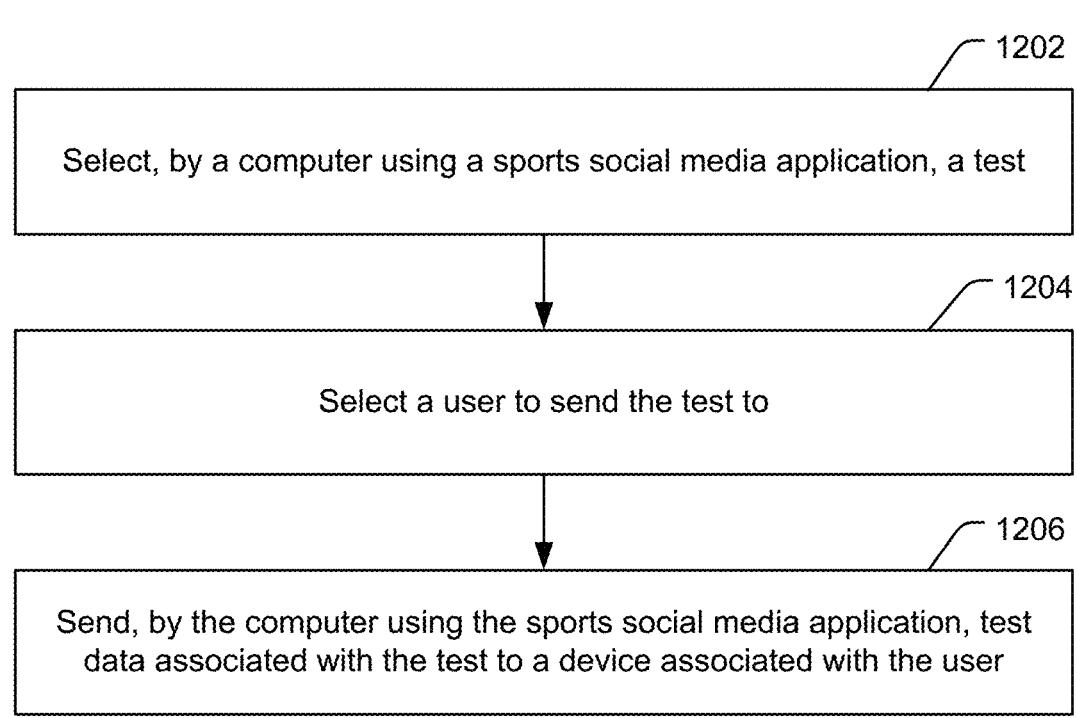
1202
Select, by a computer using a sports social media application, a test
1204
Select a user to send the test to
1206
Send, by the computer using the sports social media application, test data associated with the test to a device associated with the user
FIG. 12

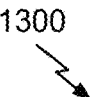

1300

┌─────────────────────────────────────────────────────────────┐ ⌐1302
│                                                             │
│   Search, by a computer using a sports social media application, for a user   │
│                                                             │
└─────────────────────────────────────────────────────────────┘
                              │
                              ▼
┌─────────────────────────────────────────────────────────────┐ ⌐1304
│                                                             │
│                      Select the user                        │
│                                                             │
└─────────────────────────────────────────────────────────────┘
                              │
                              ▼
┌─────────────────────────────────────────────────────────────┐ ⌐1306
│                                                             │
│                   Select a test for the user                │
│                                                             │
└─────────────────────────────────────────────────────────────┘
                              │
                              ▼
┌─────────────────────────────────────────────────────────────┐ ⌐1308
│                                                             │
│                Initiate administration of the test          │
│                                                             │
└─────────────────────────────────────────────────────────────┘
                              │
                              ▼
┌─────────────────────────────────────────────────────────────┐ ⌐1310
│                                                             │
│          Generate test performance data based on the test   │
│                                                             │
└─────────────────────────────────────────────────────────────┘
                              │
                              ▼
┌─────────────────────────────────────────────────────────────┐ ⌐1312
│                                                             │
│   Send, by the computer using the sports social media application, the test   │
│                      performance data                       │
└─────────────────────────────────────────────────────────────┘

Receive, at a computer via a sports social media application, test data to be performed by a user associated with the computer

1404

Initiate a test based on the test data

1406

Capture video of the user performing the test

1408

Generate test performance data based on the video

1410

Send, by the computer, the test performance data via the sports social media application

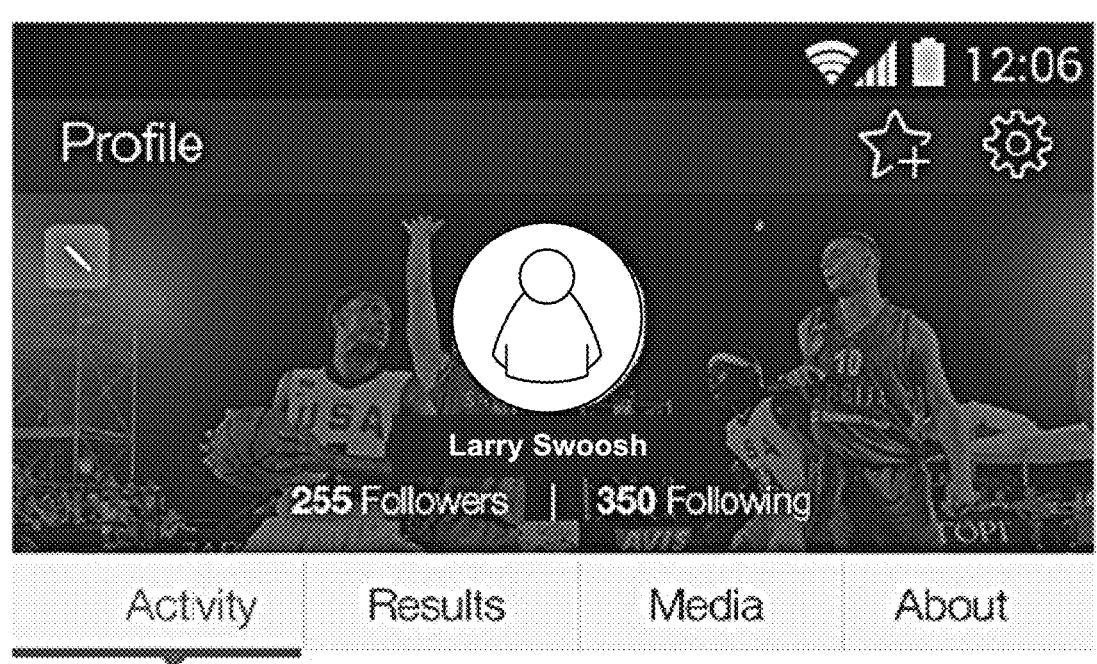
Profile
Larry Swoosh
255 Followers  |  350 Following
Actvity    Results    Media    About
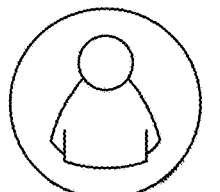
Larry Swoosh
29 Sep at 2:45 am
Unreal, I just watched this and he pulled it off..
gave me cholls it was like watching the Red Bull Stratos.
 192 Likes    5 Comments
 Add comment...
      
FIG. 29

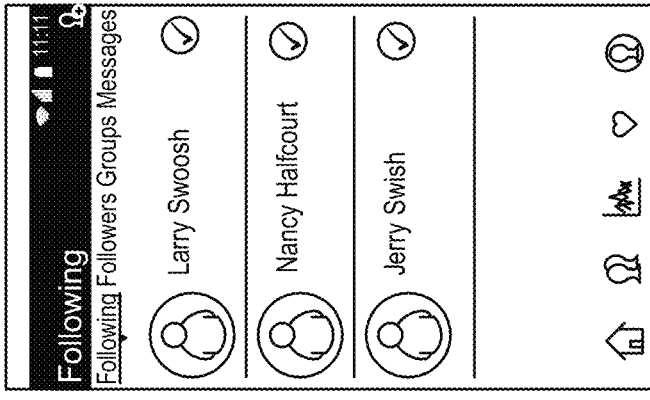
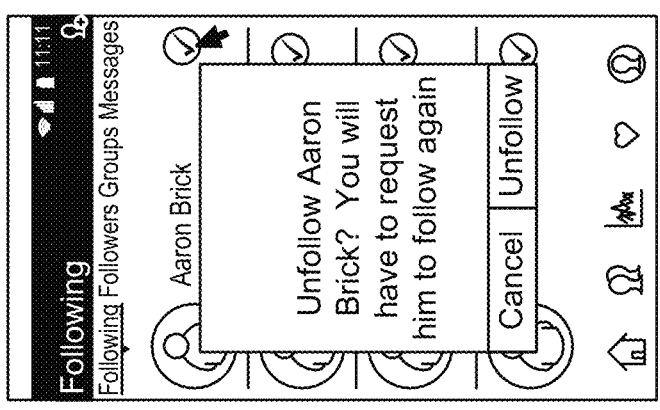
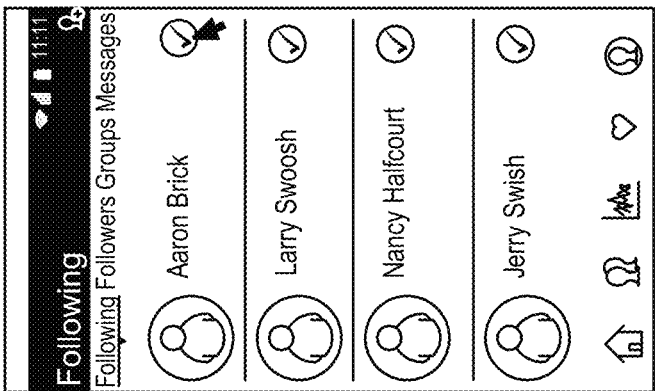
FIG. 30

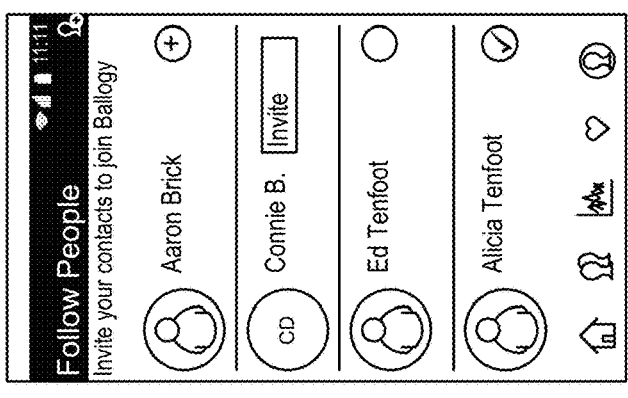
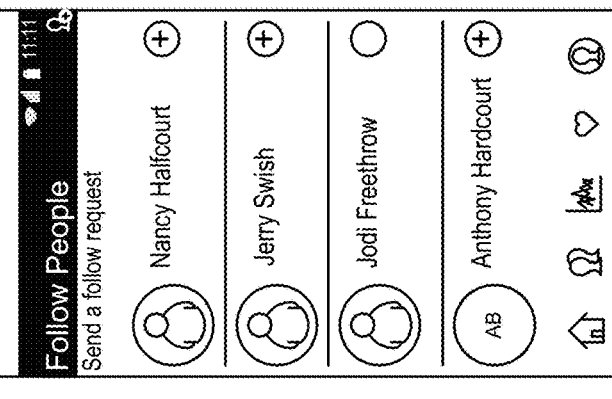
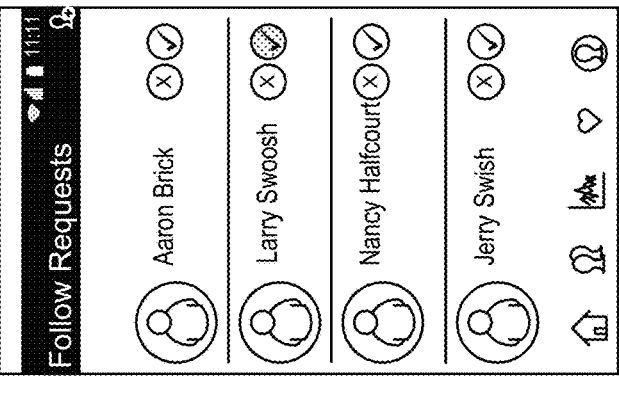
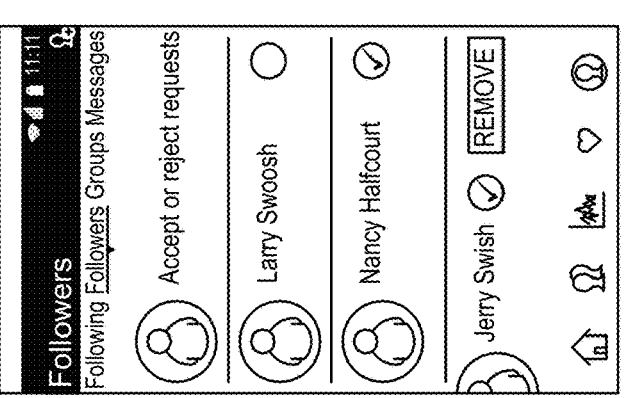
FIG. 31

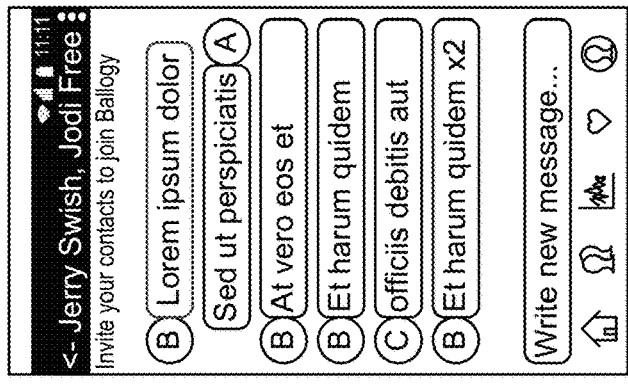
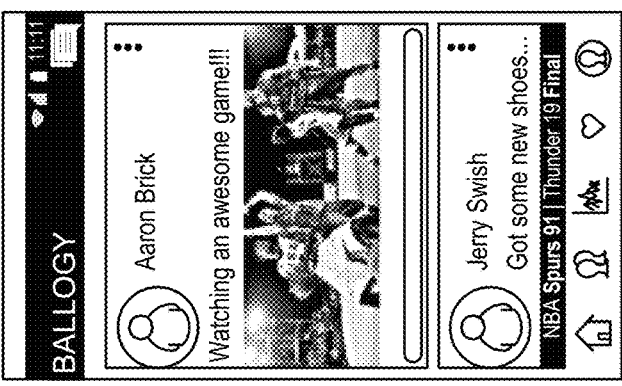
FIG. 32

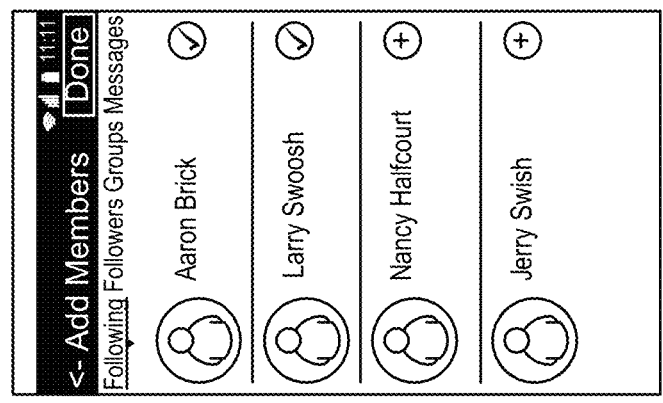
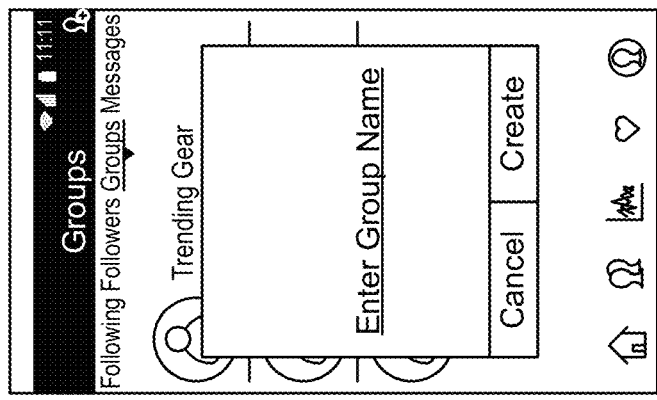
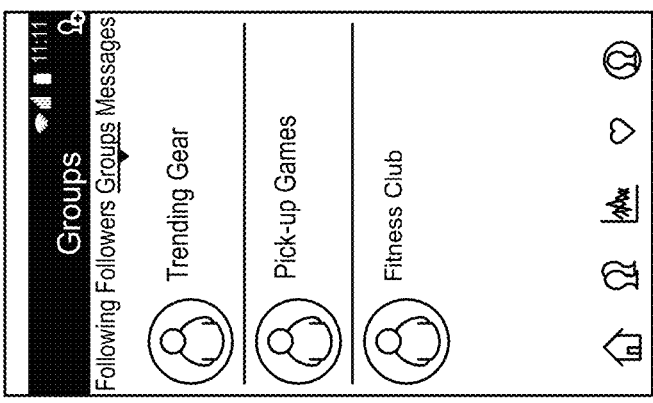
FIG. 33

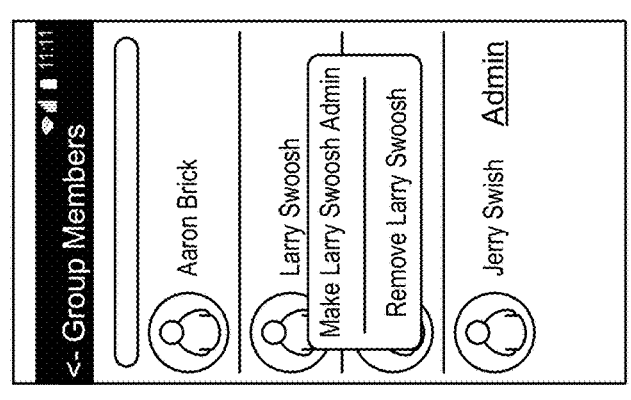
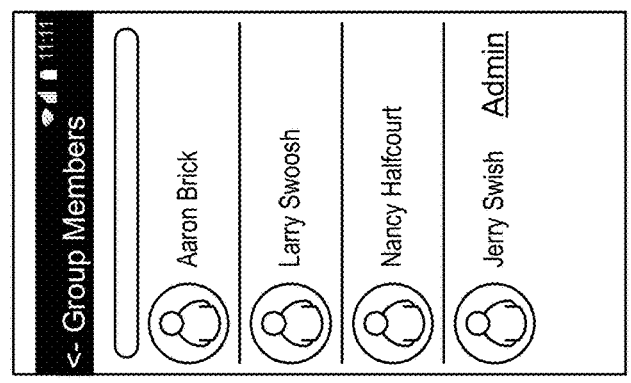
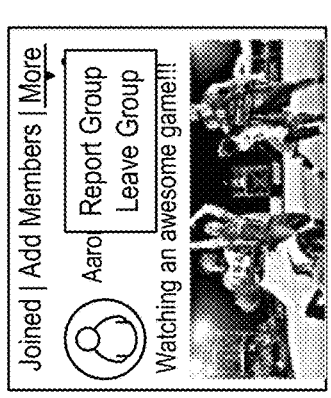
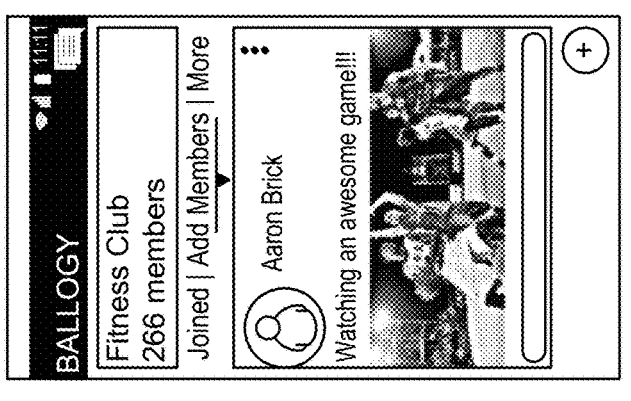
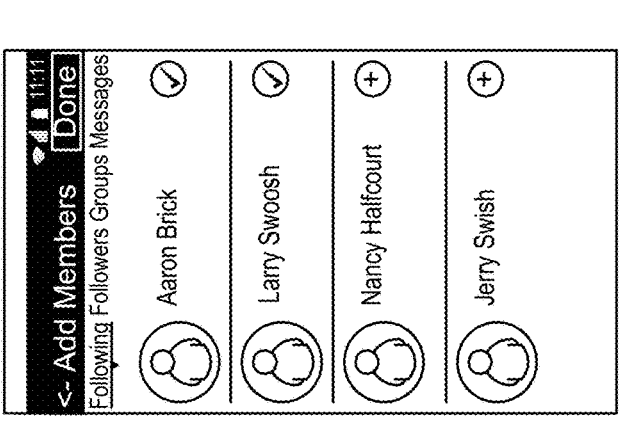
FIG. 34

Catch & Shoot 3's
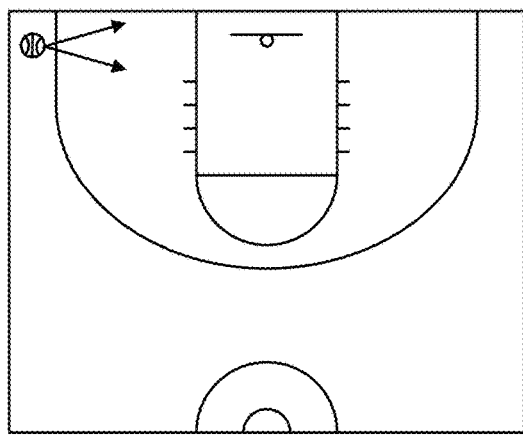
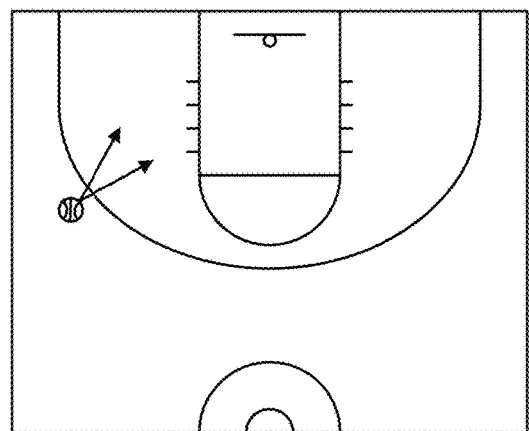
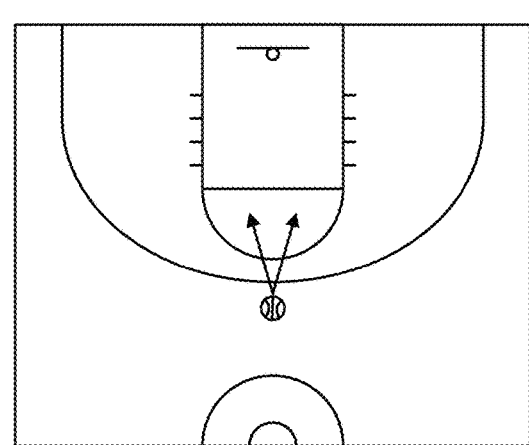
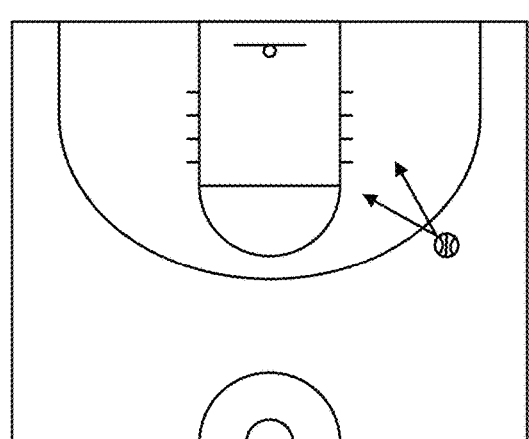
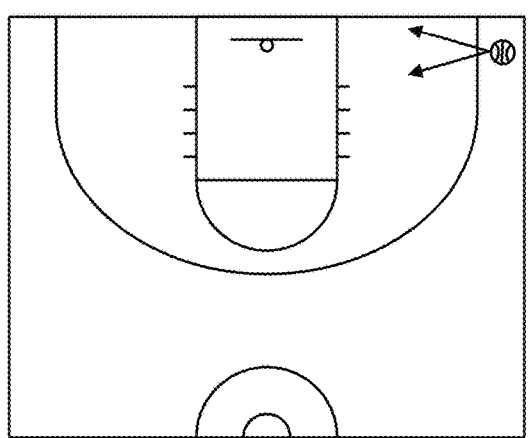
FIG. 35

2-minute drill

Needed: One rebounder/passer and one basketball

The shooter has two minutes to make 15 total catch & shoot 3's, three from each spot. The shooter cannot move on to next spot until he/she has made three catch & shoot 3's. If the shooter does not make 15 shots in two minutes or less, they get a score (e.g., 13). If the shooter does make 15 shots in 2 minutes or less, they get a time (e.g., 1m37s).

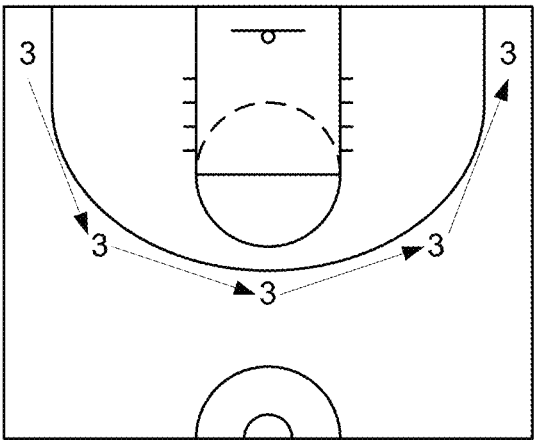

FIG. 36

37
Needed:  One rebounder/passer and one basketball
The shooter will attempt five catch & shoot 3's (one at each spot), five 1-dribble
pull-ups going left (one at each spot), five 1-dribble pull-ups going right (one at
each spot) and two free throws.
Catch & Shoot 3's are worth three points each
Pulls-ups are worth two points each
Free Throws are worth one point each
Perfect score is 37

Catch & Shoot 3's

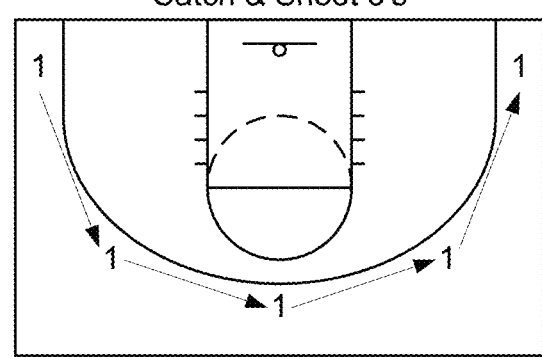

1-dribble pull-up going left

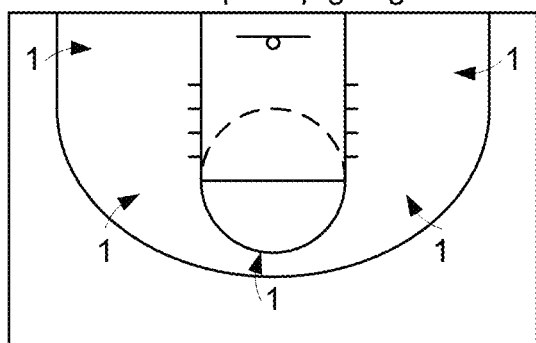

1-dribble pull-up going right

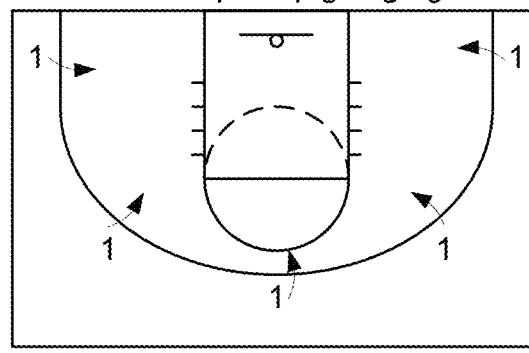

Free Throw

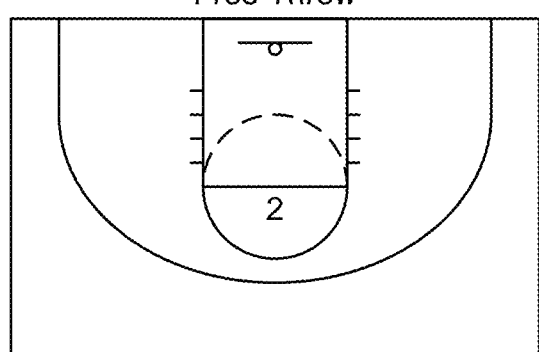

FIG. 37

Post 50
Needed:  One rebounder/passer and two basketballs
The shooter will attempt 50 total shot attempts, trying to get the best score possible out of 50.  The shooter will pick up the basketball from the floor and dribble to the middle of the lane for 10 total Jump hooks (5 each side), 10 total drop step Jump hooks (5 each side), 10 total up & under finishes (5 each side), 10 total up & step thru finishes (5 each side).  The shooter will then finish with 10 free throw attempts.

Jump Hooks

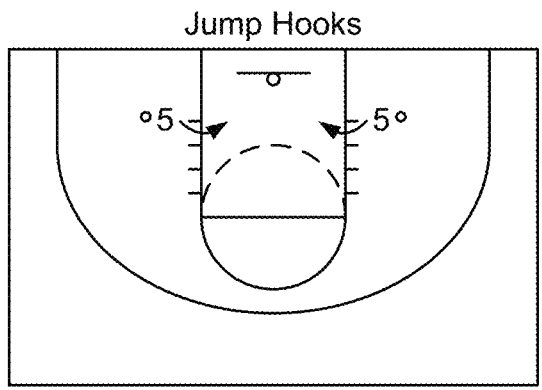

Drop Step Hooks

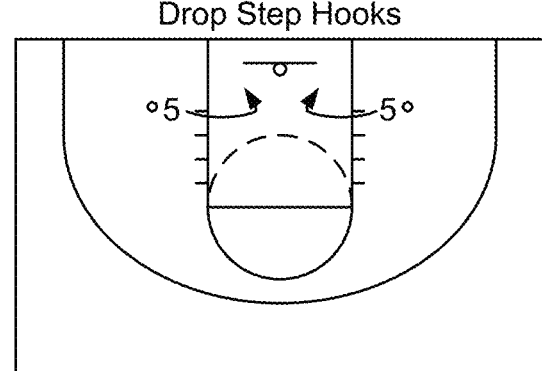

Up & Under

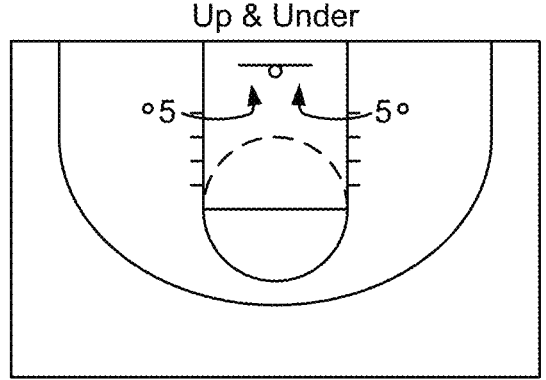

Up & Step Thru

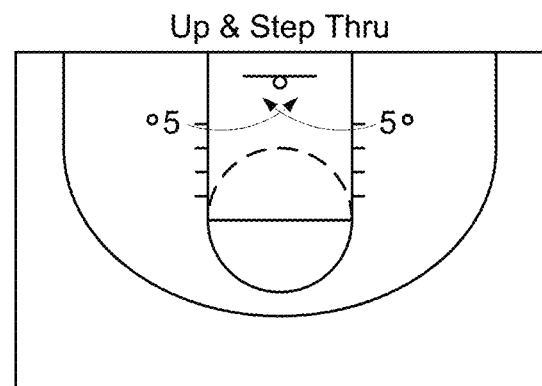

Free Throws

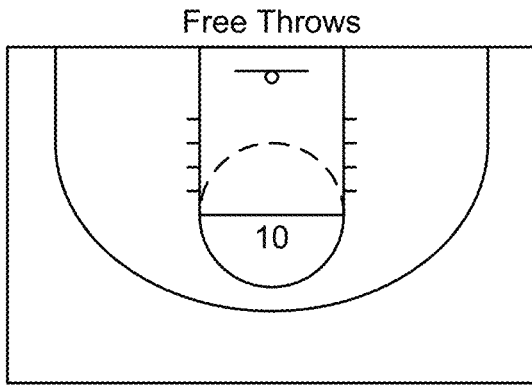

FIG. 38

Pin Shooting
Needed: One rebounder/passer and one basketball
The shoot will make 30 total pin screen shots in as little time as possible. The shooter will make 10 total pin curls (5 each side), 10 total pin straight cut 3's (5 each side), 10 total pin fade 3's (5 each side).
Pin Curl Mid-range
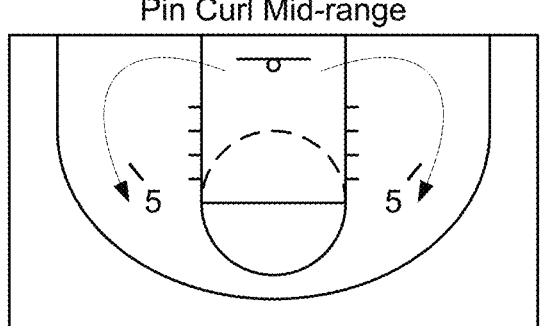
Pin Straight Cut 3's
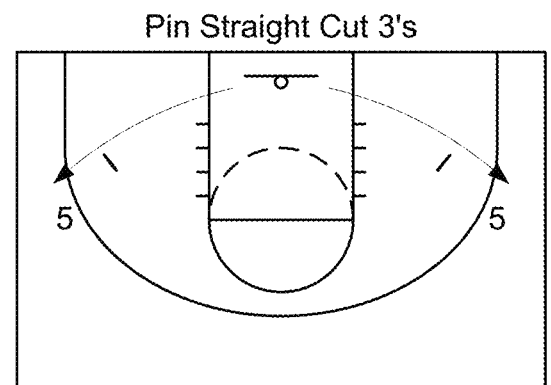
Pin Fade 3's
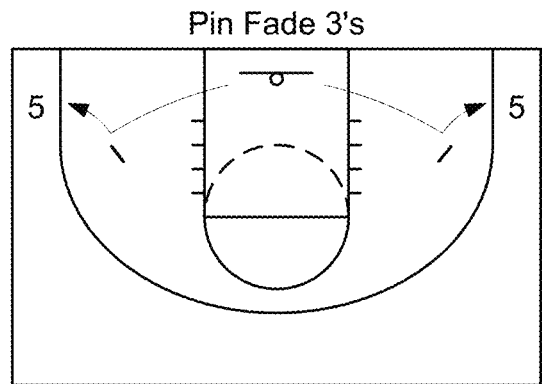
FIG. 39

Post Shooting
Needed: One rebounder/passer and one basketball
The shooter will attempt 100 total shots, trying to get the best score out of 100.
The shooter will attempt 25 total mid-range catch & shoot (5 each spot), 20 total
post reaction shots (5 of each), 25 total catch & shoot 3's (5 each spot), 20 total
pick & pop (10 mid-range, 10 3's), and 10 free throws.

Mid range catch & shoot

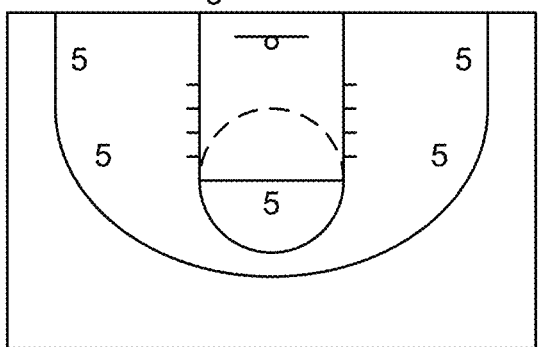

Post Reaction

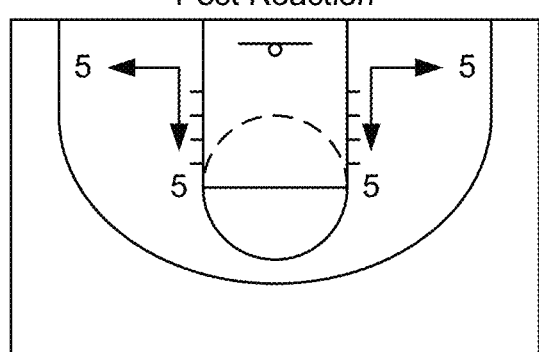

Catch & Shoot 3's

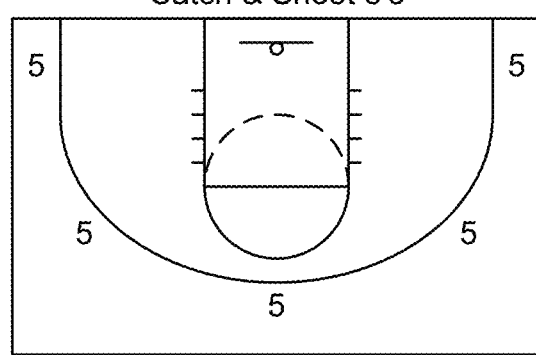

Pick & Pop

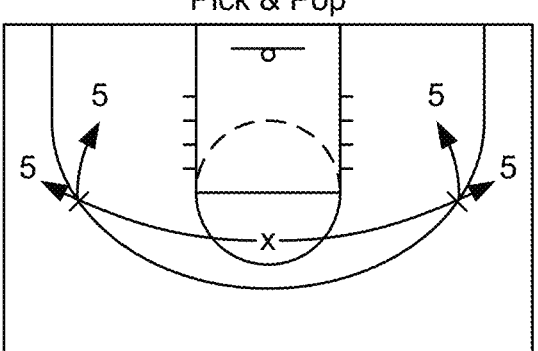

Free Throws

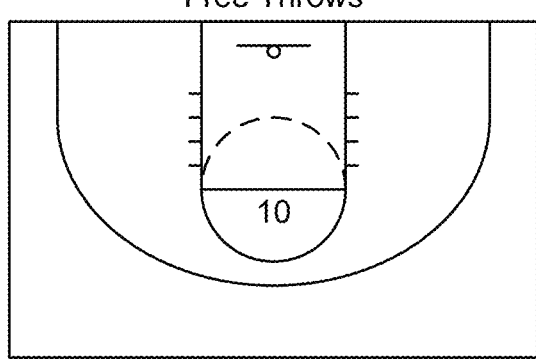

FIG. 40

Life/Drift Shooting
Needed:  One rebounder/passer and one basketball
The shooter will make 20 total catch & shoot 3's on the move in as little time as possible.  The shooter will make 10 total drift 3's (5 each side), and 10 total lift 3's (5 each side).
Drift 3's                                    Lift 3's
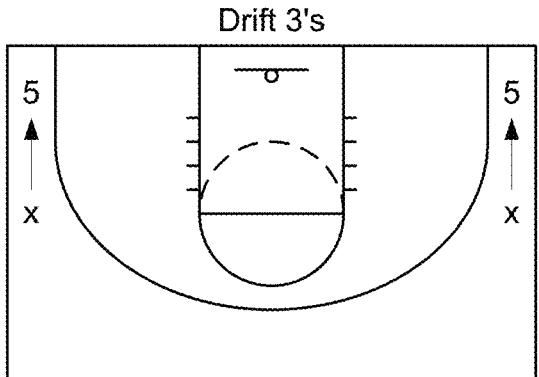
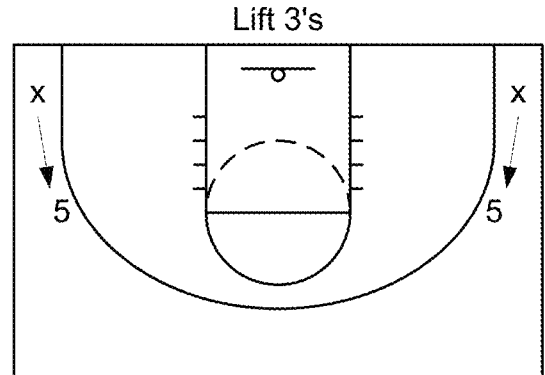
FIG. 41

Point Guard Transition Shooting
Needed is one rebounder/passer and one basketball.
The shooter will attempt 50 total shots, trying to get the best score out of 50. The shooter will attempt 10 total mid-range pull-ups (5 each side), 10 total change of direction mid-range pull-ups (5 each side), 10 total pull-up 3's (5 each side), 10 total change of direction pull-up 3's (5 each side), 10 total free throw attempts.

Straight Mid-range Pull-up

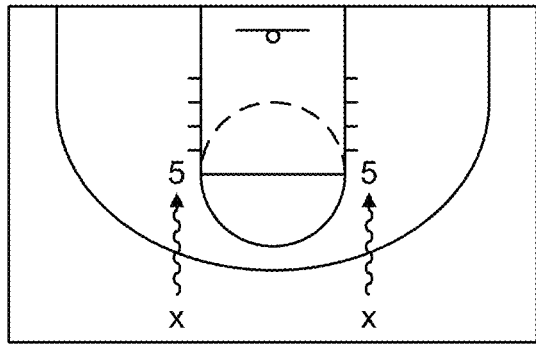

Change of direction mid-range pull-up

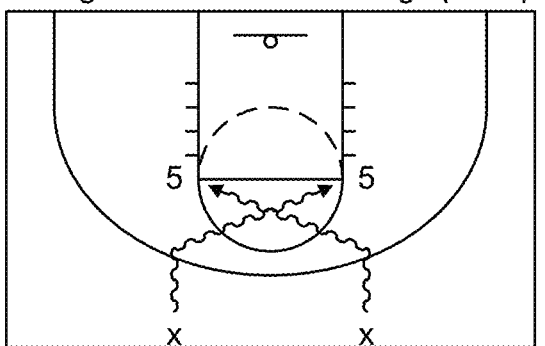

Straight Pull-up 3

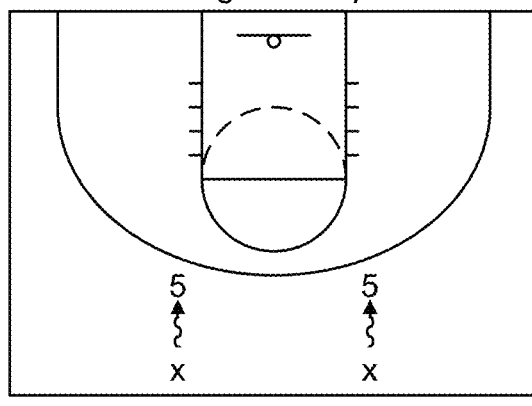

Change of direction pull-up 3

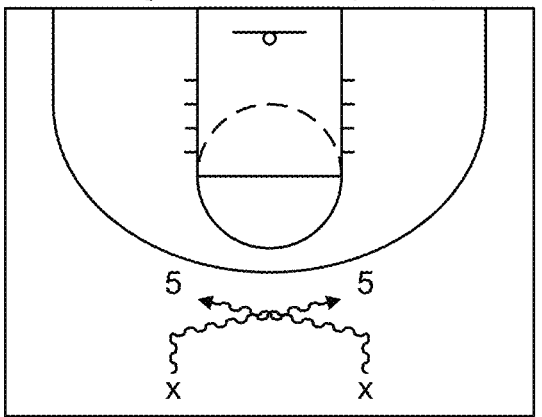

Free Throws

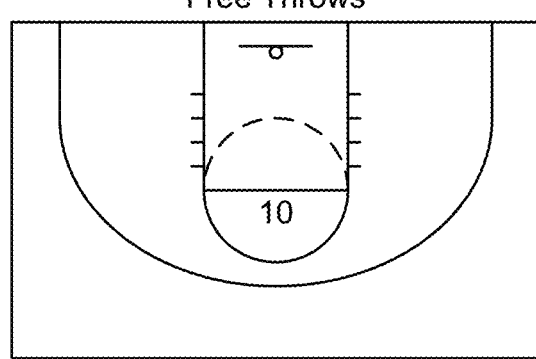

FIG. 42

Ballogy Combine Shooting (300)

Player will complete all three rounds of each shot before moving on to the next type of shot Rd.1
10 attempts from l.corner to l.elbow area (x1)
10 attempts from l.elbow area to r.elbow area (x2)
10 attempts from r.elbow area to r.corner (x3)
Rd.2
10 attempts from l.corner to l.elbow area (x1)
10 attempts from l.elbow area to r.elbow area (x2)
10 attempts from r.elbow area to r.corner (x3)
Rd.3
10 attempts from l.corner to l.elbow area (x1)
10 attempts from l.elbow area to r.elbow area (x2)
10 attempts from r.elbow area to r.corner (x3)
10 free throw attempts

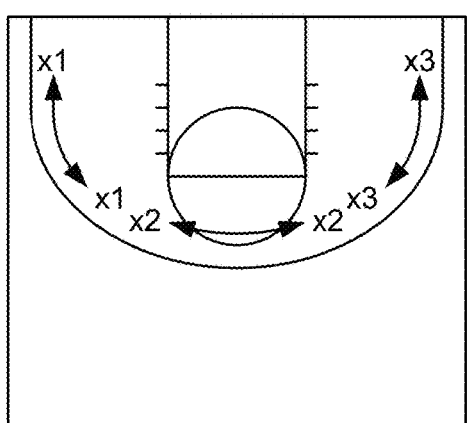

Pull-Ups:
Rd.1
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
Rd.2
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
Rd.3
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
10 free throw attempts

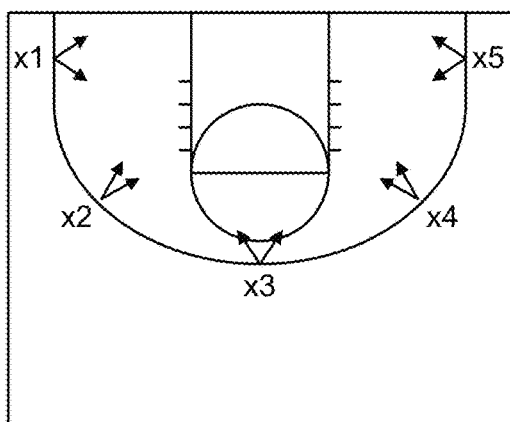

FIG. 43

Catch & Shoot 3's:
Rd.1
6 attempts from l.corner (x1)
6 attempts from l.wing (x2)
6 attempts from top (x3)
6 attempts from r.wing (x4)
6 attempts from r.corner (x5)
Rd.2
6 attempts from l.corner (x1)
6 attempts from l.wing (x2)
6 attempts from top (x3)
6 attempts from r.wing (x4)
6 attempts from r.corner (x5)
Rd.3
6 attempts from l.corner (x1)
6 attempts from l.wing (x2)
6 attempts from top (x3)
6 attempts from r.wing (x4)
6 attempts from r.corner (x5)
10 free throw attempts

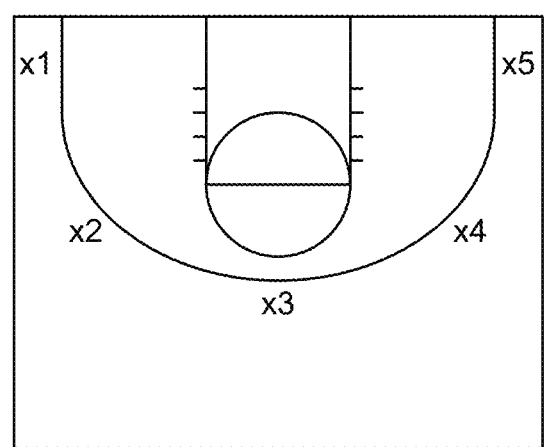

FIG. 44

Ballogy Combine Shooting (600)

Player will complete all three rounds of each shot before moving on to the next type of shot Catch & Shoot On The Move
Rd.1
10 attempts from l.corner to l.elbow area (x1)
10 attempts from l.elbow area to r.elbow area (x2)
10 attempts from r.elbow area to r.corner (x3)
Rd.2
10 attempts from l.corner to l.elbow area (x1)
10 attempts from l.elbow area to r.elbow area (x2)
10 attempts from r.elbow area to r.corner (x3)
Rd.3
10 attempts from l.corner to l.elbow area (x1)
10 attempts from l.elbow area to r.elbow area (x2)
10 attempts from r.elbow area to r.corner (x3)
Rd.3
10 attempts from l.corner to l.elbow area (x1)
10 attempts from l.elbow area to r.elbow area (x2)
10 attempts from r.elbow area to r.corner (x3)
Rd.3
10 attempts from l.corner to l.elbow area (x1)
10 attempts from l.elbow area to r.elbow area (x2)
10 attempts from r.elbow area to r.corner (x3)
Rd.3
10 attempts from l.corner to l.elbow area (x1)
10 attempts from l.elbow area to r.elbow area (x2)
10 attempts from r.elbow area to r.corner (x3)
20 free throw attempts

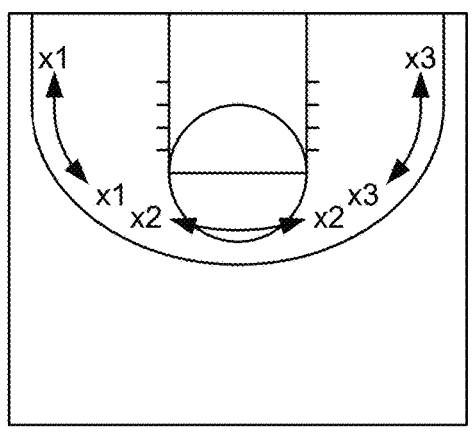

Pull-Ups:
Rd.1
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
Rd.2
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)

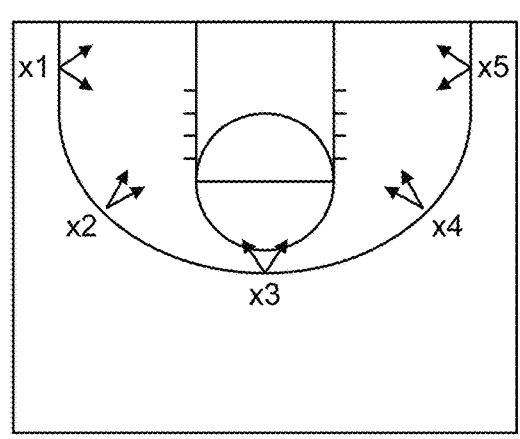

FIG. 45

Rd.3
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
Rd.4
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
Rd.5
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
Rd.6
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
20 free throw attempts Catch & Shoot 3's:
Rd.1
6 attempts from l.corner (x1)
6 attempts from l.wing (x2)
6 attempts from top (x3)
6 attempts from r.wing (x4)
6 attempts from r.corner (x5)
Rd.2
6 attempts from l.corner (x1)
6 attempts from l.wing (x2)
6 attempts from top (x3)
6 attempts from r.wing (x4)
6 attempts from r.corner (x5)
Rd.3
6 attempts from l.corner (x1)

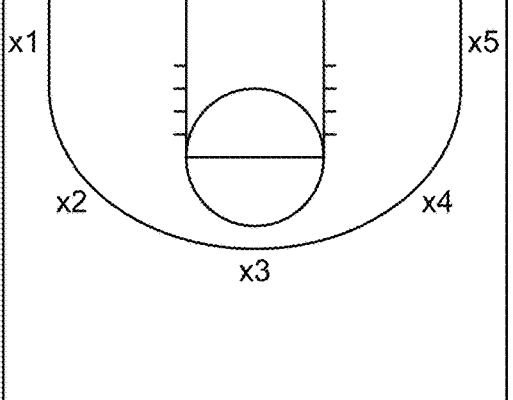

FIG. 46

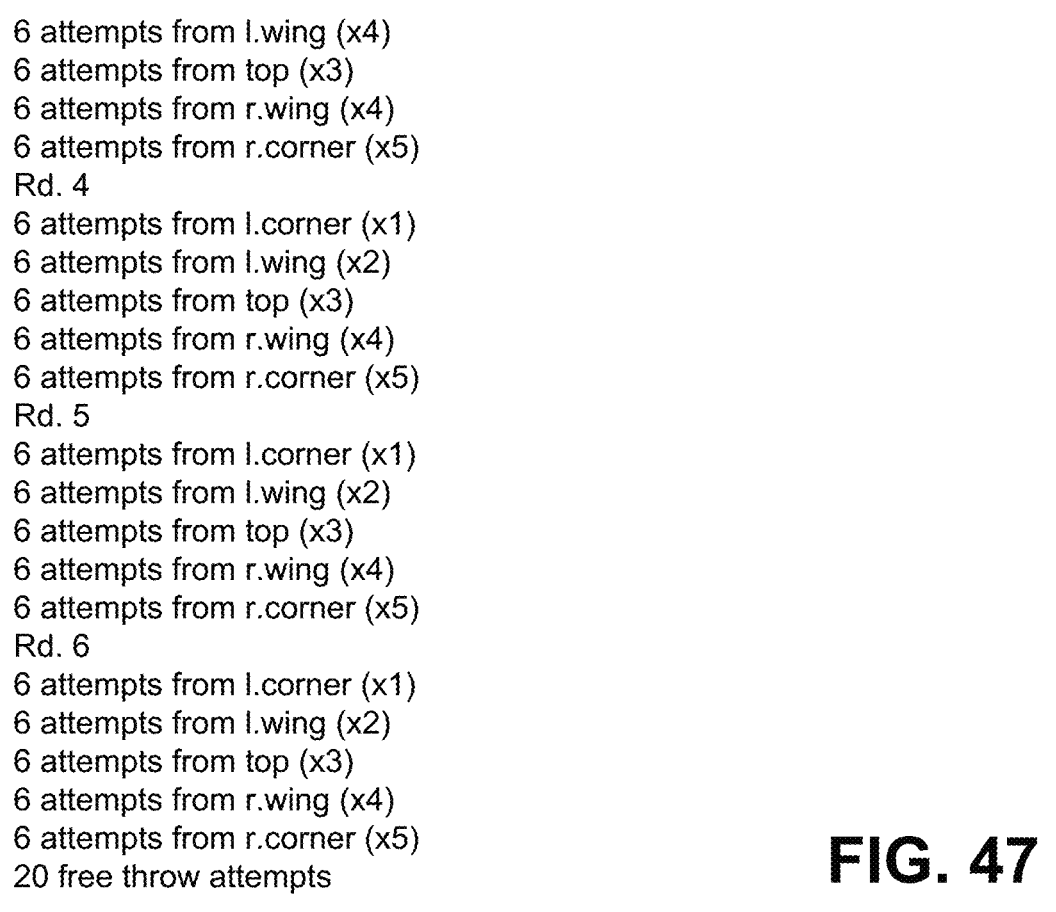

6 attempts from l.wing (x4)
6 attempts from top (x3)
6 attempts from r.wing (x4)
6 attempts from r.corner (x5)
Rd. 4
6 attempts from l.corner (x1)
6 attempts from l.wing (x2)
6 attempts from top (x3)
6 attempts from r.wing (x4)
6 attempts from r.corner (x5)
Rd. 5
6 attempts from l.corner (x1)
6 attempts from l.wing (x2)
6 attempts from top (x3)
6 attempts from r.wing (x4)
6 attempts from r.corner (x5)
Rd. 6
6 attempts from l.corner (x1)
6 attempts from l.wing (x2)
6 attempts from top (x3)
6 attempts from r.wing (x4)
6 attempts from r.corner (x5)
20 free throw attempts

FIG. 47

Ballogy Combine Shooting (1000)

Player will complete all six rounds of each shot
before moving on to the next type of shot Rd.1
10 attempts from l.corner to l.elbow area (x1)
10 attempts from l.elbow area to r.elbow area (x2)
10 attempts from r.elbow area to r.corner (x3)
Rd.2
10 attempts from l.corner to l.elbow area (x1)
10 attempts from l.elbow area to r.elbow area (x2)
10 attempts from r.elbow area to r.corner (x3)
Rd.3
10 attempts from l.corner to l.elbow area (x1)
10 attempts from l.elbow area to r.elbow area (x2)
10 attempts from r.elbow area to r.corner (x3)
Rd.4
10 attempts from l.corner to l.elbow area (x1)
10 attempts from l.elbow area to r.elbow area (x2)
10 attempts from r.elbow area to r.corner (x3)
Rd.5
10 attempts from l.corner to l.elbow area (x1)
10 attempts from l.elbow area to r.elbow area (x2)
10 attempts from r.elbow area to r.corner (x3)
Rd.6
10 attempts from l.corner to l.elbow area (x1)
10 attempts from l.elbow area to r.elbow area (x2)
10 attempts from r.elbow area to r.corner (x3)
Rd.7
10 attempts from l.corner to l.elbow area (x1)
10 attempts from l.elbow area to r.elbow area (x2)
10 attempts from r.elbow area to r.corner (x3)
Rd.8
10 attempts from l.corner to l.elbow area (x1)
10 attempts from l.elbow area to r.elbow area (x2)
10 attempts from r.elbow area to r.corner (x3)
Rd.9
10 attempts from l.corner to l.elbow area (x1)
10 attempts from l.elbow area to r.elbow area (x2)
10 attempts from r.elbow area to r.corner (x3)
Rd.10
10 attempts from l.corner to l.elbow area (x1)
10 attempts from l.elbow area to r.elbow area (x2)
10 attempts from r.elbow area to r.corner (x3)

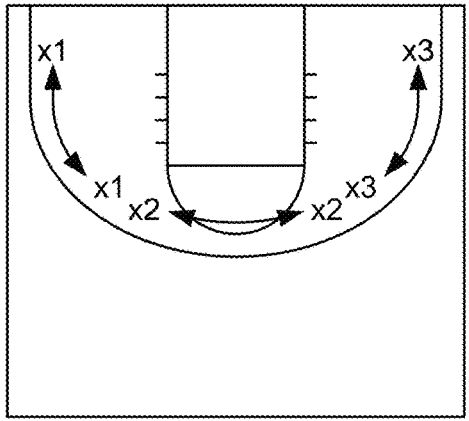

FIG. 48

6 attempts (3 left, 3 right) from r.wing (x4)
6 attempts (3 left, 3 right) from r.corner (x5)
Rd. 8
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
Rd. 9
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
Rd. 10
6 attempts (3 left, 3 right) from l.corner (x1)
6 attempts (3 left, 3 right) from l.wing (x2)
6 attempts (3 left, 3 right) from top (x3)
6 attempts (3 left, 3 right) from r.wing (x4)
6 attempts (3 left, 3 right) from r.corner (x5)
30 free throw attempts Catch & Shoot 3's
Rd. 1
6 attempts from l.corner (x1)
6 attempts from l.wing (x2)
6 attempts from top (x3)
6 attempts from r.wing (x4)
6 attempts from r.corner (x5)
Rd. 2
6 attempts from l.corner (x1)
6 attempts from l.wing (x2)
6 attempts from top (x3)
6 attempts from r.wing (x4)
6 attempts from r.corner (x5)
Rd. 3
6 attempts from l.corner (x1)
6 attempts from l.wing (x2)
6 attempts from top (x3)
6 attempts from r.wing (x4)

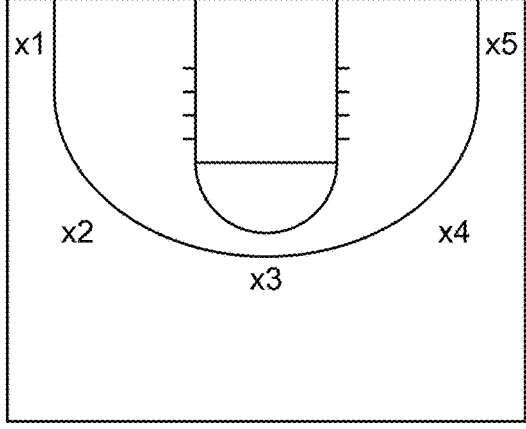

FIG. 49

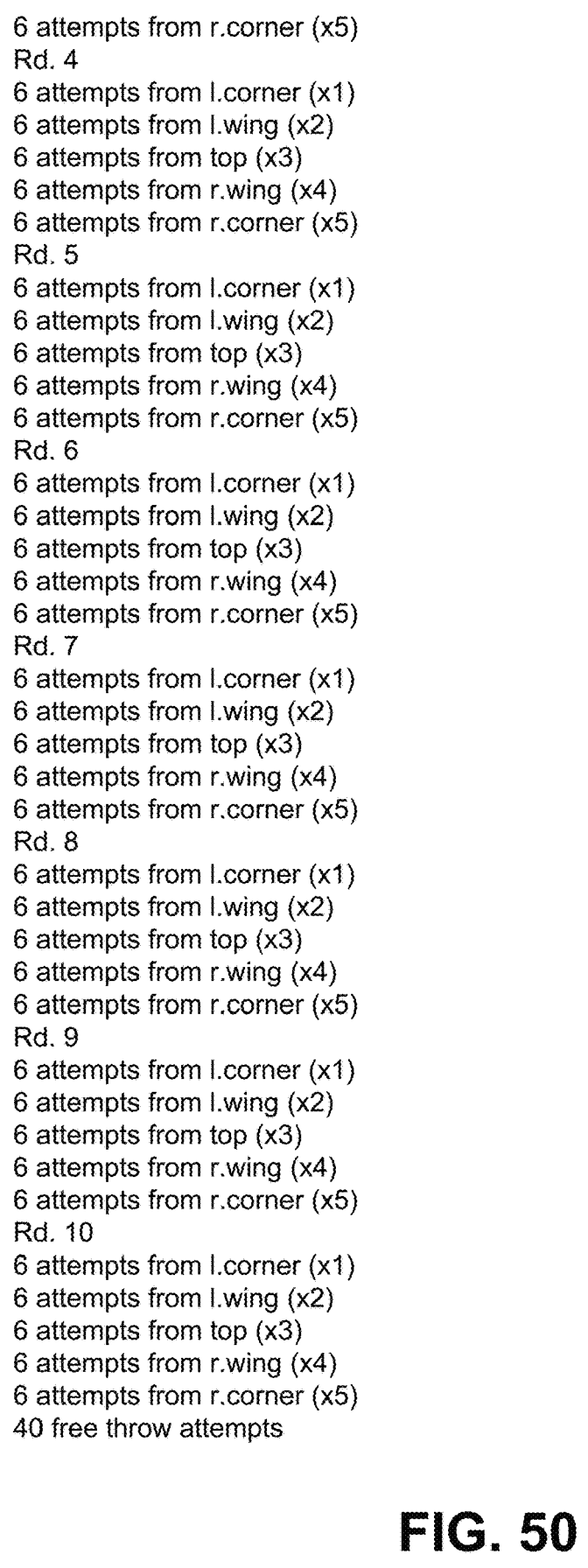

6 attempts from r.corner (x5)
Rd. 4
6 attempts from l.corner (x1)
6 attempts from l.wing (x2)
6 attempts from top (x3)
6 attempts from r.wing (x4)
6 attempts from r.corner (x5)
Rd. 5
6 attempts from l.corner (x1)
6 attempts from l.wing (x2)
6 attempts from top (x3)
6 attempts from r.wing (x4)
6 attempts from r.corner (x5)
Rd. 6
6 attempts from l.corner (x1)
6 attempts from l.wing (x2)
6 attempts from top (x3)
6 attempts from r.wing (x4)
6 attempts from r.corner (x5)
Rd. 7
6 attempts from l.corner (x1)
6 attempts from l.wing (x2)
6 attempts from top (x3)
6 attempts from r.wing (x4)
6 attempts from r.corner (x5)
Rd. 8
6 attempts from l.corner (x1)
6 attempts from l.wing (x2)
6 attempts from top (x3)
6 attempts from r.wing (x4)
6 attempts from r.corner (x5)
Rd. 9
6 attempts from l.corner (x1)
6 attempts from l.wing (x2)
6 attempts from top (x3)
6 attempts from r.wing (x4)
6 attempts from r.corner (x5)
Rd. 10
6 attempts from l.corner (x1)
6 attempts from l.wing (x2)
6 attempts from top (x3)
6 attempts from r.wing (x4)
6 attempts from r.corner (x5)
40 free throw attempts

FIG. 50

Catch & Shoot On The Move
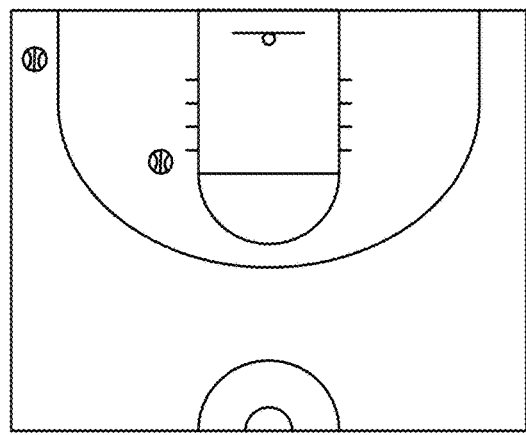
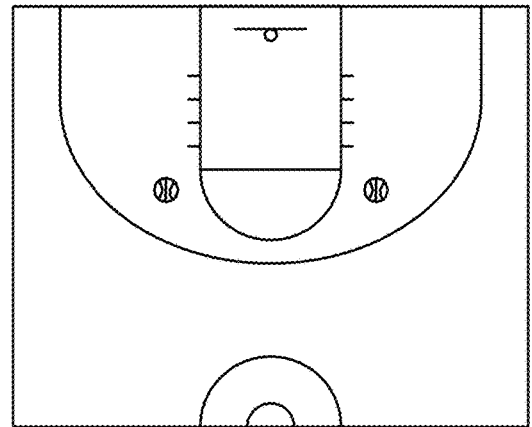
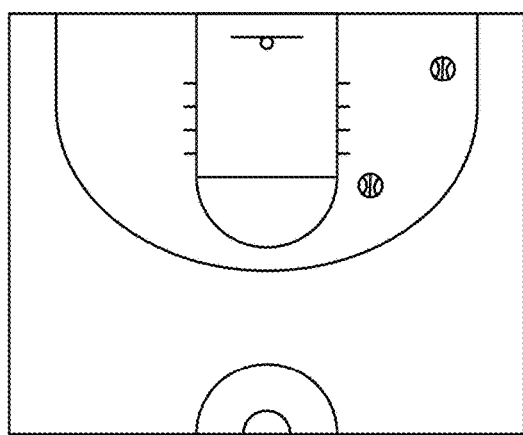
FIG. 51

Catch & Shoot 3's
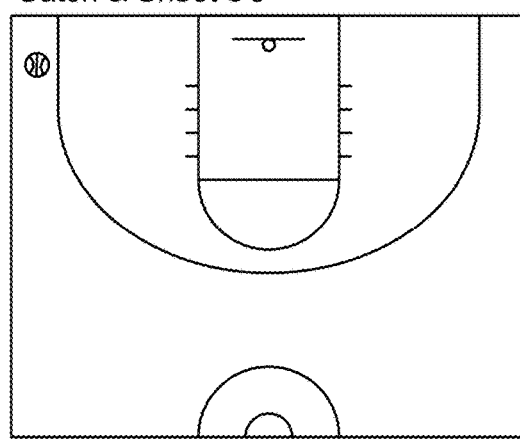
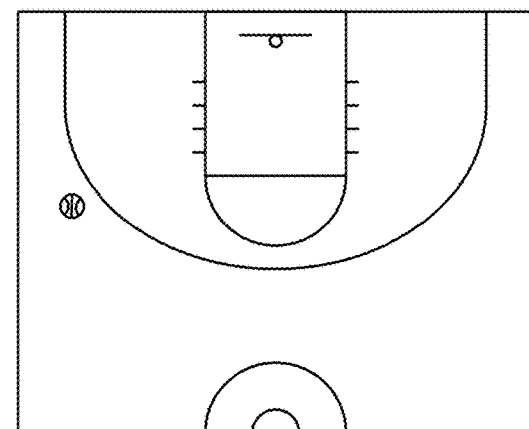
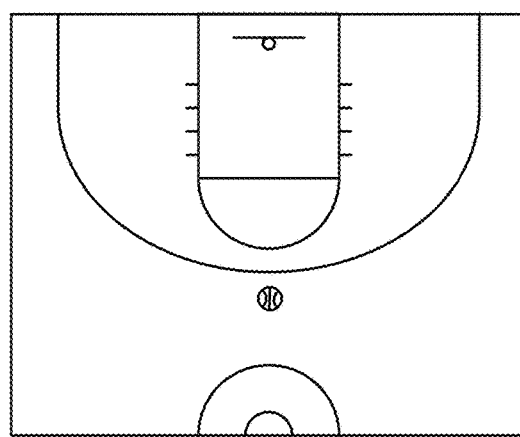
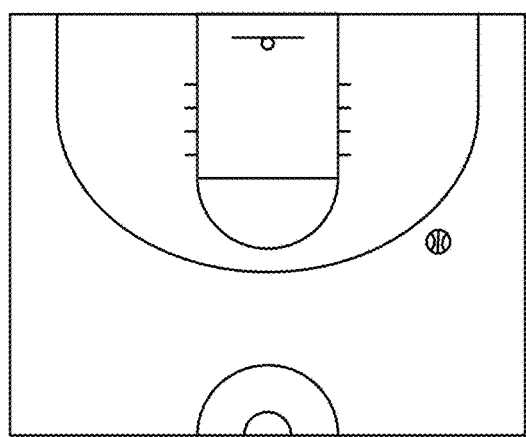
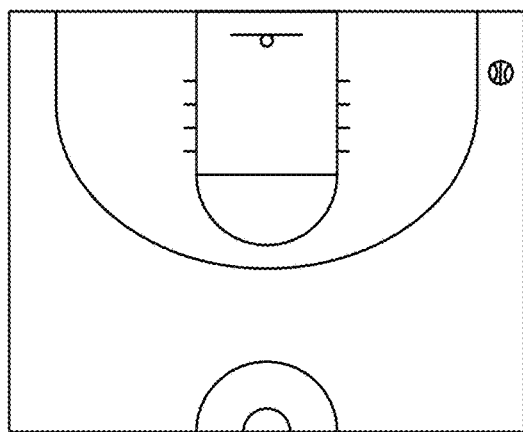
FIG. 52

SYSTEM AND METHOD OF BASKETBALL TESTING

CROSS-REFERENCE TO RELATED APPLICATIONS

This application claims priority to U.S. Provisional Patent Application No. 62/729,232, filed Sep. 10, 2018 and entitled "SYSTEM AND METHOD FOR SPORTS SOCIAL MEDIA APPLICATION," and to U.S. Provisional Patent Application No. 62/571,724, filed Oct. 12, 2017 and entitled "DISTRIBUTED NETWORKED COMPUTER PLATFORM FOR ATHLETICS," the contents of each of which are expressly incorporated herein by reference in their entirety.

COPYRIGHT NOTICE

BACKGROUND

Coaching and recruiting have been late to advance from paper to digital. Coaches often distribute hardcopies of drills and plays, take paper notes, score drills on paper sheets, etc. Coaches and recruiters often use multiple third-party systems for compiling data, translating documents into digital form, contacting players, scoring players, predicting performance, etc. Often, these third-party systems are not compatible with each other. As such, a disproportionate amount of time and effort involved in coaching and recruiting involves administrative tasks rather than substantive coaching and recruiting.

BRIEF DESCRIPTION OF THE DRAWINGS

FIG. 3 is a diagram that illustrates examples of GUIs of a sports social media application;

FIG. 4 is a diagram that illustrates examples of GUIs of a sports social media application;

FIG. 7 is a diagram that illustrates examples of GUIs of a sports social media application;

FIG. 8 is a diagram that illustrates examples of GUIs of a sports social media application;

FIG. 9 is a diagram that illustrates examples of GUIs of a sports social media application;

FIG. 10 is a diagram that illustrates examples of GUIs of a sports social media application;

FIG. 12 is a flow chart of an example of a method of selecting and sending a test to a user;

FIG. 13 is a flow chart of another example of a method of selecting and sending a test to a user;

FIGS. 16, 17, 18, 19, 20, 21, 22, 23, 24, 25, 26, 27, 28, 29, 30, 31, 32, 33, and 34 are diagrams of illustrative screenshots of a mobile device application in accordance with an example of the present disclosure; and FIGS. 35, 36, 37, 38, 39, 40, 41, 42, 43, 44, 45, 46, 47, 48, 49, 50, 51, and 52 are diagrams of images and/or explanatory text corresponding to examples of tests that may be created, encoded, communicated, decoded, and/or displayed in accordance with the present disclosure.

DETAILED DESCRIPTION

The disclosed embodiments provide systems and methods for, amongst other things, operating a sports social media application. The system includes a server and multiple client devices running the sports social media application. The sports social media application provides a centralized communication platform for players, parents and coaches. Coaches can share camp schedules team, schedules, leaderboards, photo and video highlights, and other relevant information directly with participants. Players and parents can also collaborate and engage with coaches and each other.

The sports social media application includes a built-in testing program which enables coaches to create and send tests, and enables players to measure and evaluate their athletic performance and to improve their skills at every level of the game. The sports social media application includes an analytics program to measure, track, evaluate, and predict the growth and progress of a player's development over time. Additionally, coaches and recruiters can measure, track, evaluate, and predict the growth and progress the player's development over time to make more informed coaching and recruiting decisions. Thus, by use of the sports social media application, a coach and/or recruiter can stay in contact with players, create custom drills, send players drills, monitor player progress, and manage recruiting.

The sports social media application also provides a forum for individual players to connect, compete, network, and share with coaches, recruiters, schools and teammates, via a dedicated application, giving users increased visibility and access as compared to traditional recruiting process, which involves sending video files to coaches and recruiters. Additionally, by aggregating user performance in the sports social media application, the sports social media application can enable a server or a client to predict future progress of a player.

Biometric hardware, radio frequency identification (RFID), and greatly enhanced video capability generate large amounts of performance data for elite athletes and the college and professional programs who depend on them. However, there is no industry standard or corresponding platform for professional and amateur organizations to monitor recruiting candidates or young athletes to effectively measure, track, and benchmark their growth and progress as they grow up and work hard to get better. The disclosed sports social media application enables the integration, use, and protection of the performance data. Additionally, amateur and young athletes can engage in a sports centric social network to share their skills, progress, and passion outside traditional social media and social network applications.

Figure 1:
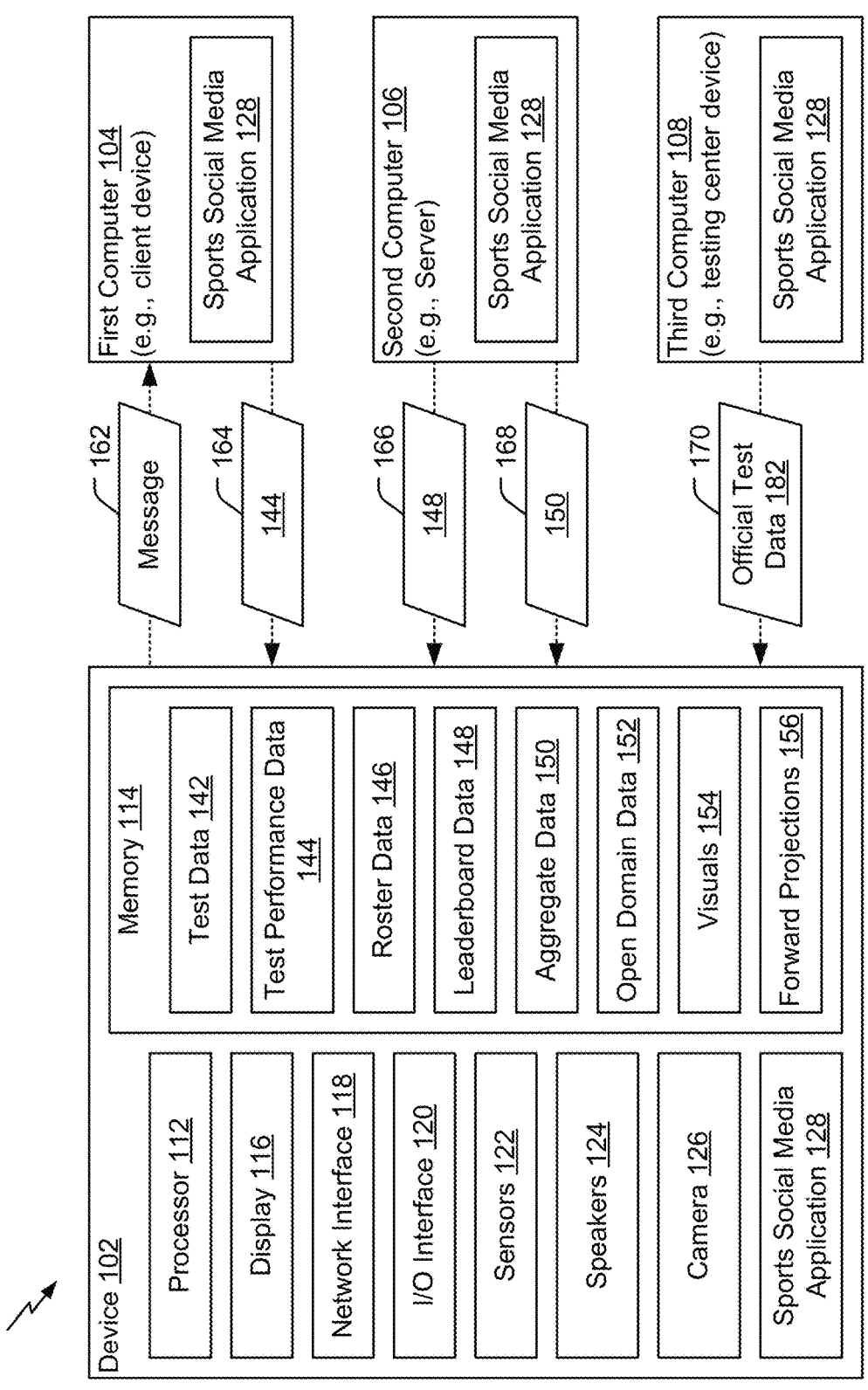
FIG. 1 is a block diagram that illustrates an example a system for a sports social media application.

FIG. 1 illustrates a block diagram of an example of a system 100 for a sports social media application 128. The system 100 includes a device 102, a first computer 104, a second computer 106, and a third computer 108. The device 102 may include or correspond to mobile device, a laptop computer, or a desktop computer. As illustrated in the example of FIG. 1, the device 102 corresponds to a client device (e.g., a smartphone) of the sports social media application 128 for a coach user.

The device 102 includes a processor 112, a memory 114, a display 116, a network interface 118, an input/output (I/O) interface 120, sensors 122, speakers 124, a camera 126, and the sports social media application 128. The processor 112 is coupled to the memory 114 and is configured to execute instructions stored in the memory 114.

The display 116 is configured to output a graphical user interface (GUI) responsive to signals generated by the processor 112 and/or a graphics processing unit (GPU) thereof (not shown). In some implementations, such as when the device 102 is a smartphone, the display 116 includes a touchscreen display. The network interface 118 includes or corresponds to a wired networking interface, a wireless networking interface, or a combination thereof, and is configured to communicate with other devices, such as the first computer 104, the second computer 106, the third computer 108, or a combination thereof, via a network.

The sensors 122 are configured to generate sensor data, which is used by the device 102 and the sports social media application 128 to generate and update the GUI. The sensors 122 include one or more of an inertial measurement unit (IMU), a microphone, or a combination thereof. The IMU includes one or more gyroscopes, accelerometers, magnetometers, or a combination thereof, and is configured to generate sensor data that indicates user movement, such as speed, acceleration, force, etc.

The microphone is configured to receive user audio inputs (e.g., voice commands) and is configured to generate sensor data indicative of the audio inputs. The microphone sensor data can enable the device 102 and the sports social media application 128 to generate and update the GUI responsive to user voice commands. In some implementations, the microphone corresponds to a microphone array.

The speakers 124 are configured to output audible audio indications (e.g., instructions or notifications) and content to the user. Accordingly, the user can hear instructions and notifications while focusing on taking a test.

The camera 126 is configured to capture video and generate video data. In some implementations, the video data can enable the sports social media application 128 to process the video data to determine test results (e.g., test performance data), certify test results, or both. For example, the sports social media application 128 uses machine vision to determine if a player makes a basket, hits a pitch, throws a strike, etc.

The sports social media application 128 is configured to generate and update a GUI displayed by the display 116. Additionally, the sports social media application 128 is configured to generate messages, create tests, send tests, monitor tests, track performance, and predict performance, as further described herein.

The first computer 104, the second computer 106, and the third computer 108 each include the sports social media application 128 or modules thereof. Additionally, each of the first computer 104, the second computer 106, and the third computer 108 may include one or more of the components of the device 102.

As illustrated in the example of FIG. 1, the first computer 104 corresponds to a client device of the sports social media application 128. For example, the first computer 104 can be a smartphone, laptop, or desktop computer associated with a player user.

The first computer 104 is configured to receive messages via the sport social media application 128, such as a message 162 from the device 102. The messages include practice updates, playbook updates, sports highlights, sports news, or a combination thereof. Additionally, the messages can include test data 142 and can be configured to assign tests to one or more player users. To illustrate, the test data 142 can be assigned to multiple player users of a particular roster indicated by roster data 146. The roster data 146 enables coaches to create and edit team rosters, camp rosters, recruiting rosters, or a combination thereof, to manage multiple players, camps, and/or teams.

As illustrated in the example of FIG. 1, the second computer 106 corresponds to a server of the sports social media application 128. For example, the second computer 106 can be central server that facilitates communications (e.g., messages) of the sports social media application 128, provides data (e.g., leaderboard data 148, aggregate data 150, open domain data 152, etc.) to client devices, or a combination thereof. Although a server is described, it is to be understood that in some implementations server-side operations may be performed by cloud computer(s), virtual machine(s), etc.

The second computer 106 is configured to route communications of the sports social media application 128 for client devices. For example, the second computer 106 may receive a particular message from the device 102 and forward the particular message to the first computer 104. The second computer 106 is further configured to receive test performance data 144 from the client devices. The second computer 106 generates leaderboard data 148 and aggregate data 150 based on test performance data 144 corresponding to multiple player users. The second computer 106 is configured to send the leaderboard data 148 and the aggregate data 150 to the client devices. In some implementations, the second computer 106 sends a portion of the aggregate data 150 (e.g., aggregate data 150 corresponding to public test results, such as test performance data 144 flagged as public). This enables client devices to generate more accurate forward projections 156, as further described herein, while ensuring privacy and that proprietary data (e.g., private test performance data 144) is not publicly shared.

Figure 2:
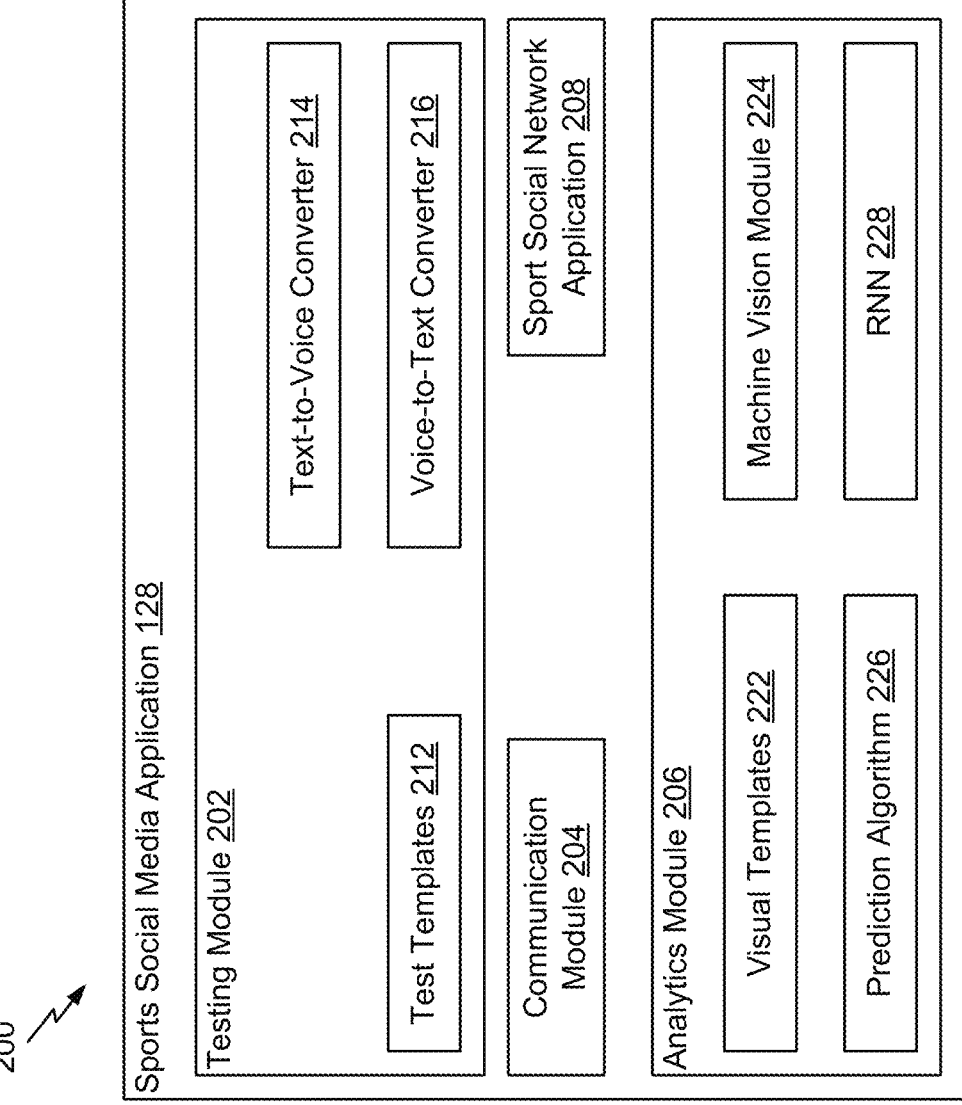
FIG. 2 is a block diagram that illustrates an example of a sports social media application.

In some implementations, the second computer 106 generates visuals 154 and forward projections 156 based on the aggregate data 150 or based on the aggregate data 150 and open domain data 152, as described further with reference to FIG. 2. The visuals 154 include or correspond to graphical representations of the test performance data 144, the forward projections 156, or both. As illustrative, non-limiting examples, the visuals 154 include a histogram, a scatter plot, a pie chart, or a bar graph. The forward projections 156 include or correspond to estimates of future test results (future or predicted test performance data 144) for a player user, estimates of future statistics and results for a team (e.g., team forward projections), or both. As illustrative, non-limiting examples, the forward projections 156 includes estimated points, assists, goals, wins, losses, etc. The open domain data 152 corresponds to data that is outside of the sports social media application 128 and is available to the public. As illustrative, non-limiting examples, the open domain data 152 includes weather data, player statistics from outside sources, contract data, betting odds data, etc.

As illustrated in the example of FIG. 1, the third computer 108 corresponds to a client device of a testing center associated with the sports social media application 128. For example, the third computer 108 is a computer of an authorized or certified facility to administer tests identified by test data 142 and to generate official test performance data 182. The third computer 108 may receive the test data 142 directly from the device 102 or may indirectly receive the test data 142 from the device 102 via the first computer 104, the second computer 106, or both. For example, the device 102 may send the test data 142 to the first computer 104 directly or via the second computer 106, and the first computer 104 may send or upload the test data 142 to the third computer 108.

The third computer 108 is configured to send the official test performance data 182 to one or more devices or computers. For example, if the test data 142 indicates a public test, the official test performance data 182 is sent to the second computer 106. Alternatively, if the test data 142 indicates a private test, the official test performance data 182 is sent to the device 102 (assigning user), the first computer 104 (player user), or both.

During operation, the device 102 sends a message 162 to the first computer 104 using the sports social media application 128 responsive to user (e.g., coach user) input. For example, the network interface 118 sends the message 162, which includes test data 142 indicating a particular test for a player user associated with the first computer 104. The message 162 can be sent directly to the first computer 104, as illustrated in FIG. 1, or can be sent via the second computer 106. Operation of the sports social media application 128 and GUIs thereof to select a user and a test, are described with reference to FIGS. 3-10.

Responsive to the first computer 104 receiving the message 162, the first computer 104 generates a notification indicating that a test corresponding to the test data 142 has been assigned to the player user associated with the first computer. The player user can use the sports social media application 128 to initiate and administer the test. For example, the sports social media application 128 of the first computer 104 generates GUIs, voice instructions, audio notifications, or a combination thereof, to administer the test. The sports social media application 128 of the first computer 104 receives user inputs indicating test results and generates test performance data 144 based on the user inputs. Additionally or alternatively, the sports social media application 128 of the first computer 104 captures video, sensor data, or both, and generates the test performance data 144 based on one or more of the user inputs, the video, or the sensor data. The first computer 104 sends the test performance data 144 to the device 102, the second computer 106, or both. The test performance data 144 may be validated (e.g., certified) by including the video in the test performance data 144 for verification of the test result indicated by the test performance data 144 or by including the video in a second message 164 to the device 102, the second computer 106, or both. The device 102, the second computer 106, or both, can validate the test performance data 144 based on the video. For example, a user associated with the device 102 may manually review the video and confirm the test results or a machine vision module can automatically review the video and confirm the test results.

In other implementations, the player user associated with the first computer 104 travels to a location of the third computer 108 to take an official test or to generate official test results (i.e., official test performance data 182). One or more users (e.g., testing officials) associated with the third computer 108 administer the test using the sports social media application 128 and one or more cameras thereof. The official test performance data 182 generated by the third computer 108 is sent to the device 102, the first computer 104, the second computer 106, or a combination thereof, using the sports social media application 128. As illustrated in the example of FIG. 1, the third computer 108 sends a third message 166, including the official test performance data 182, to the device 102. Similarly, in other implementations, the player user associated with the first computer 104 is near or travels to a location of the device 102, and the coach user associated with the device 102 administers the test using the device 102.

After receiving the test performance data 144 corresponding to the test data 142, the device 102 generates one or more visuals 154, one or more forward projections 156, or a combination thereof, based on the test performance data 144 (or the official test performance data 182). Additionally, the device 102 can request leaderboard data 148 from the second computer 106 to evaluate how the player user associated with the first computer 104 ranks compared to other users of the sports social media application 128. As illustrated in the example of FIG. 1, the second computer 106 sends a fourth message 168, including the leaderboard data 148, to the device 102. Further, the device 102 can request the aggregate data 150 from the second computer 106. As illustrated in the example of FIG. 1, the second computer 106 sends a fifth message 170, including the aggregate data 150, to the device 102. The aggregate data 150 enables the device 102 to generate more accurate forward predictions 156. To illustrate, the aggregate data 150 from the second computer 106 has a larger sample size than the aggregate data 150 that is locally stored on the device 102.

FIG. 2 is a block diagram 200 of an example of the sports social media application 128 of FIG. 1. The sports social media application 128 includes a testing module 202, a communication module 204, an analytics module 206, and a sports social networking application 208.

The testing module 202 includes test templates 212, a text-to-voice converter 214, and a voice-to-text converter 216. The testing module 202 is configured to administer tests, configure or customize tests, generate new tests, generate and manage a playbook, and generate test sets. For example, the testing module 202 generates the test data 142 of FIG. 1 based on test templates 212. The testing module 202 administers the test based on the test data 142. To illustrate, the text-to-voice converter 214 converts text of a test data 142 into audio commands to instruct a player user during the test. The testing module 202 generates test performance data 144 based on sensor data from the sensors 122 of FIG. 1, user inputs, video from the camera 126 of FIG. 1, or a combination thereof.

The testing module 202 has test builder and customization features that enable the testing module 202 to be applicable to a variety of different sports. For example, when employed in the field of basketball the sports social media application 128 outputs a graphical representation of a basketball court or portion thereof. A user can place markers and other graphical indicators along with annotations and/or audio instructions to create a custom test and enable a player user to carry out the test.

In some implementations, the testing module 202 can include one or more questions in the test data 142. For example, in the case of a Basketball shot test, did the player being tested make the shot or not? The testing module 202 generates buttons corresponding to answers or responses to the question, such as a make button and a miss button. In other implementations, the test data 142 may include non-binary questions that include free form or variable value answers. For example, in the domain of athletics, a user enters the time spent completing a specific course or distance.

The testing module 202 is further configured to generate a playbook or a test set. Further, the playbook or test set may be flagged as private or public. Thus, a coach user can keep such data private and only accessible to certain rosters, types or classes of players, or players that meet certain specific requirements.

The communication module 204 is configured to send and receive messages via the sports social media application 128 of FIG. 1, such as the sports social network application 208 thereof. For example, the communication module 204 is configured to access and initiate transmission of messages via the network interface 118 of the device 102. The messages include chat messages (e.g., text messages) media messages (e.g., photo and/or video messages), and test assignment messages. As illustrative, non-limiting examples, the communication module 204 sends highlight video, instructional videos, sports news, etc., to devices associated with one or more users. The communication module 204 can send messages directly to other users (e.g., clients of the sports social networking application 208) or can send messages to other users via a central server, such as the second computer 106 of FIG. 1.

In a particular implementation, the communication module 204 receives or retrieves a test for a user when publication criteria of a particular test specified by another user (e.g., a coach who created the test) matches the user. To illustrate, when the player user has met a certain performance criterion, is in the coaches' targeted groups, etc., the test data 142 corresponding to the particular test is received or retrieved by the communication module 204 and a notification or a feed entry is generated in the GUI.

The analytics module 206 includes visual templates 222, a machine vision module 224, a prediction algorithm 226, and one or more machine learning and/or artificial intelligence components. Examples of such component include, but are not limited to, recurrent neural networks (RNNs), such as an illustrative RNN 228. The visual templates 222 include data for creating the visuals 154 of FIG. 1. The machine vision module 224 is configured to generate validated or certified test performance data 144 based on video data corresponding to video captured by the camera 126 during the test. The prediction algorithm 226 is configured to generate the forward projections 156 of FIG. 1 based on the test performance data 144 and the aggregate data 150, such as by using the RNN 228. In some implementations, the RNN 228 is a RNN for continuous value prediction.

The analytics module 206 is configured to analyze test results (e.g., test performance data 144 or the official test performance data 182 of FIG. 1) and to represent the test results in graphical formats, such as by generating the visual 154 of FIG. 1. Additionally, the analytics module 206 is configured to employ statistical and machine learning techniques (for example, Holt Winters, ARMA/ARIMA, the RNN 228, etc.) to predict future test results for future tests based on the test results (test performance data 144) and the aggregate data 150 of FIG. 1. Such future test results can provide coaches with information and/or a graphical output that includes performance/test result curves abstracted from individual data.

Further, the analytics module 206 is configured to compare the test results of various users who have taken the same tests. For example, the analytics module 206 generates a histogram, a scatter plot, a pie chart, or another visualization that depicts test results from two or more users. As an illustrative, non-limiting example, a comparison of five players that have scored a certain number of points on a particular test can be contrasted on a pie chart indicating test results with respect to another test.

The analytics module 206 enables coaches to project likely performance of a user using predictive techniques (e.g., the predictive algorithm 226 and the RNN 228). The coach can use the estimated future performance to see the estimated progress and gauge or extrapolate where a certain player will be at some time in the future, such as by the end of a performance testing period, start of the season, playoffs, etc.

The sports social networking application 208 is configured to generate and update a GUI and to facilitate sending messages between users of the sports social networking application 208.

During operation, the testing module 202 generates a custom test responsive to user inputs. For example, a user selects a particular test template 212 of the testing module 202 and inputs audio data indicating test instruction to the sensors 122 of the device 102. Additionally or alternatively, the user may physical perform a portion of the test while holding or carrying the device 102, and the sensors 122 capture the user's movement and generate sensor data indicative of the user's movement (e.g., location, speed, timing, etc.). The testing module 202 generates test data 142 based on the sensor data, such as shot location information, passing route instruction information, etc.

The communication module 204 sends the test data 142 to a player user via the sports social network application 208, and the player user can take the test indicated by the test data 142. During administration of the test, the testing module 202 uses the text-to-voice converter 214 to generate audio commands to instruct the user and generates a GUI based on the test data 142. The testing module 202 generates the test performance data 144 based on user inputs and sensor data.

In some implementations, the machine vision module 224 processes video captured during the test to validate the test performance data 144. The analytics module 206 can modify the test performance data 144 to correct the test result indicated by the data or to certify or validate the test performance data 144.

The prediction algorithm 226 generates a forward projection 156 for the player user based on the test performance data 144 and the aggregate data 150, locally stored or received from the second computer 106 of FIG. 1. For example, the prediction algorithm 226 uses the RNN 228 to generate a forward projection 156 indicating an estimated future test result of the test taken, such as 40-yard dash time in four years. Additionally, the prediction algorithm 226 uses the RNN 228 to generate a second forward projection 156 indicating an estimated future test result of a different test, such as a three-point shooting drill score now and in two years. The analytics module 206 can further generate one or more visuals 154 illustrating the test performance data 144, a portion of the aggregate data 150, the forward projections 156, or a combination thereof, using the visual templates 222.

FIGS. 3-11 illustrate example GUIs output by the device 102 of FIG. 1. Operation of selecting and sending a test to a user is explained with reference to FIGS. 3-6. Additionally, operation of a roster evaluation is explained with reference to FIGS. 7 and 8. Another operation of a roster evaluation is explained with reference to FIGS. 9 and 10. Furthermore, operation of a leaderboard is explained with reference to FIG. 11.

FIG. 3 illustrates examples of testing center GUIs of the sports social media application 128. As illustrated in the example of FIG. 3, a first testing center GUI 300 includes a search bar 312, user identification information 314, an add-to-roster button 316, an evaluation button 318, and a test button 320. The search bar 312, when accessed may display a keyboard, a set of filters, list of players to search, or a combination thereof to facilitate user searching and selection. As illustrated in the example of FIG. 3, the user identification information 314 includes a user photo or identification photo, a name, and a username. The add-to-roster button 316 adds the current or selected user (Jaden) to one or more rosters. When accessed, the add-to-roster button 316 may display a keyboard, a set of filters, list of rosters to search, or a combination thereof to facility roster searching and selection. The test and evaluation buttons 318 and 320, when accessed, may display GUIs to enable evaluating the current or selected user (Jaden) and sending a test to the current or selected user (Jaden), as described with reference to FIG. 4-6.

As illustrated in the example of FIG. 3, a second testing center GUI 302 includes a test bar 322, test selection buttons 324, and a next button 326. The test bar 322, when accessed may display a keyboard, a set of filters, list of players to search, or a combination thereof, to facilitate user searching and selection.

FIG. 4 illustrates examples of testing center GUIs of the sports social media application 128. Responsive to a user selecting one of the test selection buttons 324 and activating the next button 326, the device 102 outputs a third testing center GUI 400. As illustrated in the example of FIG. 4, the third testing center GUI 400 corresponds to a combine shooting (100) test and includes information about the combine shooting (100) test. In other implementations, the third testing center GUI 400 includes more than one test. As illustrated in the example of FIG. 4, the third testing center GUI 400 includes test name 412, test description 414, and test instructions 416.

A fourth testing center GUI 402 includes detailed information for the selected combine shooting (100) test. As illustrated in the example of FIG. 4, the fourth testing center GUI 402 includes test participants 422, test instructions 416 (e.g., test quantity and test duration), test level 424 (e.g., shooting distance), a select button 426, test action type 428, test action instructions 430. FIG. 4 further depicts a test level pop-up window 432 for selecting the test level 424. In other implementations, the fourth testing center GUI 402 includes more or less information than illustrated in FIG. 4.

Figure 5:
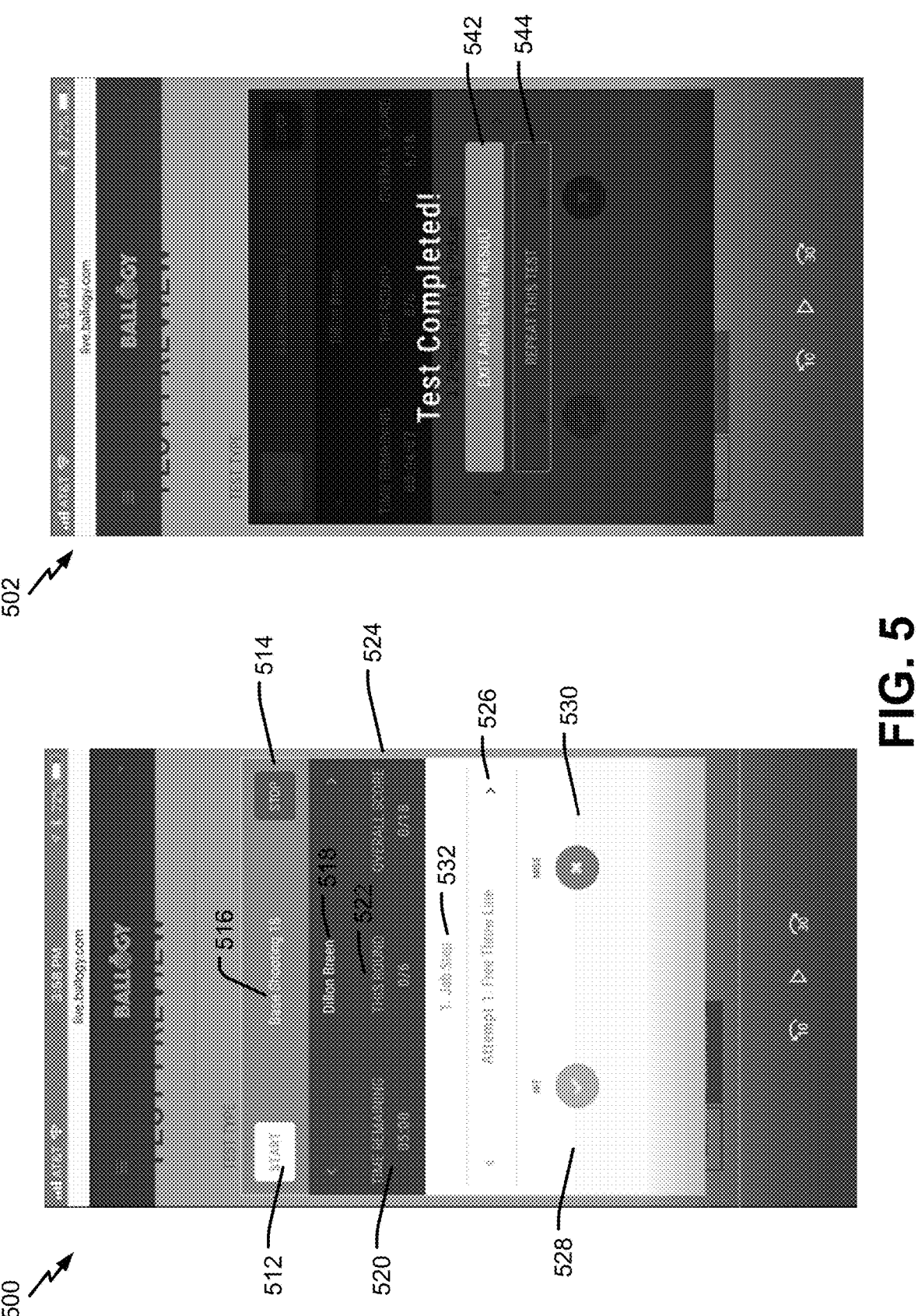
FIG. 5 is a diagram that illustrates examples of GUIs of a sports social media application.

FIG. 5 illustrates examples of testing center GUIs of the sports social media application 128. A fifth testing center GUI 500 includes information and buttons to administer the selected test. As illustrated in the example of FIG. 5, the fifth testing center GUI 500 includes a start button 512, a stop button 514, test title 516, player name 518, time remaining information 520, round score information 522, overall score information 524, attempt information 526, a make button 528, and a miss button 530. In some implementations, the fifth testing center GUI 500 includes instruction or type information 532. Responsive to a user selecting the start button 512, the device 102 updates the sixth testing center GUI 502 to begin the test. Additionally, the device 102 updated the sixth testing center GUI 502 responsive to user inputs via the make button 528 and the miss button 530, sensor data, video data, or a combination thereof. In other implementations, the fifth testing center GUI 500 includes more or less information than illustrated in FIG. 5, more or less buttons than illustrated in FIG. 5, other information or buttons than illustrated in FIG. 5, or a combination thereof.

Responsive to a user selecting the stop button 514, the device 102 outputs a sixth testing center GUI 502. The sixth testing center GUI 502 corresponds to a test completion GUI. As illustrated in the example of FIG. 5, the sixth testing center GUI 502 includes an exit and review button 542 and a repeat test button 544. In other implementations, the sixth testing center GUI 502 includes more or less information than illustrated in FIG. 5.

Figure 6:
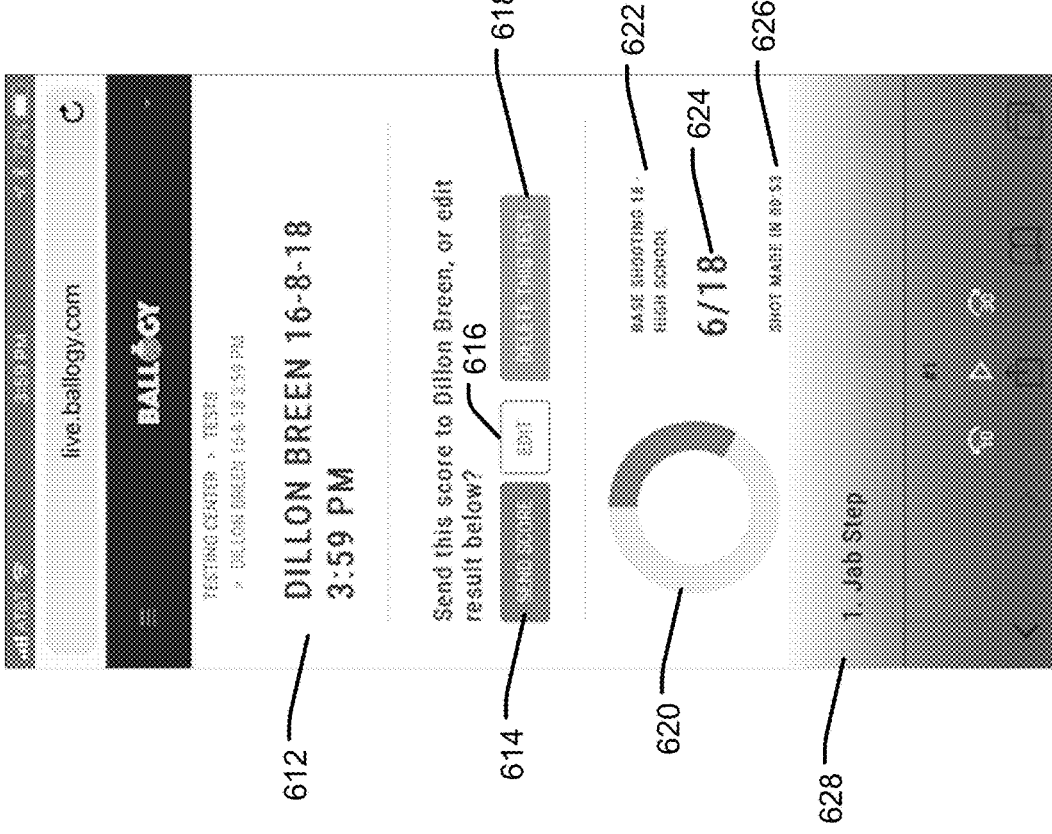
FIG. 6 is a diagram that illustrates another example of a testing center GUI of a sports social media application.

FIG. 6 illustrates an example of a seventh testing center GUI 600 of the sports social media application 128. Responsive to a user selecting the exit and review button 542 of FIG. 5, the device 102 outputs the seventh testing center GUI 600. The seventh testing center GUI 600 depicts test result information. As illustrated in the example of FIG. 6, the seventh testing center GUI 600 includes test identification information 612, a send score button 614, an edit test button 616, a delete test button 618, a test results graph 620, test information 622 (e.g., name and level), test result information 624, duration information 626, and test description information 628. In other implementations, the seventh testing center GUI 600 includes more or less information than illustrated in FIG. 6, more or fewer buttons than illustrated in FIG. 6, or a combination thereof.

FIG. 7 illustrates examples of testing center GUIs of the sports social media application 128. A first testing center GUI 700 depicts a navigation sidebar 712. As illustrated in the example of FIG. 7, the navigation sidebar 712 includes a link 722 to a testing center home and a link 724 to a leaderboards home. The navigation sidebar 712 may further include testing center and/or leaderboard subpage links. As illustrated in the example of FIG. 7, the navigation sidebar 712 includes testing center subpage links of a players link 732, a rosters link 734, a test link 736, a pending tests link 738, an evaluation link 740, and includes leaderboard subpage links of a combine shooting (100) leaderboard link 742 and a 2-minute drill (3×5) leaderboard link 744.

Responsive to a user activating the rosters link 734, the device 102 outputs a second testing center GUI 702. The second testing center GUI 702 depicts rosters of the user. As illustrated in the example of FIG. 7, the second testing center GUI 702 includes a roster search bar 752, an add roster button 754, a first roster 756, and a second roster 758. As illustrated in the example of FIG. 7, each roster 756, 758 includes name information, number of users or members, a view detail button, and remove roster button. Additionally, each roster may include additional information and buttons or fewer information and buttons than as illustrated in the example of FIG. 7.

FIG. 8 illustrates examples of testing center GUIs of the sports social media application 128. A third testing center GUI 800 includes information about a selected roster. Responsive to a user activating the view detail button of the first roster 756 (BTY PRO) of the second testing center GUI 702 of FIG. 7, the device 102 outputs the third testing center GUI 800.

As illustrated in the example of FIG. 8, the third testing center GUI 800 includes roster name information 812, a player search bar 814, an add player button 816, and user identification information 314. Although the third testing center GUI 800 depicts only one player user in FIG. 8, in other implementations, the third testing center GUI 800 depicts multiple player users of the selected roster.

The third testing center GUI 800 also includes an evaluation button 318 and a test button, as described with reference to FIG. 3. The third testing center GUI 800 further includes a remove button 820. Selection of the remove button 820 removes the player from the selected roster.

Responsive to a user activating the evaluation button 318, activating the test button 320, or a combination thereof, of the third testing center GUI 800, the device 102 outputs a fourth testing center GUI 802. The fourth testing center GUI 802 corresponds to a combine measurement evaluation GUI and includes information about combine measurements. As illustrated in the example of FIG. 8, the fourth testing center GUI 802 includes a height field 832, a max vertical field 834, a wingspan field 836, a weight field 838, a ¾ court sprint time field 840. In other implementations, the fourth testing center GUI 802 includes other information fields, more information fields, fewer information fields, or a combination thereof.

In some implementations, responsive to a user entering information for all of the fields 832-840 of the fourth testing center GUI 802 or selecting a next or complete button of the fourth testing center GUI 802, the device 102 outputs the third testing center GUI 800. For example, the user may finish evaluating a first user of the selected roster and the user returns to the roster page to select another user to evaluate.

FIG. 9 illustrates another example of testing center GUIs of the sports social media application 128. A first testing center GUI 900 corresponds to an evaluate groups GUI and includes buttons or links to review, assign, and/or perform evaluations. As illustrated in the example of FIG. 9, the first testing center GUI 900 includes an evaluation history button 912, player and roster selection links 914, and an evaluation bar 916.

Responsive to a user activating the player selection link 914 and selecting a player, activating the roster selection link 914 and selecting a roster, activating the evaluations bar 916 and selecting an evaluation, or a combination thereof, the device 102 outputs a second testing center GUI 902. The second testing center GUI 902 corresponds to a selected group evaluation GUI and includes information about a current evaluation. As illustrated in the example of FIG. 9, the second testing center GUI 902 includes a group identifier 922, an evaluation identifier 924, a preview and share button 926, evaluation information 928, a rating slider bar 930, and a toggle switch 932.

FIG. 10 illustrates examples of testing center GUIs of the sports social media application 128. A third testing center GUI 1000 corresponds to a selected groups GUI and includes fields to insert comments, video, or both. As illustrated in the example of FIG. 10, the third testing center GUI 1000 includes a comments tab 1012 and a video tab 1014. Upon selecting the comments tab 1012, the user can enter comments via text or speech. Upon selecting the video tab 1014, the user can select a stored video to attach, enter a link to a video hosted by another device, generate a video (e.g., initiate video capture by the camera 126 of FIG. 1), or a combination thereof.

A fourth testing center GUI 1002 corresponds to a selected groups GUI and illustrates an evaluation of a player. As illustrated in the example of FIG. 10, the user activated the rating slider bar 930 to a value of 6 and entered a comment 1022.

Figure 11:
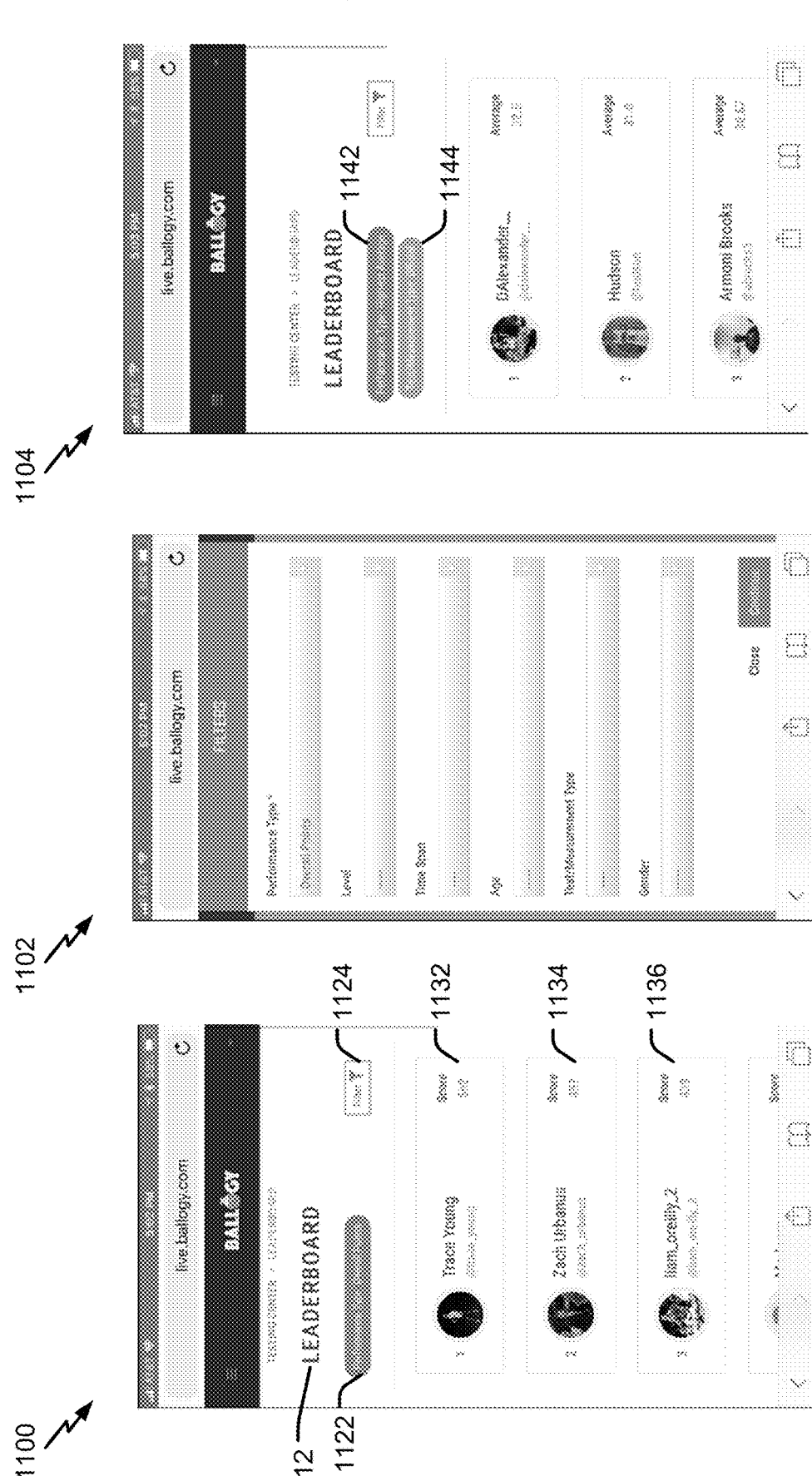
FIG. 11 is a diagram that illustrates examples of leaderboard GUIs of a sports social media application.

FIG. 11 illustrates examples of leaderboard GUIs of the sports social media application 128. A first leaderboard GUI 1100 corresponds to an overall points leaderboard 1112 and includes a first filter type 1122 (performance type: overall points), a filter button 1124, and multiple leader entries 1132-1136. Each leader entry 1132-1136 indicates a user and a score or rank. As illustrated in the example of FIG. 11, each leader entry 1132-1136 includes a rank number, a photo, a name, a username, and a score.

A second leaderboard GUI 1102 corresponds to a leaderboard filter popup and includes multiple leaderboard filter fields. As illustrated in the example of FIG. 11, the second leaderboard GUI 1102 includes a performance type field, a level field, a time span field, an age field, a test or measurement type field, and a gender field. The second leaderboard GUI 1102 is displayed responsive to user selection of the filter button 1124.

A third leaderboard GUI 1104 corresponds to a highest average leaderboard for official tests. As illustrated in the example of FIG. 11, the third leaderboard GUI 1104 includes two active filters 1142 (highest average) and 1144 (official tests). The leader entries of the third leaderboard GUI 1104 are similar to the leader entries 1132-1136 of the first leaderboard GUI 1100. In other implementations, the leaderboard GUIs 1100-1104 includes other information fields, more information fields, fewer information fields, or a combination thereof.

FIG. 12 illustrates a particular example of a method 1200 of selecting and sending a test. The method 1200 may be performed by the system 100, the device 102, the first computer 104, the second computer 106, the third computer 108, the processor 112, or a combination thereof. The method 1200 includes, at 1202, selecting, by a computer using a sports social media application, a test. For example, the computer may include or correspond to the device 102, the second computer 106, or the third computer 108 of FIG. 1. The sports social media application may include or correspond to the sports social media application 128 of FIG. 1 or the sports social networking application 208 of FIG. 2, and the test may include or correspond to one or more of the tests described with reference to FIGS. 1 and 8. To illustrate, the processor 112 of the device 102 selects a test and corresponding test data 142 responsive to a user input, as described with reference to FIG. 1. In some implementations, the test includes a combine measurement, a running drill, a shooting drill, a throwing drill, a hitting drill, a passing drill, or a combination thereof. Alternatively, the processor 112 of the device 102 generates a custom test responsive to user inputs, as described with reference to FIG. 2.

The method 1200 also includes, at 1204, selecting a user to send the test to. For example, the user includes or corresponds to one or more of the users described with reference to FIGS. 1, 3, and 8. To illustrate, the processor 112 of the device 102 selects a player user for the selected test responsive to one or more user inputs, as described with reference to FIGS. 1 and 2. Although selecting a user is depicted as following selecting a test, the two steps can be performed in reverse order, i.e., selecting a test and then selecting a user.

The method 1200 includes, at 1206, sending, by the computer using the sports social media application, test data associated with the test to a device associated with the user. For example, the device associated with the user may include or correspond to the first computer 104, the second computer 106, or the third computer 108 of FIG. 1. To illustrate, the processor 112 of the device 102 sends the test data 142 via the network interface 118 using the sports social media application 128, as described with reference to FIGS. 1 and 2.

In some implementations, the method 1200 further includes prior to selecting the test, creating the test via a custom test builder module of the sports social media application, as described with reference to FIG. 2. In a particular implementation, creating the test via the custom test builder module includes adding voice instructions, adding text instructions, or a combination thereof, to the test responsive to user inputs.

In some implementations, the method 1200 further includes receiving, by the computer using the sports social media application, test performance data from the device associated with the user or from a server, as described with reference to FIG. 1.

In some implementations, the method 1200 further includes generating forward projections based on the test performance data and aggregate data, as described with reference to FIGS. 1 and 2. For example, the analytics module 206 generates the forward projections by AI, recurrent neural network, Differential Free Optimization, or a combination thereof. As illustrative, non-limiting examples, the forward projections include expected points, goals, assists, rebounds, blocks, steals, runs scored, at-bats, strikes, outs, or a combination thereof. The aggregate data includes test performance data for other users. The aggregate data may be received by the device 102 from a server or stored locally on the device 102. The aggregate data may correspond to test results for players in which the user has no relationship with, players in which the user has on its roster or player list, or a combination thereof, as described with reference to FIG. 2.

In some implementations, the method 1200 further includes generating team forward projections based on the test performance data and aggregate data, as described with reference to FIG. 2. As illustrative, non-limiting examples, the team forward projections include expected wins, losses, win streaks, loss streaks, win percentage, opponent predictions, weather predictions, or a combination thereof. In some such implementations, the aggregate data includes open domain data (e.g., data outside of social media data, such as betting odds, weather, etc.).

In some implementations, selecting a user includes selecting a roster including the user and one or more other users. In some such implementations, the method 1200 further includes sending the test data to devices associated with the one or more other users, as described with reference to FIGS. 7 and 8.

In some implementations the method 1200 further includes, prior to selecting the user, searching for the user by username, name, affiliation (e.g., school and/or team), or a combination thereof, as described with reference to FIG. 3.

In some implementations the method 1200 further includes generating visuals (e.g., histogram, scatter plot, pie charts, etc.) based on the test performance data, forward projections, or both, as described with reference to FIG. 2.

FIG. 13 illustrates a particular example of a method 1300 of selecting and sending a test to a user. The method 1300 may be performed by the system 100, the device 102, the first computer 104, the second computer 106, the third computer 108, the processor 112, or a combination thereof. The method 1300 includes, at 1302, searching, by a computer using a sports social media application, for a user. For example, the computer may include or correspond to the device 102, the second computer 106, or the third computer 108 of FIG. 1. The sports social media application may include or correspond to the sports social media application 128 of FIG. 1 or the sports social networking application 208 of FIG. 2, and the user may include or correspond to one of the users or players described with reference to FIGS. 1, 3, and 8. To illustrate, the processor 112 of the device 102 searches for player responsive to user inputs, as described with reference to FIGS. 1, 3 and 8. In some implementations, the test includes a combine measurement, a running drill, a shooting drill, a throwing drill, a hitting drill, a passing drill, or a combination thereof.

The method 1300 includes, at 1304, selecting the user. For example, the processor 112 of the device 102 selects a player user from the search results or from a roster responsive to user inputs, as described with reference to FIGS. 1, 3 and 8. The method 1300 includes, at 1306, selecting a test for the user. For example, the test may include or correspond to one or more of the tests described with reference to FIGS. 1 and 8. To illustrate, the processor 112 of the device 102 searches for a test from a list of test and selects a test responsive to user inputs, as described with reference to FIGS. 1, 3 and 8. Alternatively, the processor 112 of the device 102 creates a custom test responsive to user inputs, as described with reference to FIG. 2.

The method 1300 includes, at 1308, initiating administration of the test. For example, the processor 112 of the device 102 starts the selected test, as described with reference to FIGS. 1, 3 and 8. The method 1300 includes, at 1310, generating test performance data based on the test. For example, the test performance data may include or correspond to the test performance data 144 or the official test performance data 182 of FIG. 1. To illustrate, the processor 112 of the device 102 generates the test performance data 144 based on user inputs, sensor data, video data, or a combination thereof, as described with reference to FIGS. 1, 3 and 8.

The method 1300 includes, at 1312, sending, by the computer using the sports social media application, the test performance data. For example, the processor 112 of the device 102 sends the test performance data 144 to one or more devices or computers, as described with reference to FIGS. 1, 3 and 8.

In some implementations, the method 1300 further includes generating, by the sports social media application, a second test, coaching tips, or both, based on the test performance data. For example, the processor 112 of the device 102 automatically or semi-automatically creates a custom test or selects a second test to for the player user based on the test performance data 144. To illustrate, the analytics module 206 determines that the player user is more proficient at corner three-point shots than straight on three-point shots, and the analytics module 206 instructs the test module 202 to generate a custom test to practice more straight-on three-point shots. As another example, the processor 112 of the device 102 automatically or semi-automatically selects a coaching tip from a list of coaching tips based on the test performance data 144. To illustrate, the analytics module 206 selects "a keep arm up on follow through" tip based the test performance data 144 and video data included therein.

In some implementations, the method 1300 further includes receiving notes into the sports social media application, capturing video and performing machine vision analysis on the video, indicating performance results via user inputs, or a combination thereof, during administration of the test. For example, the processor 112 of the device 102 generates note data responsive to user speech during the test. To illustrate, the voice-to-text converter 216 generates text data based on audio data of user speech. As another example, the camera 126 of the device captures video of the player user taking the test. In some implementations, the camera 126 captures the player user in the video, and in other implementations, the camera 126 captures the result only (e.g., is fixed on the basket and net rather than the player). The machine vision module 224 performs machine vision on the video to validate or certify the test performance data 144. As yet another example, the processor 112 of the device 102 generates the test performance data 144 responsive to user inputs. To illustrate, the user inputs player makes and misses via the make and miss buttons 528, 530 of the fifth testing center GUI 500 of FIG. 5.

In some implementations, sending the test performance data includes publishing the test performance data via the sports social media application. For example, the network interface 118 of the device 102 sends the test performance data 144 (e.g., public test result data) to the second computer 106 for publishing or associating with the player user. Additionally or alternatively, sending the test performance data includes sending the test performance data to a device associated with the user. For example, the network interface 118 of the device 102 sends the test performance data 144 (e.g., public or private test result data) to the first computer 104. To illustrate, the sports social media application 128 (or the sports social networking application 208 thereof) sends the test performance data 144, via the network interface 118, to the second computer 106 which forwards the test performance data 144 to the first computer 104.

Figure 14:
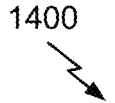
FIG. 14 is a flow chart of yet another example of a method of receiving and performing a test.

FIG. 14 illustrates a particular example of a method 1400 of receiving and performing a test. The method 1400 may be performed by the system 100, the device 102, the first computer 104, the third computer 108, the processor 112, or a combination thereof. The method 1400 includes, at 1402, receiving, at a computer via a sports social media application, test data to be performed by a user associated with the computer. For example, the computer may include or correspond to the device 102, the first computer 104, or the third computer 108 of FIG. 1. The sports social media application may include or correspond to the sports social media application 128 of FIG. 1 or the sports social networking application 208 of FIG. 2. The test data may include or correspond to the test data 142 of FIG. 1, and the user may include or correspond to one of the users or players described with reference to FIGS. 1, 3, and 8. To illustrate, the processor 112 of the device 102 receives test data indicating a particular test that was assigned to the user associated with the device, as described with reference to FIG. 1.

The method 1400 includes, at 1404, initiating a test based on the test data. For example, the test may include or correspond to the one or more of the tests described with reference to FIGS. 1 and 8. To illustrate, the processor 112 of the device 102 displays a test GUI, such as the fifth testing center GUI 500 of FIG. 5, responsive to user inputs (e.g., activating start button 512).

The method 1400 includes, at 1406, capturing video of the user performing the test. For example, the camera 126 of the device 102 captures video of the player performing the test and generates video data, as described with reference to FIGS. 1 and 2.

The method 1400 includes, at 1408, generating test performance data based on the video. For example, the test performance data may include or correspond to the test performance data 144 or the official test performance data 182 of FIG. 1. To illustrate, the machine vision module 224 performs machine vision on the video data to generate the test performance data 144. Additionally or alternatively, the user or another person inputs scores into the device 102 using the GUI, such as the fifth testing center GUI 500 of FIG. 5, and the machine vision module 224 validates or certifies the scores to generate certified or validated test performance data 144 by performing machine vision on the video data.

The method 1400 includes, at 1410, sending, by the computer, the test performance data via the sports social media application. For example, the network interface 118 of the device 102, the first computer 104, or the third computer 108, sends the test performance data 144 (e.g., public test result data) to the second computer 106 for publishing or associating with the player user. As another example, the network interface 118 of the first computer 104 or the third computer 108 sends the test performance data 144 (e.g., public or private test result data) to the device 102. To illustrate, the sports social media application 128 (or the sports social networking application 208 thereof) sends the test performance data 144, via the network interface 118, to the second computer 106 which forwards the test performance data 144 to the device 102.

In some implementations, the method 1400 further includes generating voice instructions based on the test data. For example, the text-to-voice converter 214 generates audio based on test of the test data 142, and the speakers 124 outputs the audio which includes instructions for taking the test.

In some implementations, the method 1400 further includes, responsive to receiving the test data, generating a notification, an entry in a feed of the sports social media application, or both. For example, the sports social networking application 208 updates the GUI to generate a notification or an entry in a feed, as described with reference to FIG. 1.

Though certain aspects are described above with reference to use by coaches, it is to be understood that such descriptions are for illustrative purposes only, and are not to be considered limiting. The systems and methods of the present disclosure provide an end-to-end computing platform that provides various technological advancements and benefits over existing communication systems geared towards coaches, athletes, and teams. In 2016, the Sports and Fitness Industry Association (SIFA) estimated that in the United States, at least 51 million people between the ages of 6 and 17 played an organized sport yearly, which was 54% of that age segment. This is a significant increase as compared to estimates for previous generations: 32.5% for Generation Y/Millennials (born 1980-99), 19.2% for Generation X (born 1965-79), and 8.2% for Baby Boomers (born 1945-64).

The organized sports industry lacks an industry standard for measuring, tracking and evaluating the growth and progress of an athlete's performance over time. Though social media has influenced how coaches, athletes, and recruiters connect, conventional services like Facebook, Instagram, and Twitter are too broad and lack focus. The computing system described herein can, in some implementations, be packaged into a social networking app ecosystem with built-in certified testing program, for use by young athletes to track, measure, and share their performance and improve their skills at every level of the chosen sport.

Though it is to be understood that aspects of the present disclosure are not limited to any specific sport, in the basketball context, athletes may track their progress with respect to various tests and drills for shooting, ball handling, stand-still vertical jumping, maximum vertical jumping, lane agility, and court sprints. The machine learning/artificial intelligence aspects of the computing platform may also present specific skills analytics and make specific suggestions for improvement. Certified body measurement tests by a certified facility may also be supported, such as tests for height, weight, wingspan, etc. The certified facility may also offer verified testing (e.g., shooting tests) for which results are input by the facility and linked to the test-taker's profile. Self-testing may also be supported, both in terms of results entry as well as video upload of the test for verification/viewing on the test-taker's profile (e.g., by a coach or recruiter).

Figure 15:
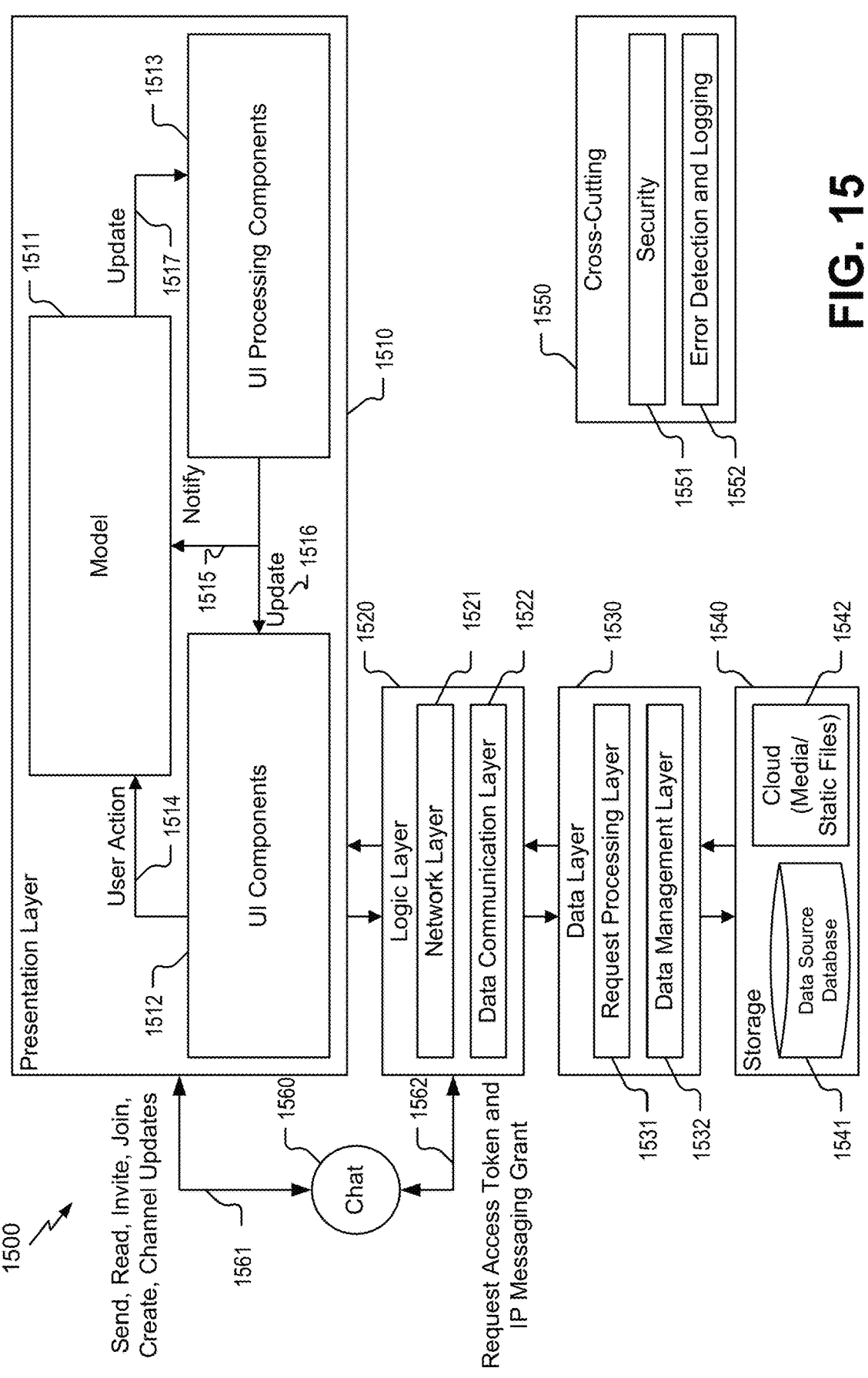
FIG. 15 illustrates another example of a system configured to operate in accordance with the present disclosure.

FIG. 15 illustrates an example of various computing components that may be included in the computing platform, and is generally designated 1500. FIG. 15 is organized into various "layers" that are in communication with each other. Each layer may be implemented using hardware and/or software (e.g., instructions executable by one or more processors). Each layer may be located within multiple computing devices or within a single computing device. Further, more than one layer (or a portion thereof) may be included in the same computing device. To illustrate, certain components illustrated in FIG. 15 may be part of an app, where different instances of the app are installed on different mobile computing devices.

The example of FIG. 15 includes a presentation layer 1510, a logic layer 1520, a data layer 1530, and storage 1540. The presentation layer 1510 includes a model 1511, user interface (UI) components 1512, and UI processing components 1513. The model 1511 may encapsulate application state, respond to state queries, expose application functionality, and notify views of changes in data, etc. that is used to generate the views. The UI components 1512 may render the model 1511, request updates from the model 1511, send user gestures to (e.g., to a controller), and enable (e.g., by a controller) selection of an "active" view. The UI processing components 1513 may define application behavior, map user actions to updates of the model 1511, and select a view for responding to a user action. In some examples, there may be a UI processing component for each piece of functionality supported by an app. As shown in FIG. 15, components of the presentation layer 1510 may communicate in conjunction with various events, such as user actions 1514, notifications 1515, and updates 1516, 1517.

The logic layer 1520 may include a network layer 1521 and a data communication layer 1522. The network layer 1521 may communicate with device hardware, such as sensors, cameras, etc. on board the mobile device. In some examples, the network layer 1521 communicates with a transport layer (not shown) to access the device hardware. The data communication layer 1522 may communicate with remote server(s) to retrieve data for presentation on a display of the mobile device and to save user data to the remote server(s).

The data layer 1530 may include a request processing layer 1531 and a data management layer 1532, where the request processing layer 1531 receives and forwards user requests to the data management layer 1532. The data management layer 1532 may perform operations on data. For example, the data management layer 1532 may retrieve data from the storage 1540 The storage 1540 may include a data source database 1541 as well as media and/or static files 1542 that are stored in the cloud.

In some examples, there may be cross-cutting functionality 1550 present in the system, such as security functions 1551 and error detection/logging functions 1552. Such functionality may be considered "cross-cutting" because it may tie into multiple "layers" of the illustrated system architecture.

In particular aspects, a chat engine 1560 may be used in conjunction with certain operations involving the presentation layer 1510 and the logic layer 1520. For example, when the system utilizes token-based security, the chat engine 1560 may support communication 1562 for requesting an access token and granting authorization for internet protocol (IP) messaging. As another example, the chat engine 1560 may support communication 1561 for send, read, invite, join, create, and channel update messages. The chat engine 1560 may also be used for one-to-one and group chat messaging between users of the app.

In a particular aspect, when a coach creates a test (e.g., a skills test), the coach may input a user (e.g., player), distance, and test information at the presentation layer 1510. The logic layer 1520 may return data to requesting process (es), send a request to a server to create a test based on the information provided by the coach, etc. Test information may be saved in the database 1541. The server may create a test and send test details to the presentation layer 1510. The test may be performed in the presentation layer 1510 (at the player's phone), and after the test is complete, the result of each shot may be sent to the server. The server may calculate the score of the test and may save the score (and other test information, such as date, time, etc.) in association with the test-taker's profile. The coach can also send a test score to a player from the presentation layer 1510.

In a particular aspect, when a player executes a test, the test may be performed at the presentation layer 1510. The logic layer 1520 may return data to requesting process(es) and may store test data in the database 1541. The test may be available on a player results screen of the mobile app.

In a particular aspect, when a certified testing center provides test results, a user at the certified testing center user "takes" a test on the presentation layer 1510 and saves test results in the database 1541 (the test results are of the player whose test-taking is being monitored by the user at the certified testing center). The test score may be sent to the player. The score of the test may be marked as "official" or "certified." Certified tests may be those for which video is attached to the test.

In a particular aspect, when a player posts a video, the video is posted from the presentation layer 1510. The presentation layer 1510 may interact with the network layer 1521 along with video data, and may send the video data to the data layer 1530, which in turn may process the video data and create a post for the video and add it in the player's "album" (which is viewable in the app).

FIGS. 16-34 show screenshots of a mobile app in accordance with the present disclosure. Although some screenshots are in portrait orientation and others are in landscape orientation, this is not to be considered limiting. Similarly, mobile phone or tablet device aspect ratios are not to be considered limiting.

Figure 16:
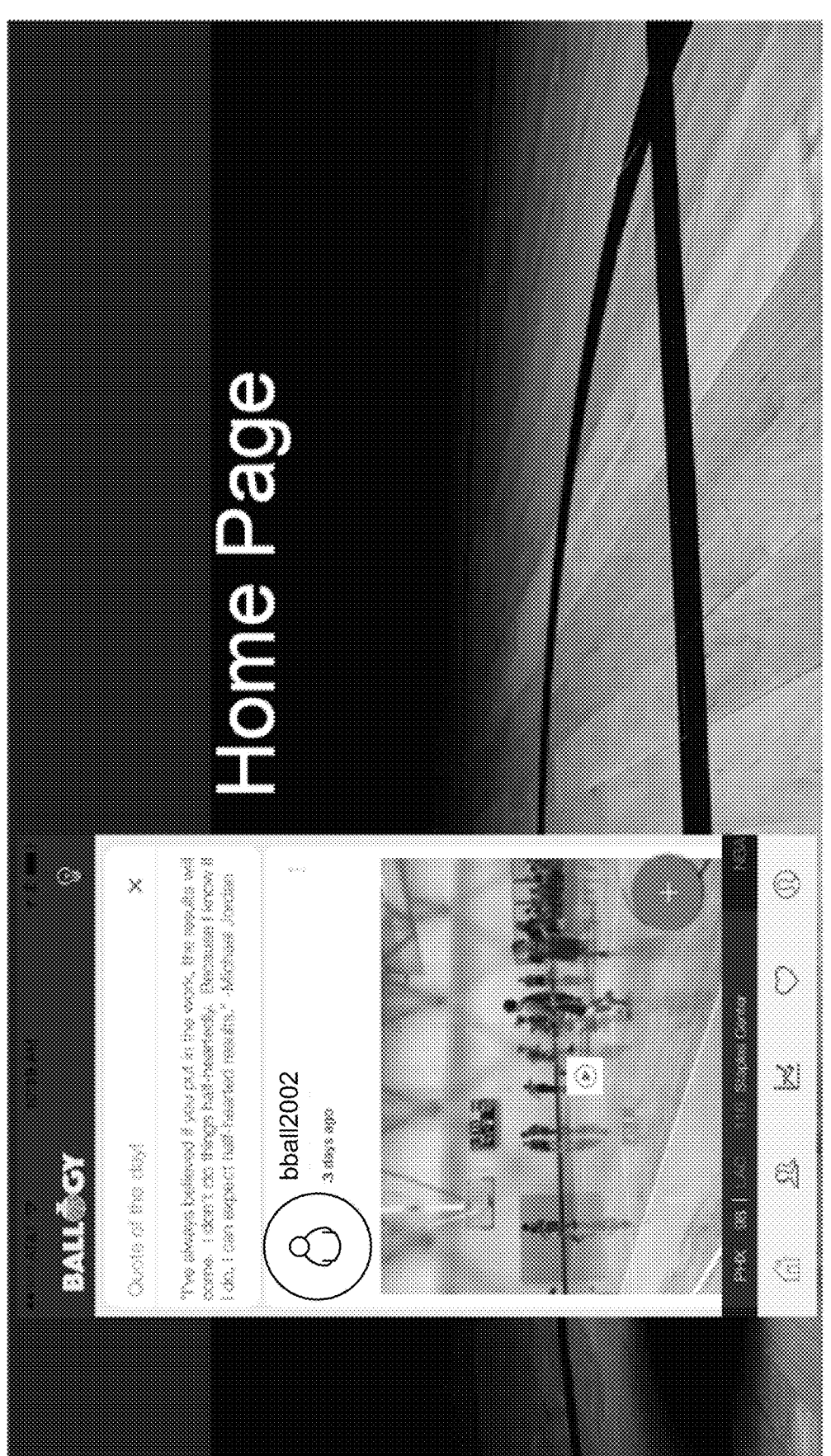
Figure 17:
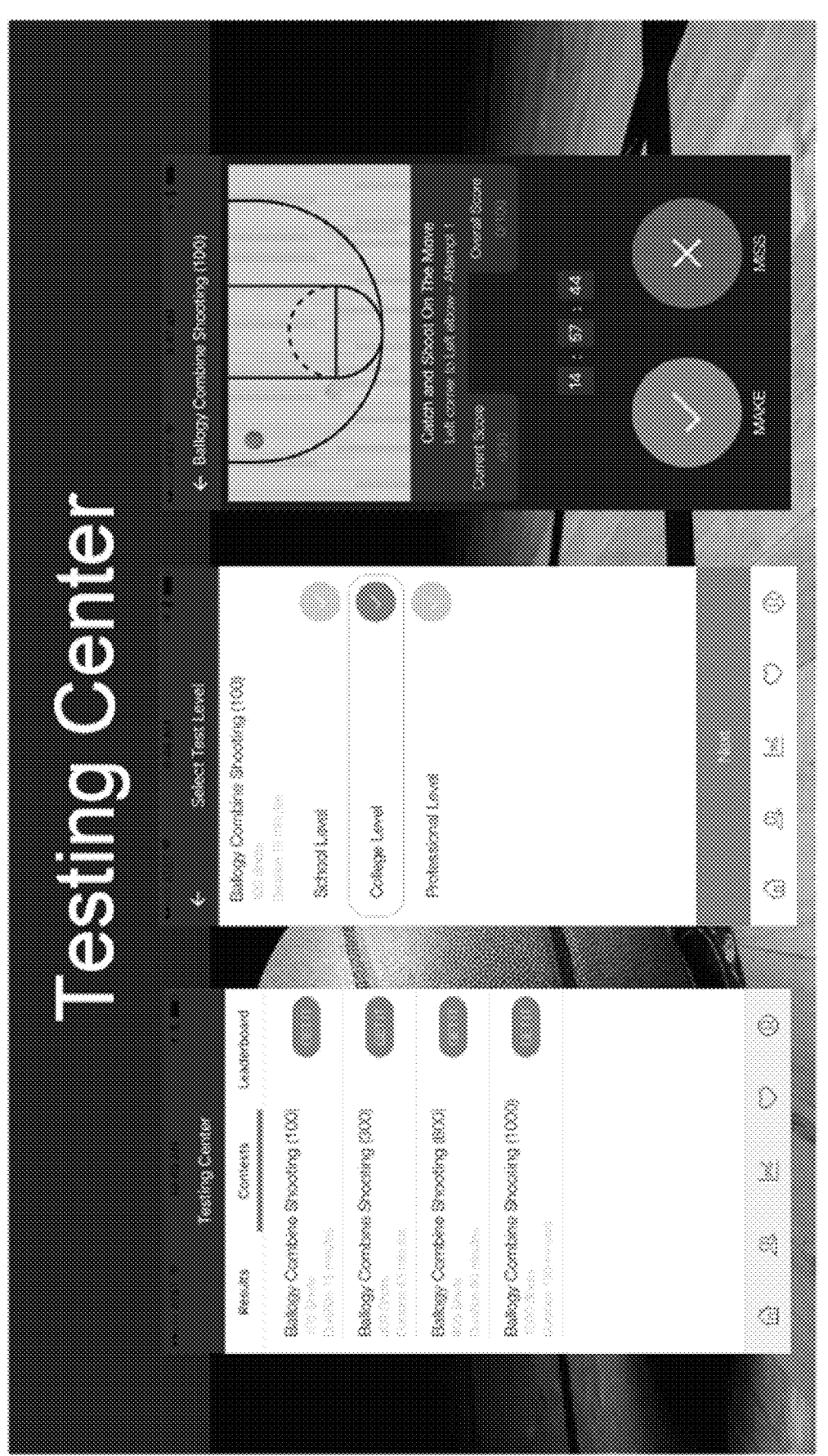
Figure 18:
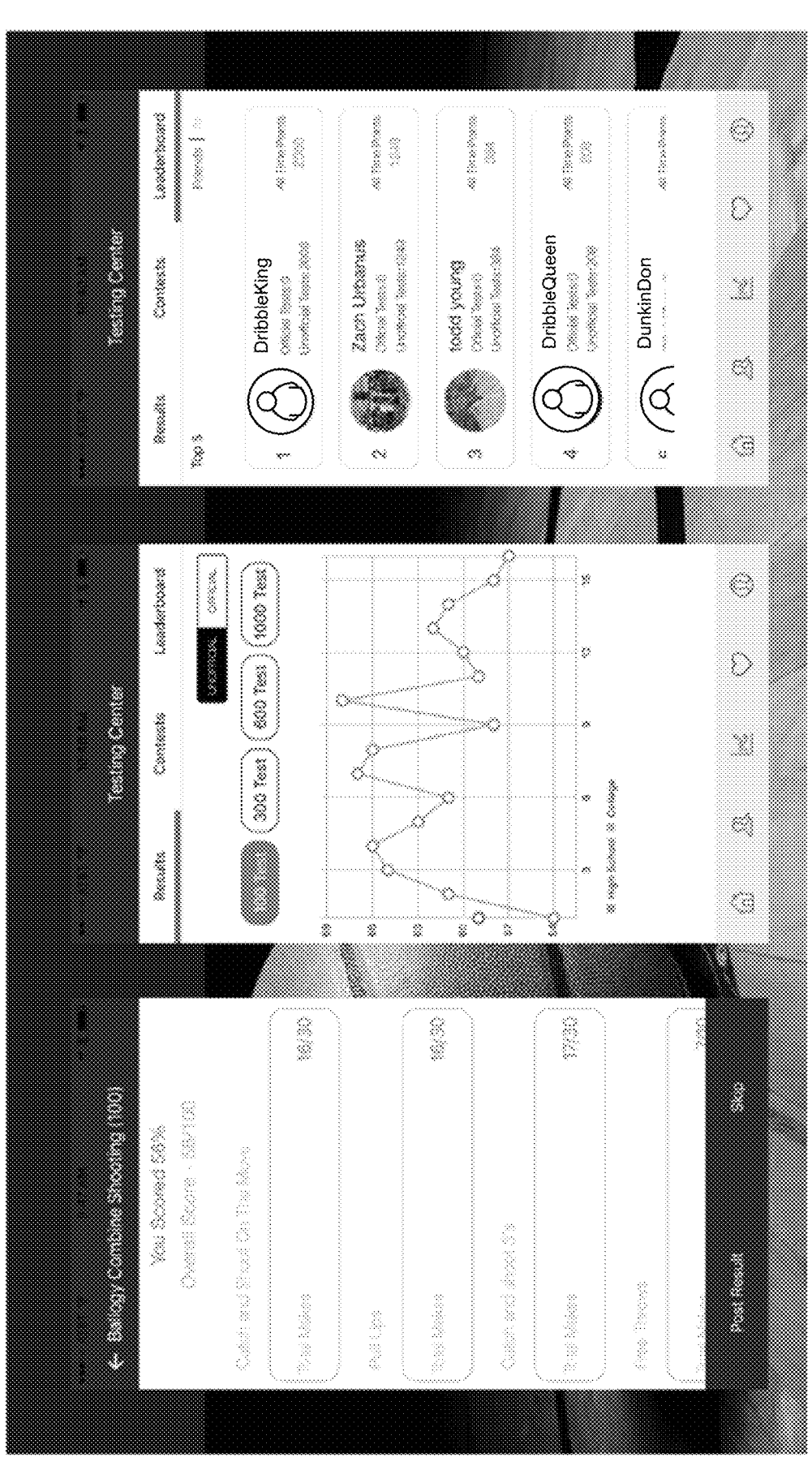
Figure 19:
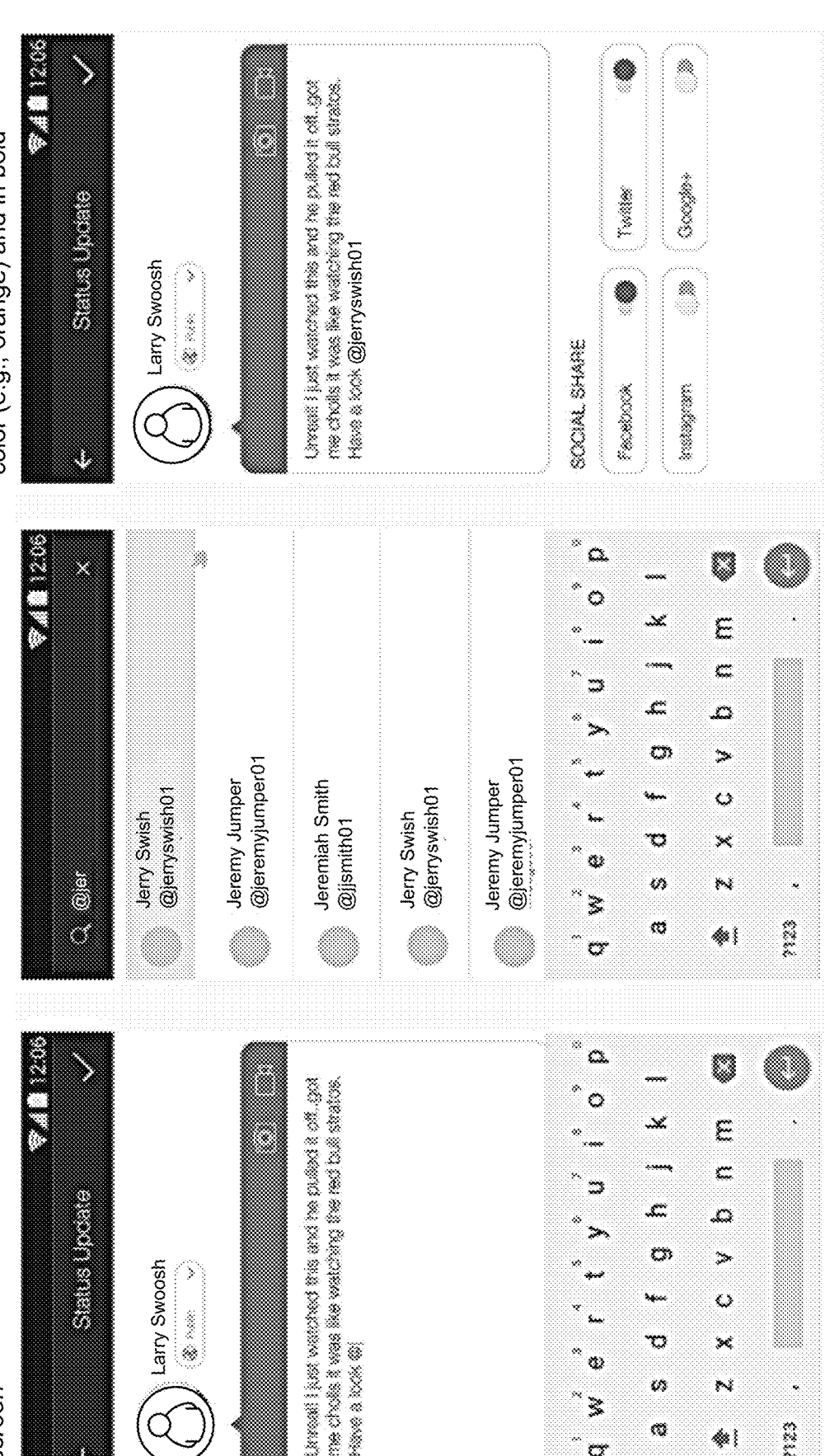
Figure 20:
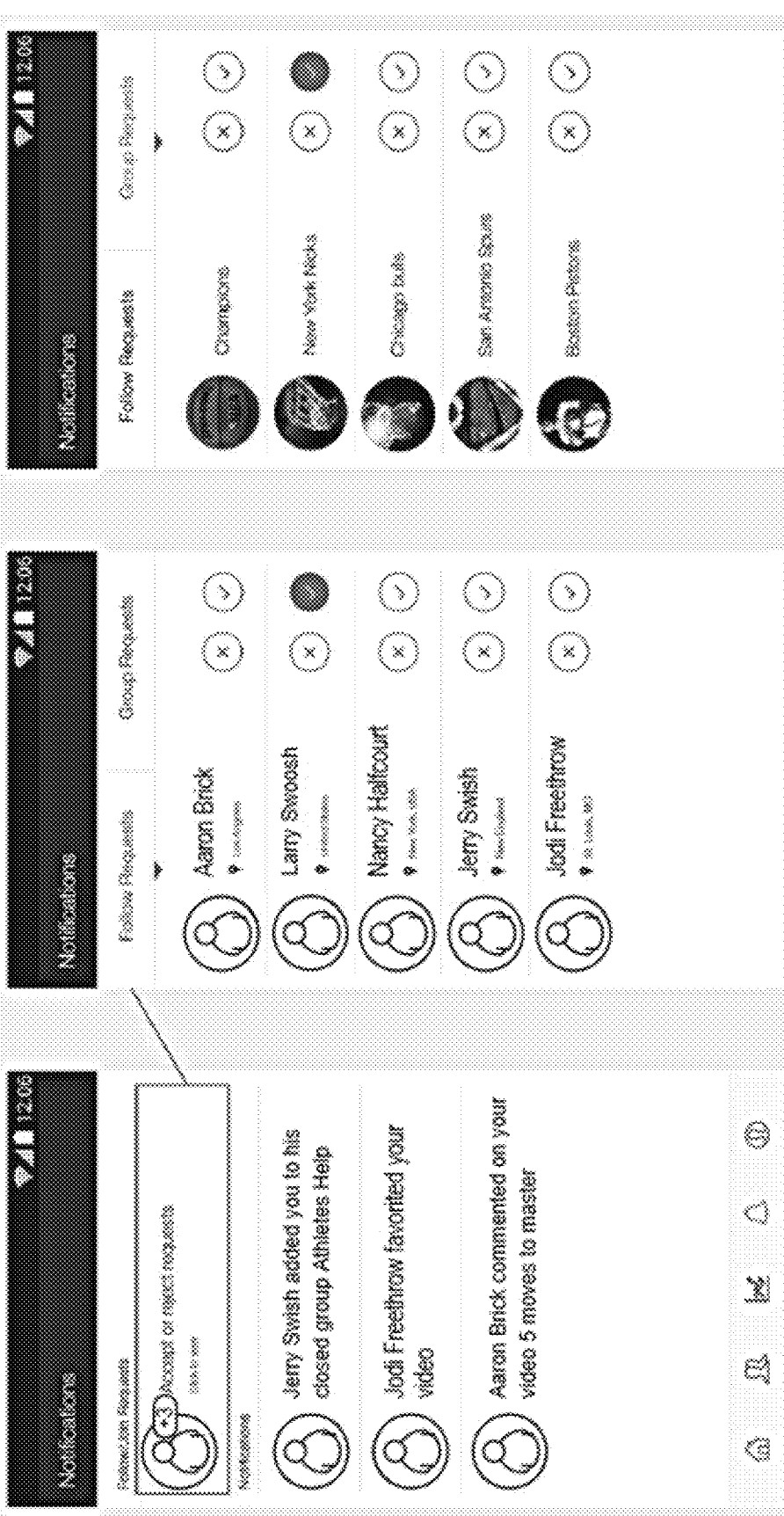

FIG. 16 shows an example of a home page of the app, which includes a recent social media post and a quote of the day. FIGS. 17-18 show screenshots in association with entering test results, viewing a visual representation of a test and entering make/miss information for each shot, setting player skill level, viewing player progress on a test, and viewing a friends leaderboard or an all players leaderboard for a test. FIG. 19 shows screenshots associated with posting a social media status update in the app (the posting of such status updates may trigger push notifications on the mobile devices of other players that are friends with the posting player). FIG. 20 shows screenshots of in-app notifications. As shown by the bounding box on the left screenshot and the line between the left screenshot and the middle screenshot, the middle screenshot corresponds to a GUI that is reached by selecting "Accept or reject requests" on the GUI corresponding to the left screenshot. Similar bounding box/connector line visual indicators are used in other FIGS. to illustrate similar GUI linkage.

Figure 21:
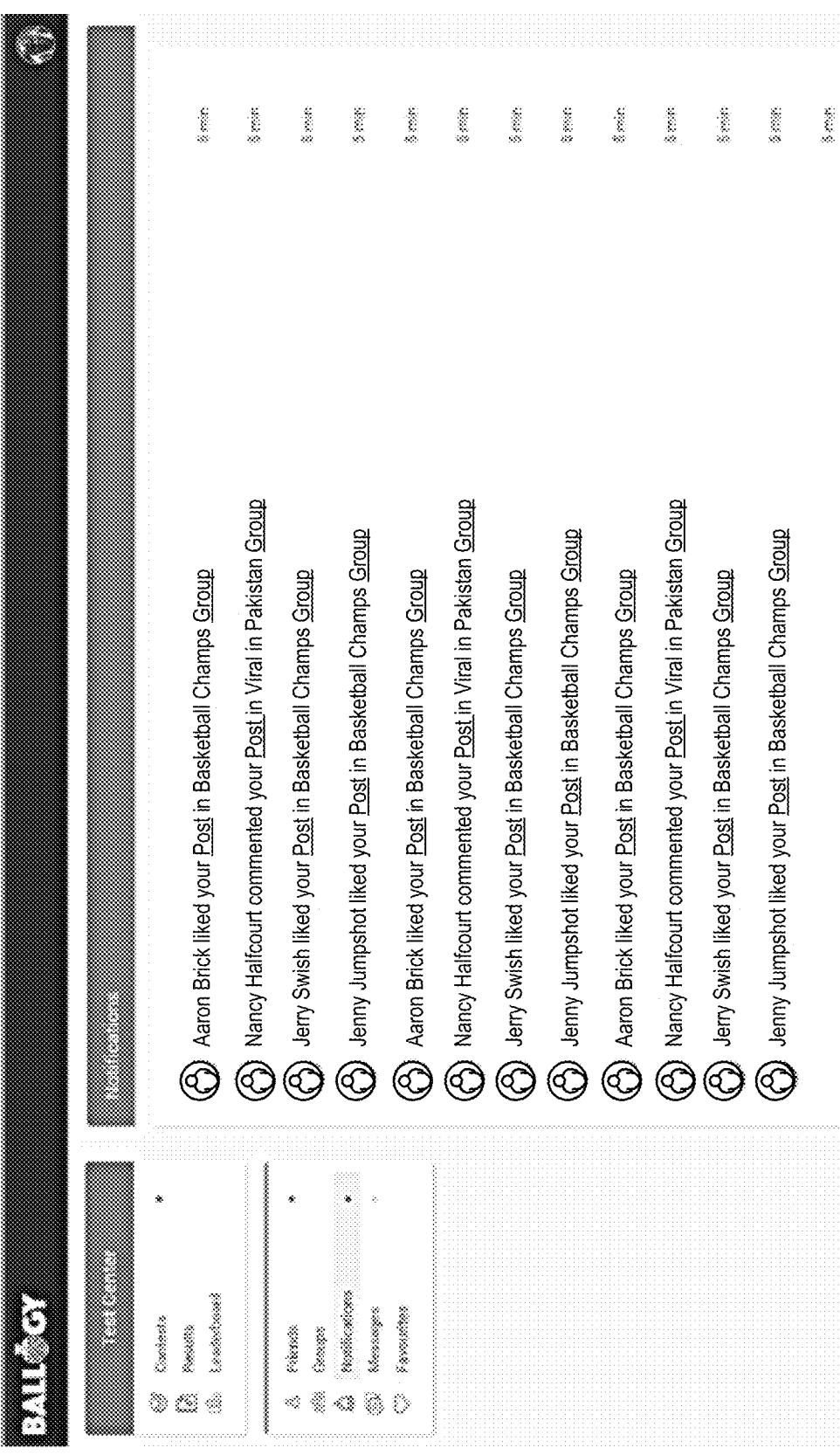
Figure 22:
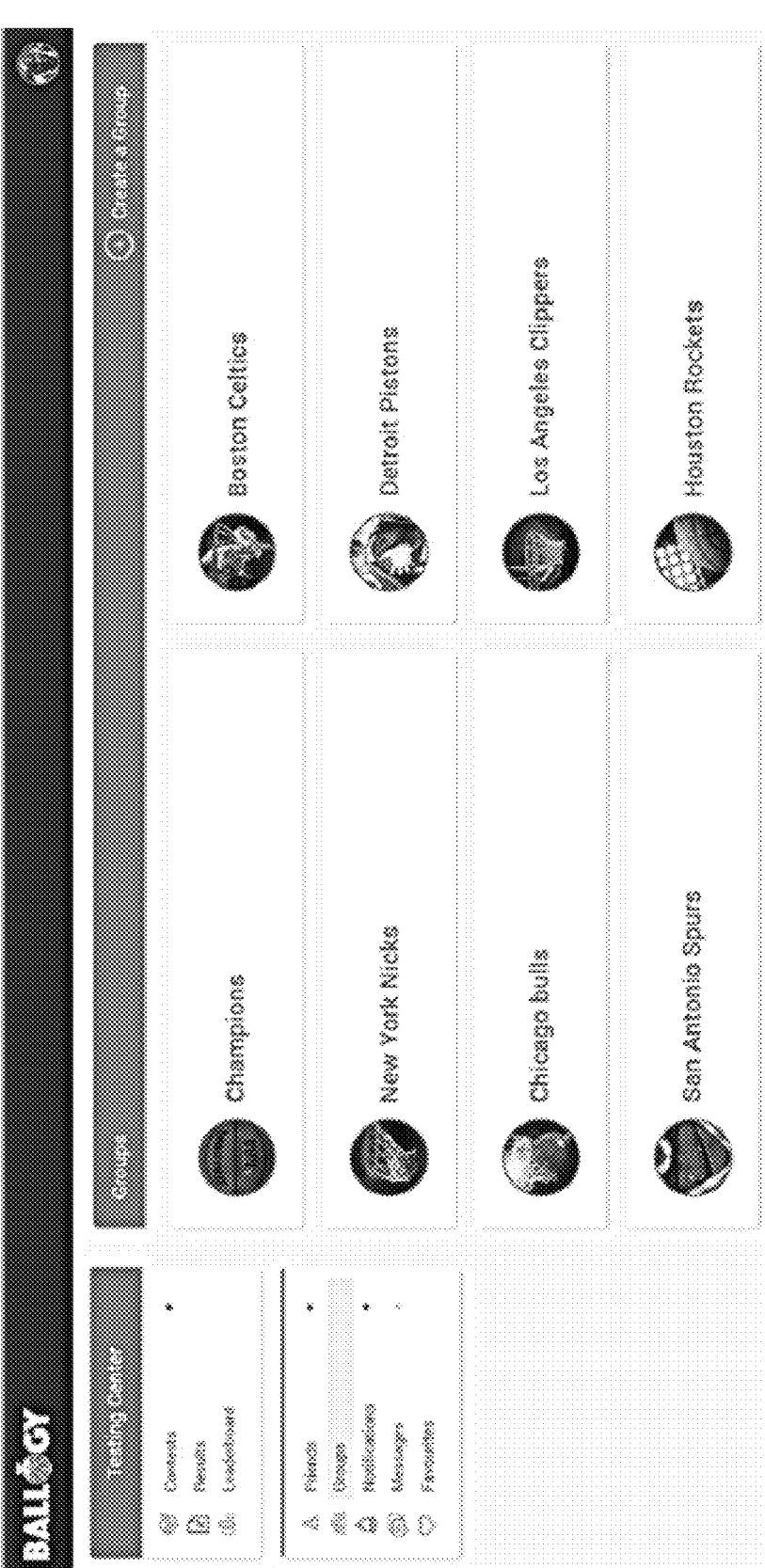
Figure 23:
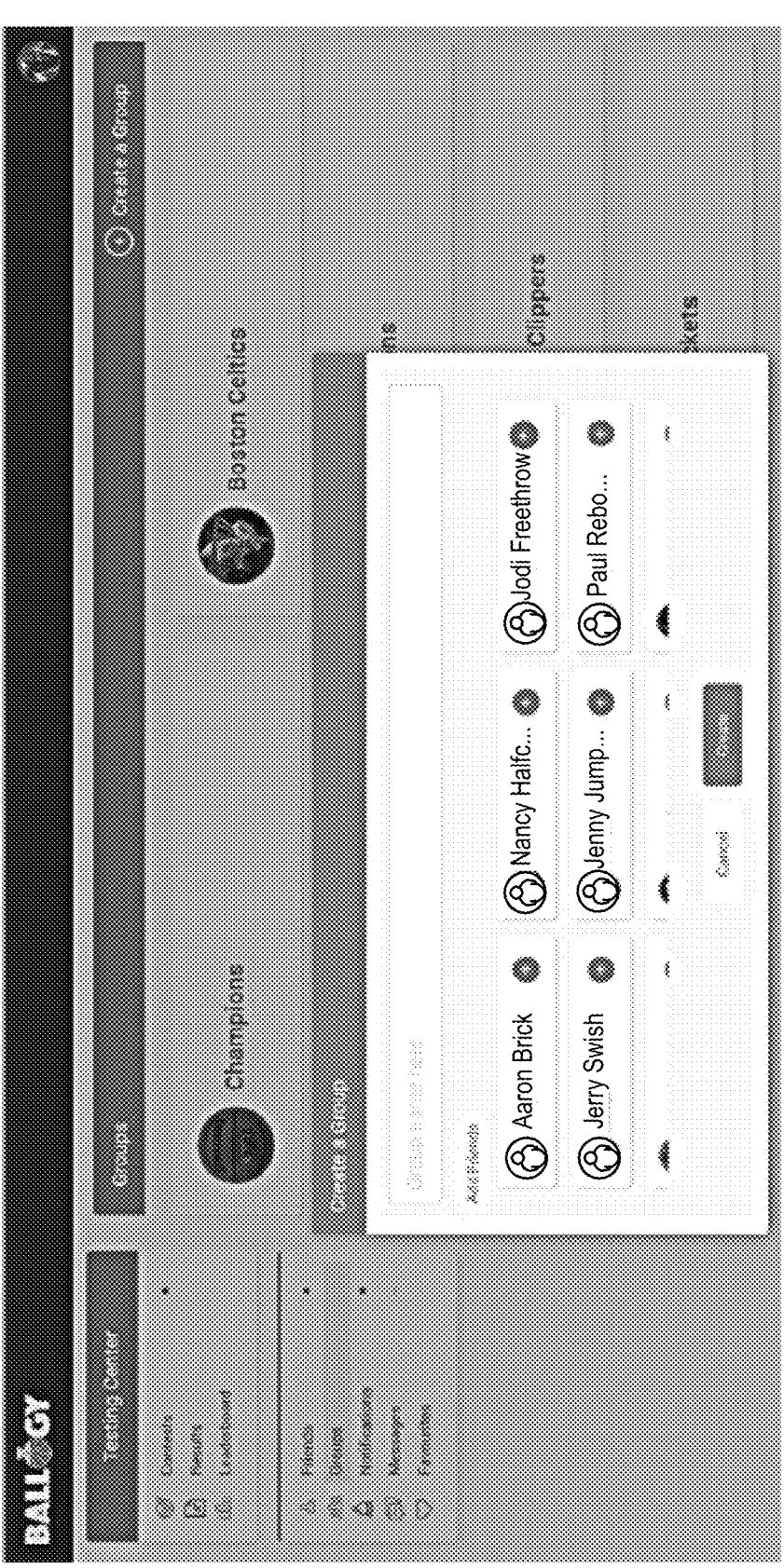
Figure 24:
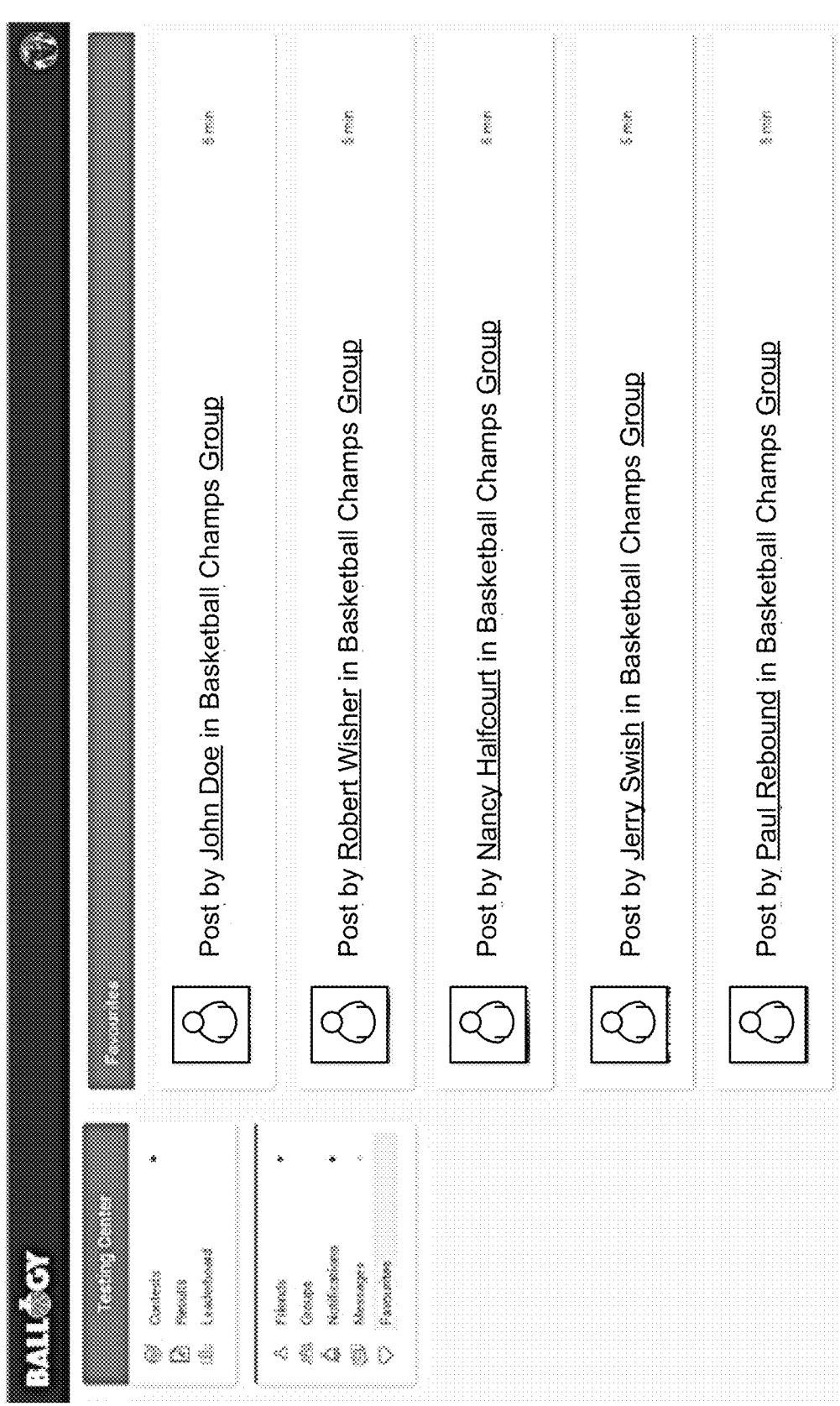
Figure 25:
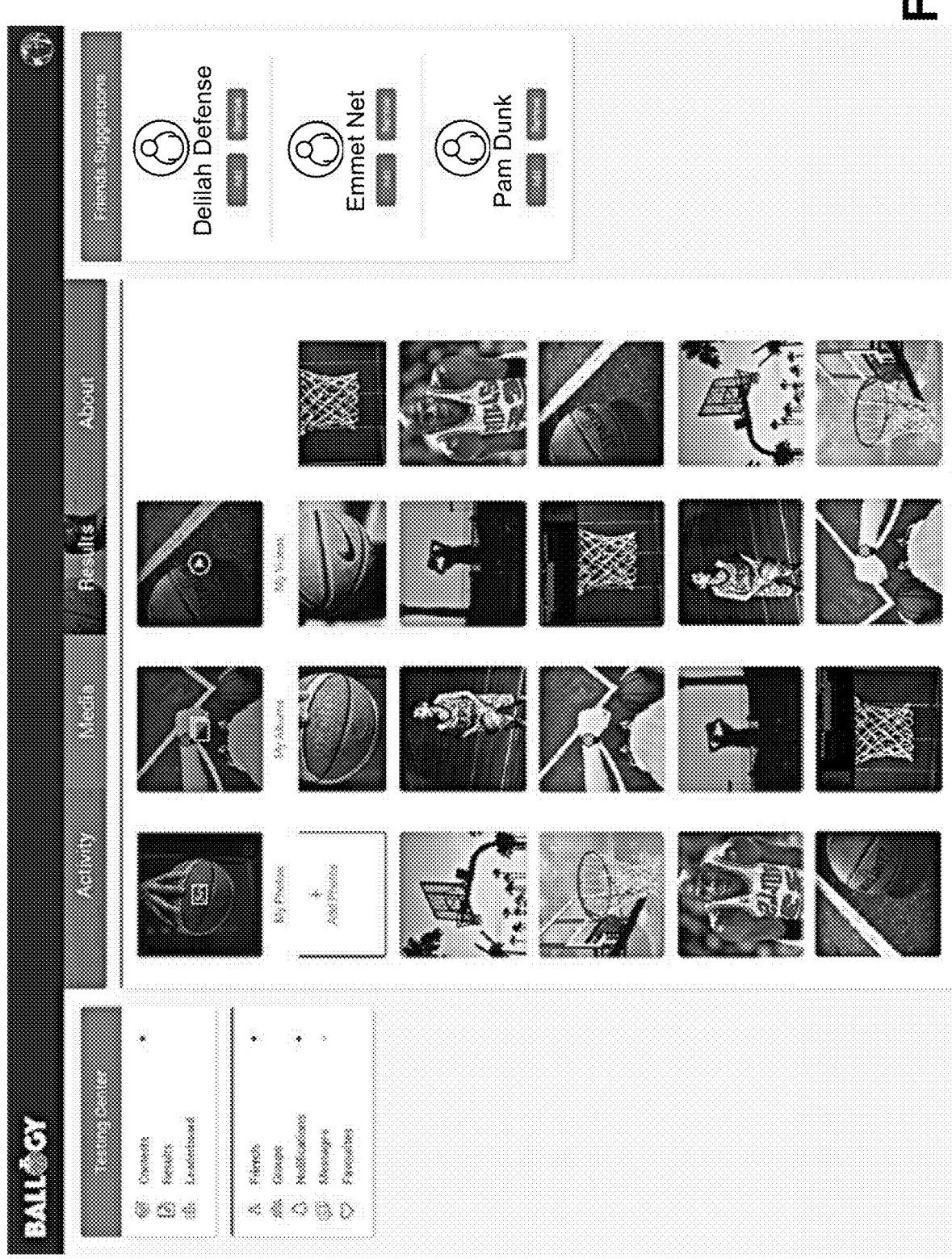
Figure 26:
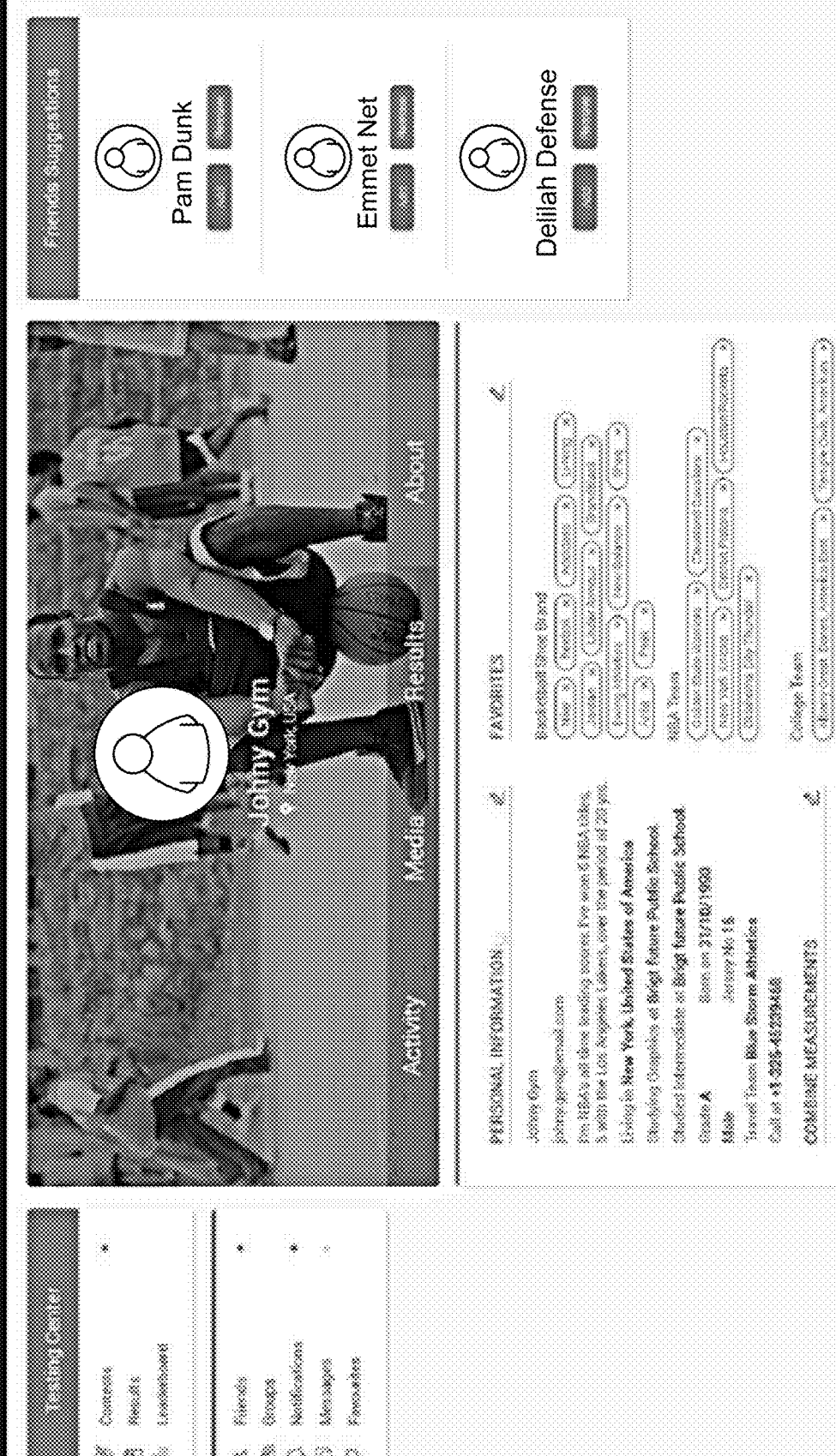
Figure 27:
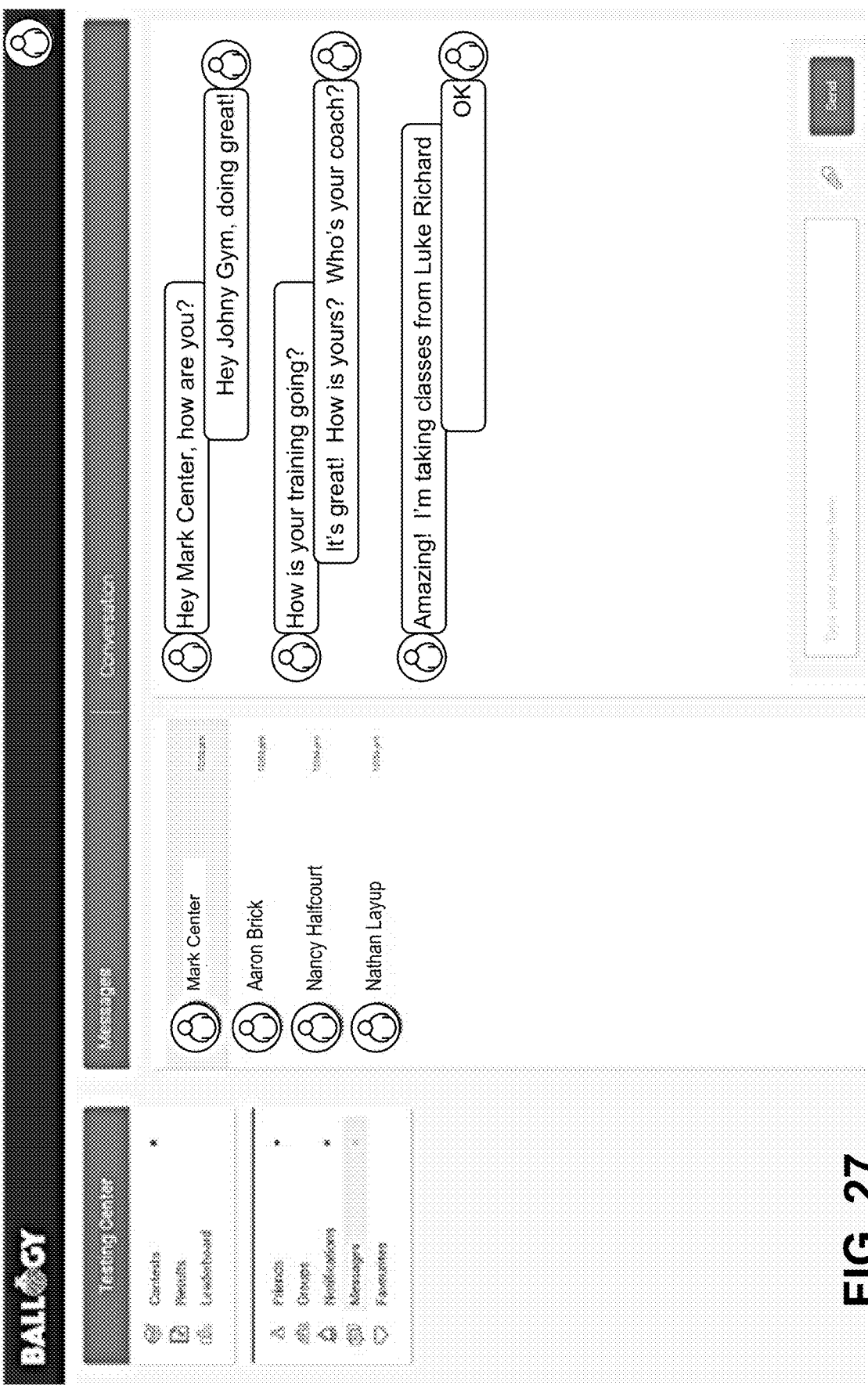
Figure 28:
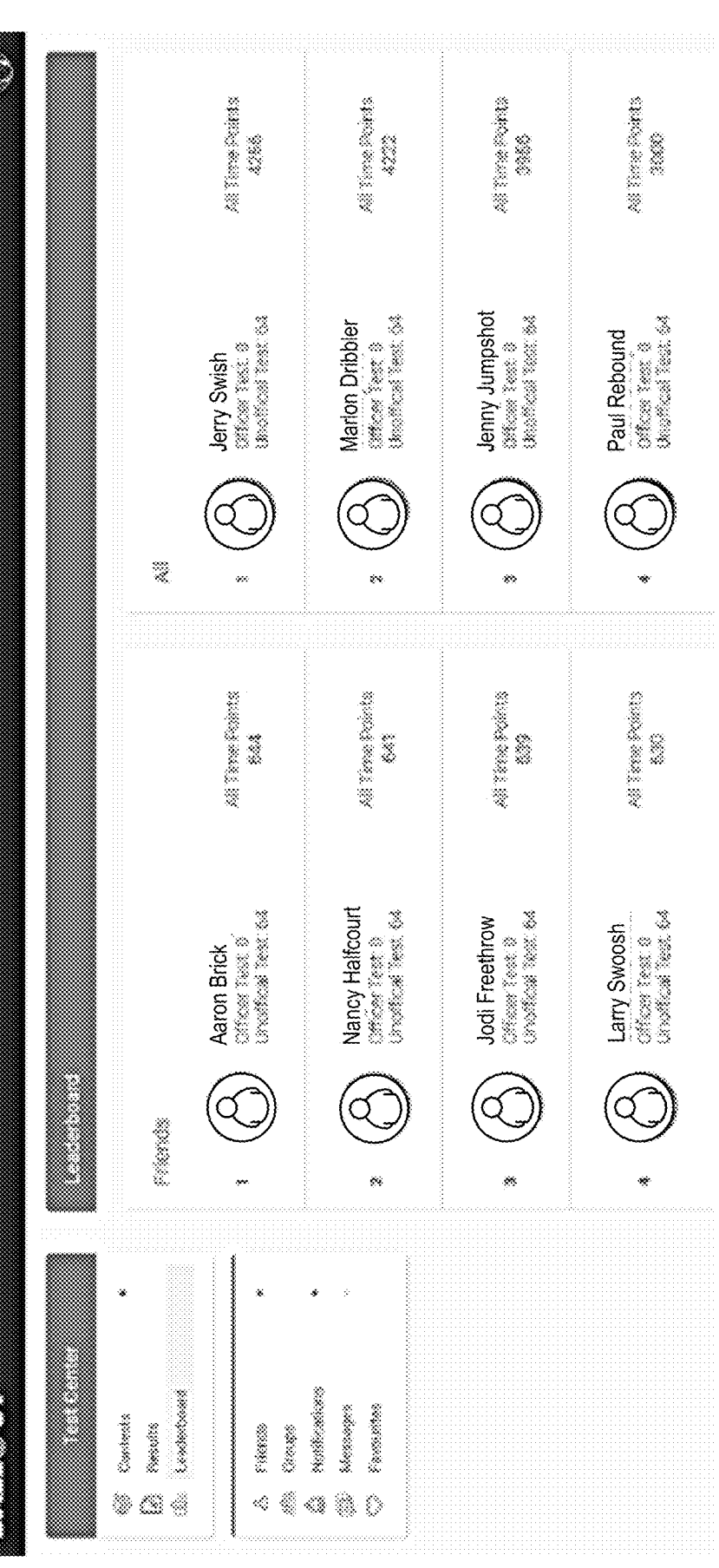

FIG. 21 shows a screenshot of a notifications list. FIG. 22 shows a screenshot of viewing groups, where the user may join/follow one or more of the groups. FIG. 23 shows a screenshot of creating a group and adding friends to the group. FIG. 24 shows a screenshot of a favorites list. FIG. 24 shows a screenshot of user-uploaded media. FIGS. 25 and 26 show screenshots of a player profile. FIG. 27 shows a screenshot of an in-app messaging interface. FIG. 28 shows a screenshot of a leaderboard page. FIG. 29 shows a screenshot of another example of an automatically generated social media feed for a user. FIGS. 30 and 31 show screenshots of managing friends and followers. FIG. 32 shows screenshots associated with user-to-user messaging. FIGS. 33 and 34 shows screenshots associated with group communication.

In some implementations, a backend administration user interface (e.g., "panel") may enable management of various functions. For example, an administrator may use a backend user panel to review content that has been "reported" (e.g., as being offensive, illegal, or otherwise violating terms of use), design new tests and drills, changing existing tests and drills, adding videos for tests, manage official college/school/trainer accounts, etc. Similarly, specific panels may be supported for specific users or types of users. To illustrate, a college user or school user panel may enable viewing of player profiles, which may show official/unofficial test scores, combine measurements, player-uploaded and third-party media featuring the player, etc. The panel may also enable searching for athletes on the basis of various attributes, test scores, etc. As another example, a test center user panel may enable entry of test scores/combine measurements by personnel at certified testing facilities. The test center user panel may support searching for players (e.g., by name) so that it can be verified that a particular player has a subscription that includes certified testing. As yet another example, a coach panel may enable functions described with reference to FIGS. 1-14. To illustrate, a coach may use the coach panel to administer unofficial and official tests, perform player evaluations, group players, view leaderboards, etc.

A test or drill may be represented by a compressed data structure that is efficiently communicable between a backend server and an app executing on a mobile device. Thus, a coach can "send" a brand new test to a player by defining the test in his mobile app (or via the coach panel), which encodes the test into a compressed data structure and communicates the test to the backend server, which sends the compressed data structure (and optional header information/metadata) to the player's mobile app (e.g., via push notification). Consider, as an illustrative non-limiting example, a coach defining a new shooting test that involves the player shooting 5 three-point shots from each of 5 shooting positions in a star pattern (e.g., left corner→top→right corner→left wing→right wing). The coach may use a touchscreen of their mobile device to tap on a visual representation of a basketball court (or half court) to enter the sequence of five shooting spots and the number of required attempts from each spot. The coach may optionally enter point or negative points values to be awarded for makes or misses, time limits that will apply to the test, etc. The mobile app on the coach's mobile device may encode test information into the compressed data structure. In an illustrative non-limiting example, the compressed data structure includes a linked list of testing nodes, each node representing one or more of an on-court location, a player action (e.g., shoot, run, pass, etc.), attributes (e.g., number of attempts, point values, time limit, etc.). There may also be attributes for multiple testing nodes or for the test as a whole (e.g., overall time limit, number of rounds/iterations, etc.).

When the player's mobile device "opens" the new test from the coach, the mobile app may decode the data structure to automatically generate instructions and a visual representation of the test. For example, a visual representation of the basketball court (or half court) may be shown along with an automatically generated animation of corresponding to the data structure. To illustrate, for the start pattern three-point shooting test described above, the animation may depict one (or five) three-point shot attempts in the star pattern (e.g., left corner→top→right corner→left wing→right wing). The visual representation may also include attributes from the data structure (e.g., five attempts from each shooting location, time limit, etc.). When player movement is part of the test, such movement may be graphically indicated using color, icon size, icon shading, etc. In some examples, a new test may be created based on a previously stored test template.

In a particular aspect, a test may be dynamically adjusted depending on information regarding the player taking the test. For example, if the coach uses a generalized input for a shooting location (e.g., corner, mid-range, post block, top of the key, etc.), then the mobile app on the player's mobile device may automatically translate such input into a specific location and specific instruction text that varies depending on whether the player's age, skill level, etc. To illustrate, distances from the basket for high-school/college/professional levels, and icon placement in the mobile app to illustrate the test, may be dynamically determined as follows: catch and shoot on the move: 15' (i.e., 15 ft.)/15'/20'9" (i.e., 20 ft. 9 in.), pull-up two-pointer: 19'9"/20'9"/23'9" in., catch and shoot three-pointer: 19'9"/20'9"/23'9", one-dribble pull-up two-pointer: 19'9", 20'9", 23'9", pin curl mid-range two-pointer: 15'/15'/15', straight cut three-pointer: 19'9"/20'9"/23'9" (wings) or 22' (corner), fade three-pointer: 19'9"/20'9"/22' (corner), mid-range catch-and-shoot: 15'/15'/20'9", post reaction: 15'/15'/15', pick-and-pop mid-range: 15'/15'/15', lift/drift three-pointer: 19'9"/20'9"/22' (corner), straight mid-range pull-up two-pointer: elbow area/elbow area/elbow area, change of direction pull-up two-pointer: elbow area/elbow area/elbow area, straight pull-up three-pointer: 19'9"/20'9"/23'9", and change of direction pull-up three-pointer: 19'9"/20'9"/23'9". In some examples, visual representations and instruction text may also be dynamically adjusted based on the player's location, e.g., the international three-point line is 22'1.75" from the basket at the top of the key rather than the 20'9" distance for U.S. college basketball or the 23'9" distance for U.S. men's professional basketball.

In a particular aspect, computer vision algorithms for make/miss verification may also be dynamically adjusted based on attributes of the player. For example, if a computer vision algorithm is being processing video of the player to verify that the player is shooting from the correct locations on the court for the start pattern test described above, the "zones" corresponding to the five shooting locations may be in different places relative to the basket depending on the player's level. To illustrate, the corner three point zones may be 19'9" from the basket if the player is high school level, but may be 22' from the basket if the player is pro level. Examples of computer vision algorithms for make/miss verification are further described herein.

In an example, tests may be categorized as combine shooting tests and advanced tests. A combine shooting test may include multiple rounds of different exercises, may have time limits even though time does not impact scoring (scoring may be solely determined based on makes/misses), and may weight each shot the same. Advanced tests may include a single round of each exercise, may be time dependent (e.g., different scores based on time taken to complete the test), and may weight different shots differently. Tests may also be classified as unofficial tests (player enters test result on the "honor system"), official tests (personnel at a certified testing center enters test results), and certified tests (an official test once a video of test is also uploaded or verified). Combine measurements may similarly be unofficial, official, or certified.

In a particular aspect, tests may be scored in accordance with one or more of three scoring systems: point-based scoring, limited time-based scoring, and minimum time-based scoring. Point-based scoring may be agnostic to the time taken to complete a test, e.g., a person that makes 90 of 100 free throws may get a score of 90 regardless of whether the test took several hours to complete or just a few minutes to complete. Limited time-based scoring may determine a score based on how long it took the player to complete the test. For example, a limited time-based score may be determined based on the expression total_score=(time_allowed-_in_seconds—time_taken_by_athlete_in_seconds)+number_of_makes_by_athlete. Minimum time-based scoring may determine a score based on the number of makes and misses during a particular time window. For example, a minimum time-based score may be determined based on the expression total_score=number_of_makes_by_athlete+time ratio*number_of_makes_by_athlete.

FIGS. 35-52 illustrate examples of various tests in the field of basketball. Text alongside the images explain the nature of the test, and at least a portion of such text may be displayed in the app in conjunction with the test. It should be noted that the specific tests shown and described herein are for illustration only and are not to be considered limiting. In images that include multiple basketball icons, the icons represent endpoints for animations illustrating player movement. For example, in each of the images in FIG. 51, the player is instructed to move back and forth between two positions on the basketball court and shooting from each position in catch-and-shoot fashion.

The methods described herein, including but not limited to the methods 1200, 1300, and 1400 of FIGS. 12-14, may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1200 of FIG. 12 can be initiated or controlled by one or more processors, such as one or more processors included in a control system. In some implementations, a portion of one of the methods 1200, 1300, and 1400 of FIGS. 12-14 may be combined with a second portion of one of the methods 1200, 1300, and 1400 of FIGS. 12-14 and/or combined with one or more operations described with reference to FIGS. 1 and 2. Additionally, one or more operations described with reference to the methods 1200, 1300, and 1400 of FIGS. 12-14 may be optional and/or may be performed in a different order than shown or described. Two or more operations described with reference to the methods 1200, 1300, and 1400 of FIGS. 12-14 may be performed at least partially concurrently.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description. For example, and as described in other portions of the present disclosure, the techniques described herein may applied to other sports and other athletic movements. For example, similar techniques may be applied to training and evaluating athletes hitting capabilities in sports like baseball, golf, tennis, and others. Likewise, the techniques described herein can be applied to training and evaluating athletes throwing capabilities in sports like football, baseball, and many others. In fact, the techniques described herein can be applied to many other athletic activities and physical movements such as running, track and field activities, skating, conditioning activities, injury rehabilitation activities, kicking activities, and many others. The techniques related to the interactions between coach and players can even be extended to apply in non-athletic endeavors where the role of teacher and student, mentor and mentee, or similar relationship exists, whereby one entity (e.g., a person, a management team) provides guidance, training activities, teamwork activities to another entity (e.g., another person, a group of employees). Furthermore, the social media tools and mechanisms described herein may be applied to contexts outside of the sports world, such as leveraging the social media elements described herein for a team of sales personnel.

An aspect of the present disclosure includes a method comprising: selecting, by a computer using a sports social media application, a test; selecting a user to send the test to; and sending, by the computer using the sports social media application, test data associated with the test to a device associated with the user. An aspect of the present disclosure includes, prior to selecting the test, creating the test via a custom test builder module of the sports social media application. An aspect of the present disclosure includes receiving, by the computer using the sports social media application, test performance data from the device associated with the user or from a server. An aspect of the present disclosure includes generating forward projections based on the test performance data and aggregate data. An aspect of the present disclosure includes wherein the forward projection includes expected points, goals, assists, rebounds, blocks, steals, runs scored, at-bats, strikes, outs, or a combination thereof, and wherein the aggregate data includes test performance data for other users. An aspect of the present disclosure includes generating team forward projection based on the test performance data and aggregate data. An aspect of the present disclosure includes wherein the team forward projection includes expected wins, losses, win streaks, loss streaks, win percentage, opponent predictions, weather predictions, and wherein the aggregate data includes open domain data. An aspect of the present disclosure includes receiving, by the computer using the sports social media application, certified test performance data from a second device associated with a test center. An aspect of the present disclosure includes wherein selecting a user includes selecting a roster including the user and one or more other users, and further comprising sending the test data to devices associated with the one or more other users. An aspect of the present disclosure includes prior to selecting the user, searching for the user by username, name, affiliation, or a combination thereof. An aspect of the present disclosure includes generating visuals based on the test performance data, forward projections, or both.

An aspect of the present disclosure includes a method comprising: searching, by a computer using a sports social media application, for a user; selecting the user; selecting a test for the user; initiating administration of the test; generating test performance data based on the test; and sending, by the computer using the sports social media application, the test performance data. An aspect of the present disclosure includes wherein the test includes a combine measurement, a running drill, a shooting drill, a throwing drill, a hitting drill, a passing drill, or a combination thereof. An aspect of the present disclosure includes wherein sending the test performance data includes publishing the test performance data via the sports social media application. An aspect of the present disclosure includes wherein sending the test performance data includes sending the test performance data to a device associated with the user. An aspect of the present disclosure includes generating, by the sports social media application, a second test, coaching tips, or both, based on the test performance data. An aspect of the present disclosure includes receiving notes into the sports social media application, capturing video and performing machine vision analysis on the video, indicating performance results via user inputs, or a combination thereof, during administration of the test.

An aspect of the present disclosure includes a method comprising: receiving, at a computer via a sports social media application, test data to be performed by a user associated with the computer; initiating a test based on the test data; capturing video of the user performing the test; generating test performance data based on the video; and sending, by the computer, the test performance data via the sports social media application. An aspect of the present disclosure includes generating voice instructions based on the test data, and wherein the test data is received from a first device and the test performance data is sent to a second device. An aspect of the present disclosure includes responsive to receiving the test data, generating a notification, an entry in a feed of the sports social media application, or both.

An aspect of the present disclosure includes a system comprising: a server; a first device configured to create a test, send a test, receive a result, and generate expected results; and a second device configured to receive the test, administer the test, send the test results.

An aspect of the present disclosure includes a smartphone comprising: a touchscreen display; a camera; sensors; a processor; a memory; and a sports social media application including a social networking application; a test builder application; and a recurrent neural network.

The Abstract is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:

receiving, at a computer via a sports social media application, test data to characterize a test to be performed by a basketball player selected by a processor of the computer, wherein the test assesses an ability of the basketball player to perform a specified athletic skill;

the test including at least one or more of a combine measurement, a running drill, a shooting drill, a throwing drill, or a passing drill;

initiating the test corresponding to the test data;

capturing video of the basketball player performing the test;

generating, via one or more machine learning and/or artificial intelligence components of the sports social media application, test performance data upon application of the captured video to the test data according to data collected via the sports social media application from a plurality of users, wherein the test performance data characterizes one or more aspects of the ability of the basketball player to perform the specified athletic skill; and sending, by the computer, the test performance data via the sports social media application to an electronic device associated with one or more of the plurality of users.

2. The method of claim 1, further comprising generating audible instructions based on the test data, wherein the test data is received from a first device, and wherein the test performance data is sent to a second device.

3. The method of claim 1 further comprising outputting at least one instruction associated with the test, the at least one instruction determined based on a profile of the basketball player.

4. A computer-readable storage device storing instructions that, when executed, cause a computer to perform operations pertaining to a sports social media application comprising:

receiving test data to characterize a test to be performed by a basketball player;

the test including at least one or more of a combine measurement, a running drill, a shooting drill, a throwing drill, or a passing drill;

initiating the test based on corresponding to the test data;

capturing video of the basketball player performing the test, wherein the test assesses an ability of the basketball player to perform a specified athletic skill;

generating, via one or more machine learning and/or artificial intelligence components of the sports social media application, test performance data upon application of the captured video to the test data according to data collected via the sports social media application from a plurality of users, wherein the test performance data characterizes one or more aspects of the ability of the basketball player to perform the specified athletic skill; and sending the test performance data to an electronic device associated with one or more of the plurality of users.

5. The computer-readable storage device of claim 4, further comprising outputting at least one instruction associated with the test, the at least one instruction determined based on a profile of the basketball player.

6. An apparatus comprising a computer processor and a computer memory, the computer memory include instructions that, when executed, cause the apparatus to perform operations pertaining to a sports social media application comprising:

receiving test data to characterize a test to be performed by a basketball player, wherein the test assesses an ability of the basketball player to perform a specified athletic skill;

the test including at least one or more of a combine measurement, a running drill, a shooting drill, a throwing drill, or a passing drill;

initiating the test corresponding to the test data;

capturing video of the basketball player performing the test;

generating, via one or more machine learning and/or artificial intelligence components of the sports social media application, test performance data upon application of the captured video to the test data according to data collected via the sports social media application from a plurality of users, wherein the test performance data characterizes one or more aspects of an ability of the basketball player to perform the specified athletic skill; and sending the test performance data to an electronic device associated with one or more of the plurality of users.

7. The apparatus of claim 6 further comprising instructions that, when executed, cause the apparatus to perform operations comprising outputting at least one instruction associated with the test, the at least one instruction determined based on a profile of the basketball player.

8. The apparatus of claim 6 further comprising instructions that, when executed, cause the apparatus to perform operations comprising generating audible instructions based on the test data.

* * * * *